United States Patent [19]
Vertin

[11] 3,763,743
[45] Oct. 9, 1973

[54] APPARATUS FOR MAKING MASTER MODELS

[76] Inventor: Thomas D. Vertin, 37540 Lake Shore Rd., Mt. Clemens, Mich. 48043

[22] Filed: June 17, 1971

[21] Appl. No.: 154,210

Related U.S. Application Data

[62] Division of Ser. No. 864,650, Oct. 8, 1969, Pat. No. 3,640,182.

[52] U.S. Cl.................................. 90/13 B, 90/62 R
[51] Int. Cl. .............................................. B23c 1/16
[58] Field of Search .................... 90/62, 13 R, 13 B; 33/23 K; 82/14 A; 51/100 R

[56] References Cited
UNITED STATES PATENTS
| | | | |
|---|---|---|---|
| 3,570,370 | 3/1971 | Ristau | 90/62 |
| 3,121,351 | 2/1964 | Mount | 408/228 |
| 3,109,222 | 11/1963 | Wiseman | 408/199 X |

Primary Examiner—Gil Weidenfeld
Attorney—Donnelly, Mentag & Harrington

[57] ABSTRACT

An apparatus for carrying out the automatic machining of three-dimensional lines and surfaces for making a master model comprising three components which are controlled to move in a straight line, including an X-component which has a horizontal longitudinal X-movement, a Y-component which has a vertical Y-movement, and a Z-component which has a horizontal Z-movement at 90° to the X-movement, a tool operatively mounted on one of said components, power means operatively connected to each of said three components for moving the components in said controlled straight line movements, a signaling device for each of two of said components for controlling the power means therefor, a first source of two-dimensional data mounted on one plane, and a second source of two-dimensional data mounted on another plane perpendicular to said one plane, and a sensing element for each of said signaling devices which engages and is responsive to one of said two-dimensional data sources, whereby the power means controlled by the signaling devices cause their respective connected components to move precisely in accordance with the two-dimensional data, thereby producing a three-dimensional relative movement between the tool and the work piece.

2 Claims, 64 Drawing Figures

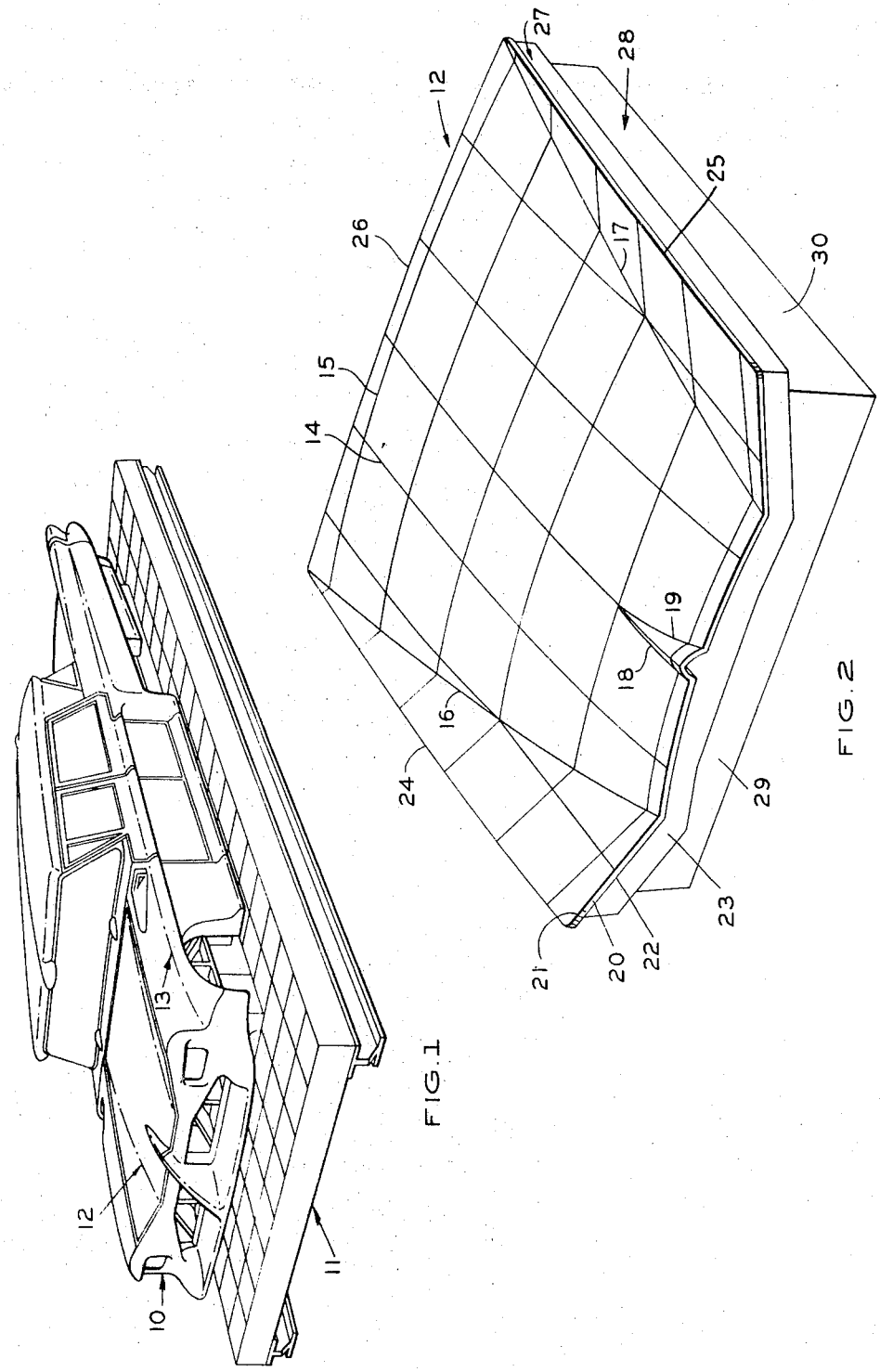

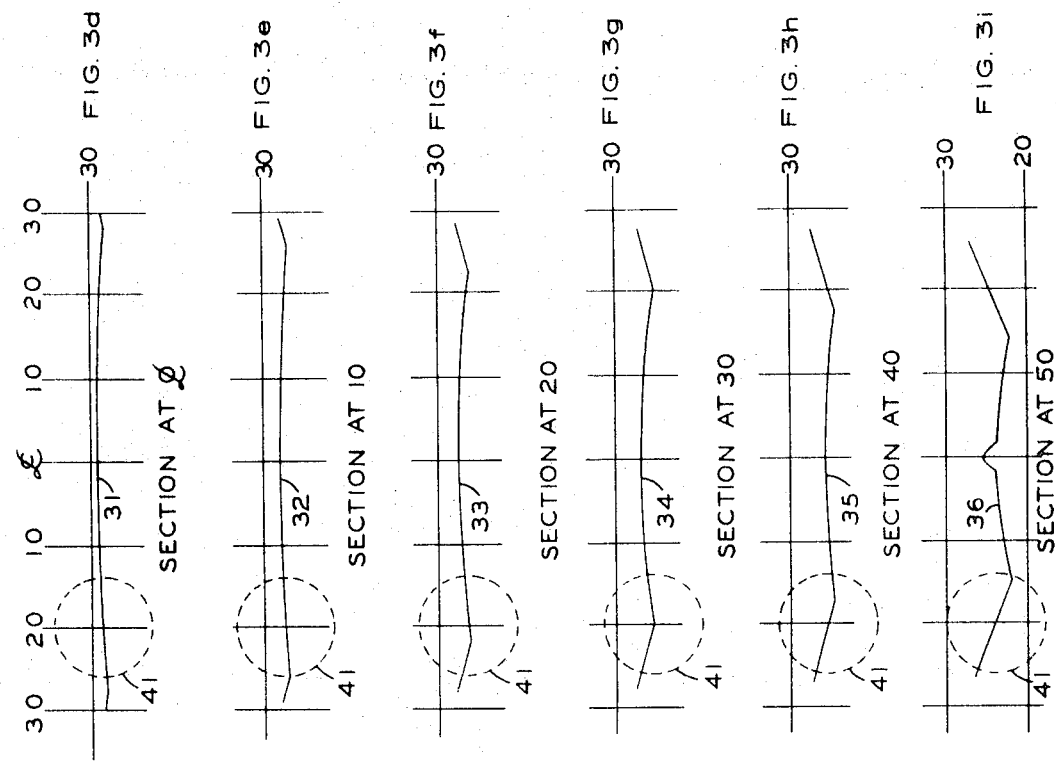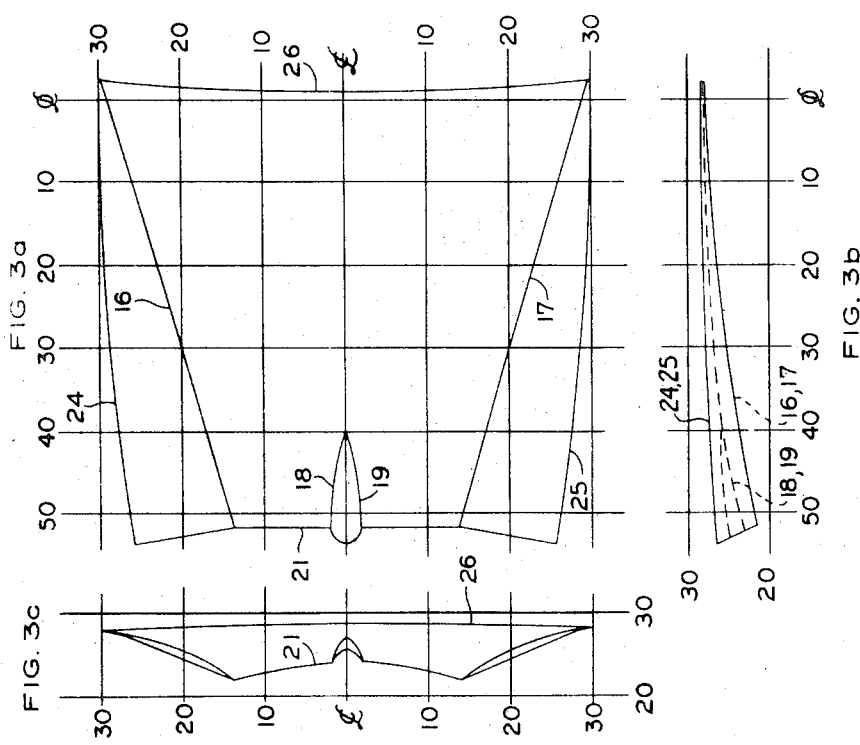

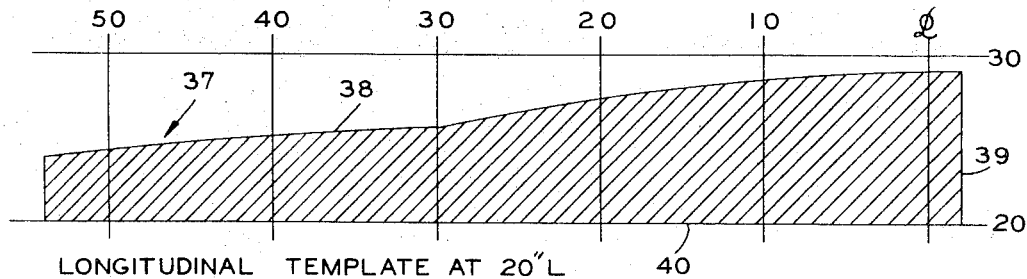
LONGITUDINAL TEMPLATE AT 20"L
FIG. 4
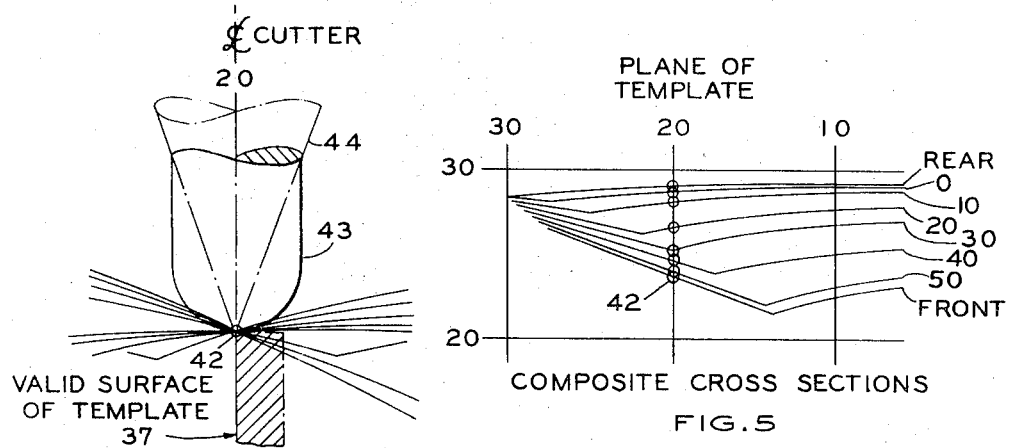
FIG. 5
CROSS SECTIONS SUPERIMPOSED AT POINT OF CUT
FIG. 6
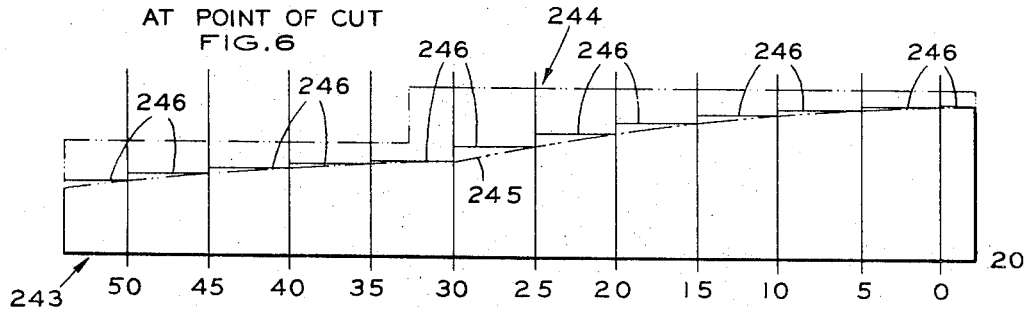
FIG. 34

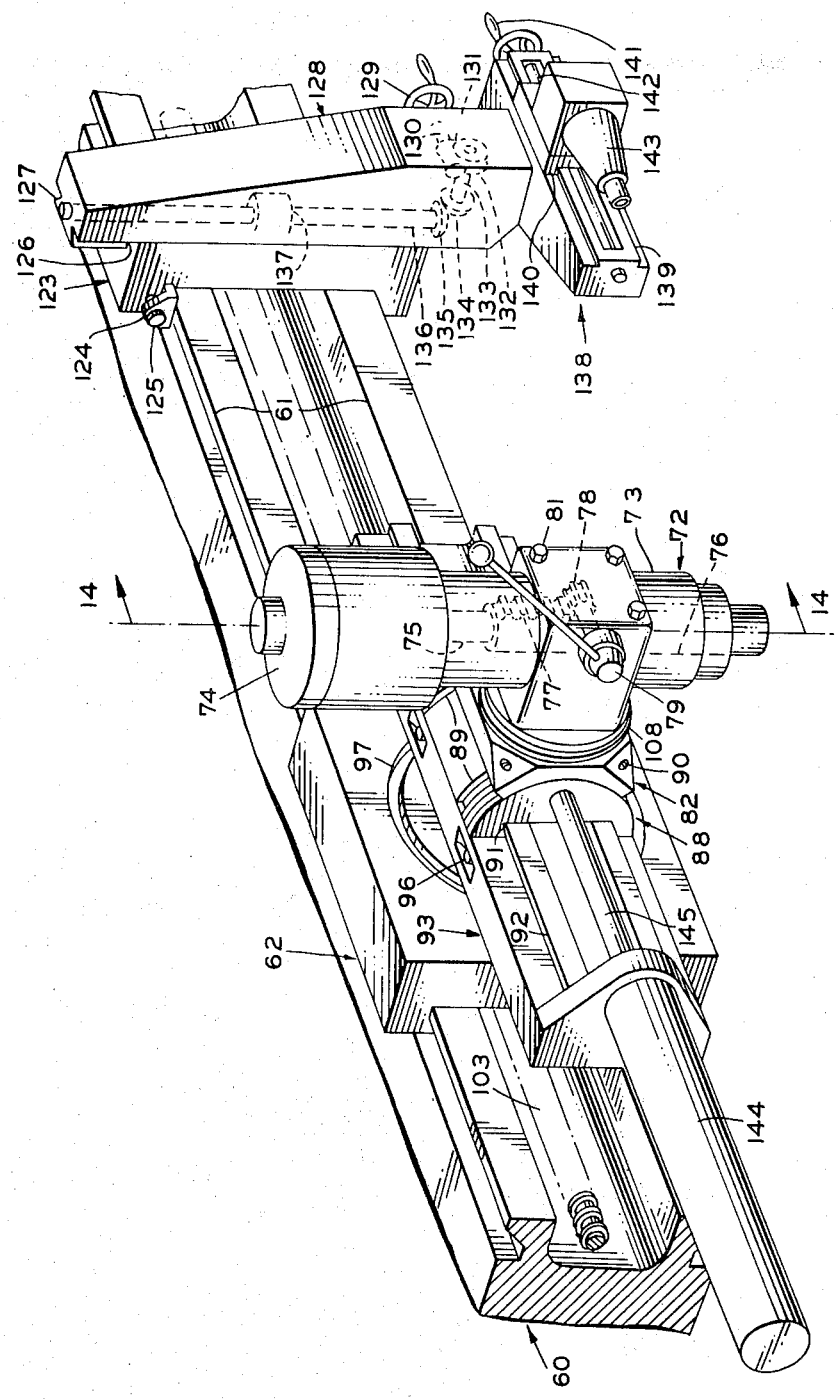

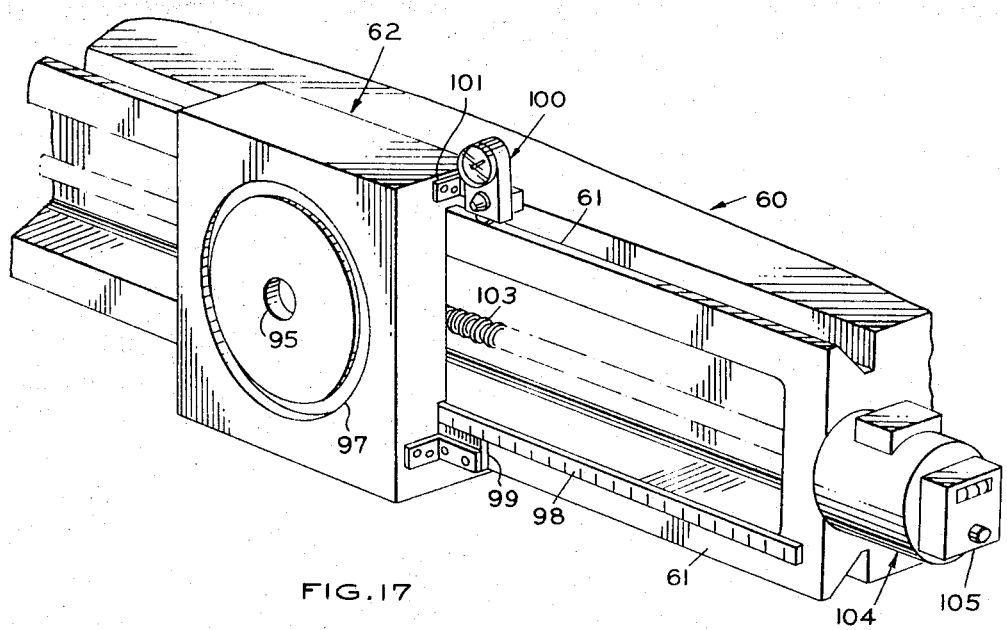
FIG.17
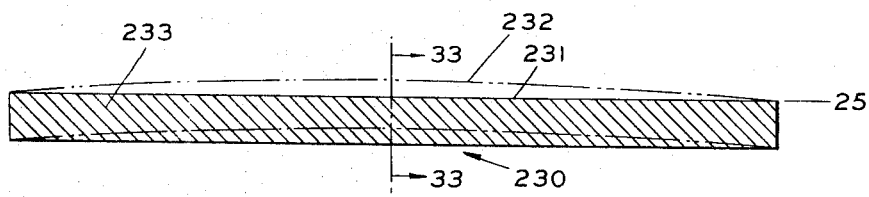
FIG.32
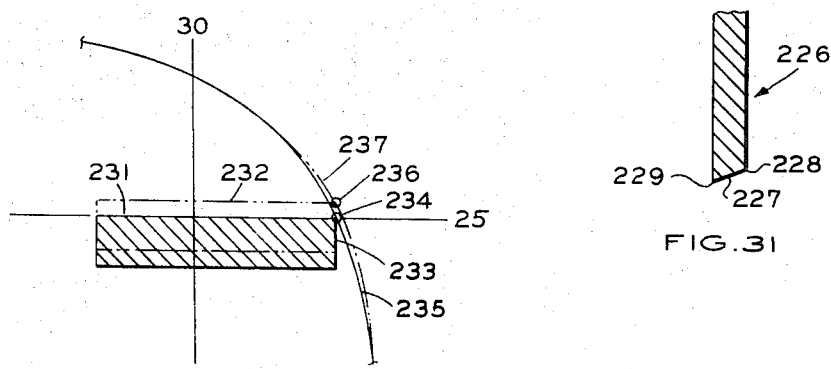
FIG.33
FIG.31

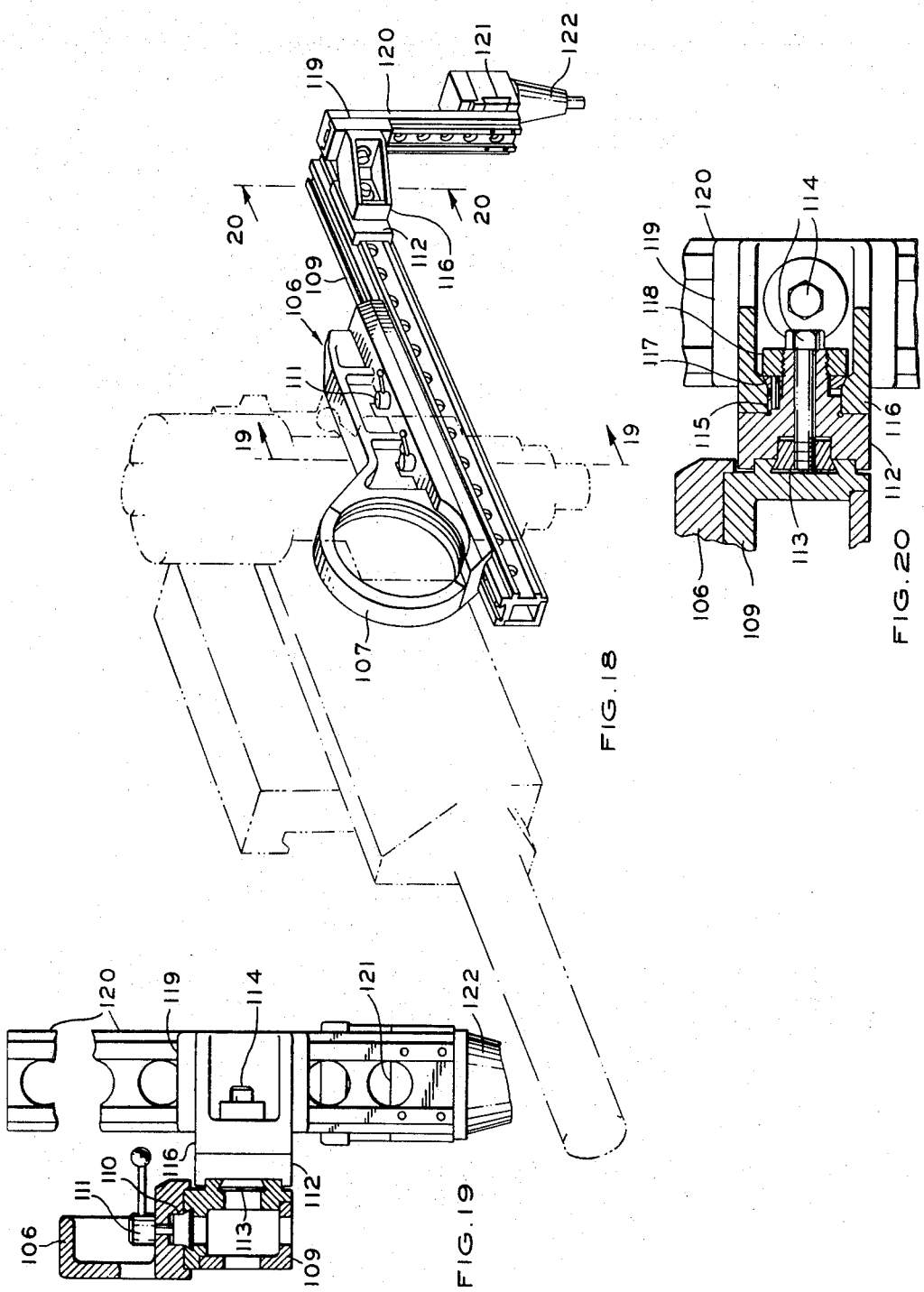

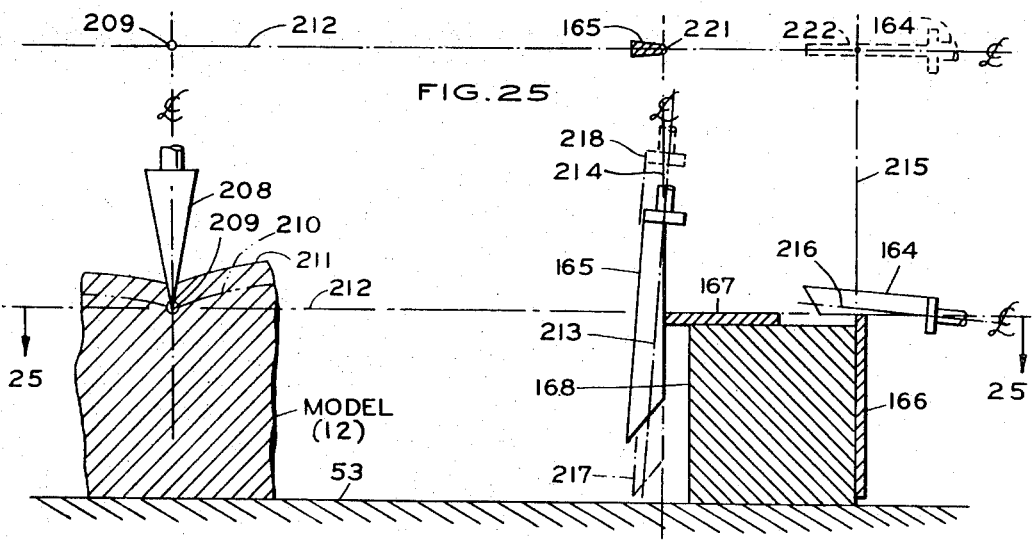
FIG.25
FIG.24
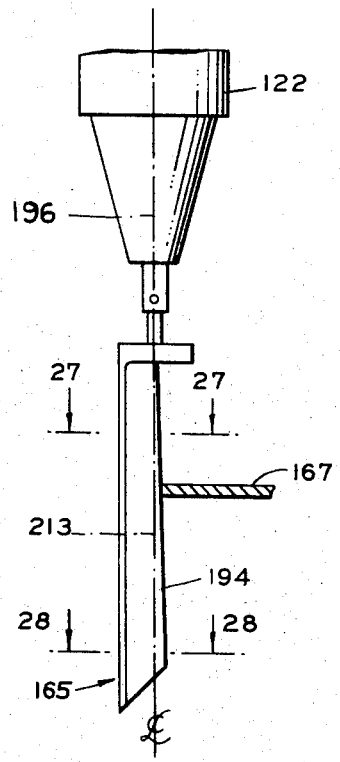
FIG.26
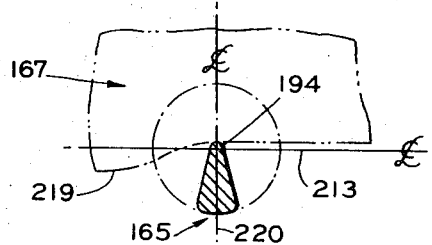
FIG.27
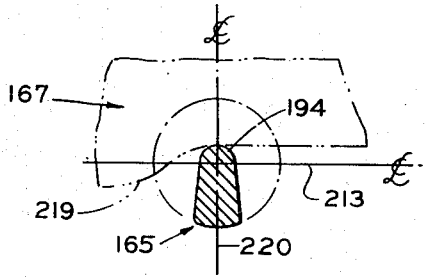
FIG.28

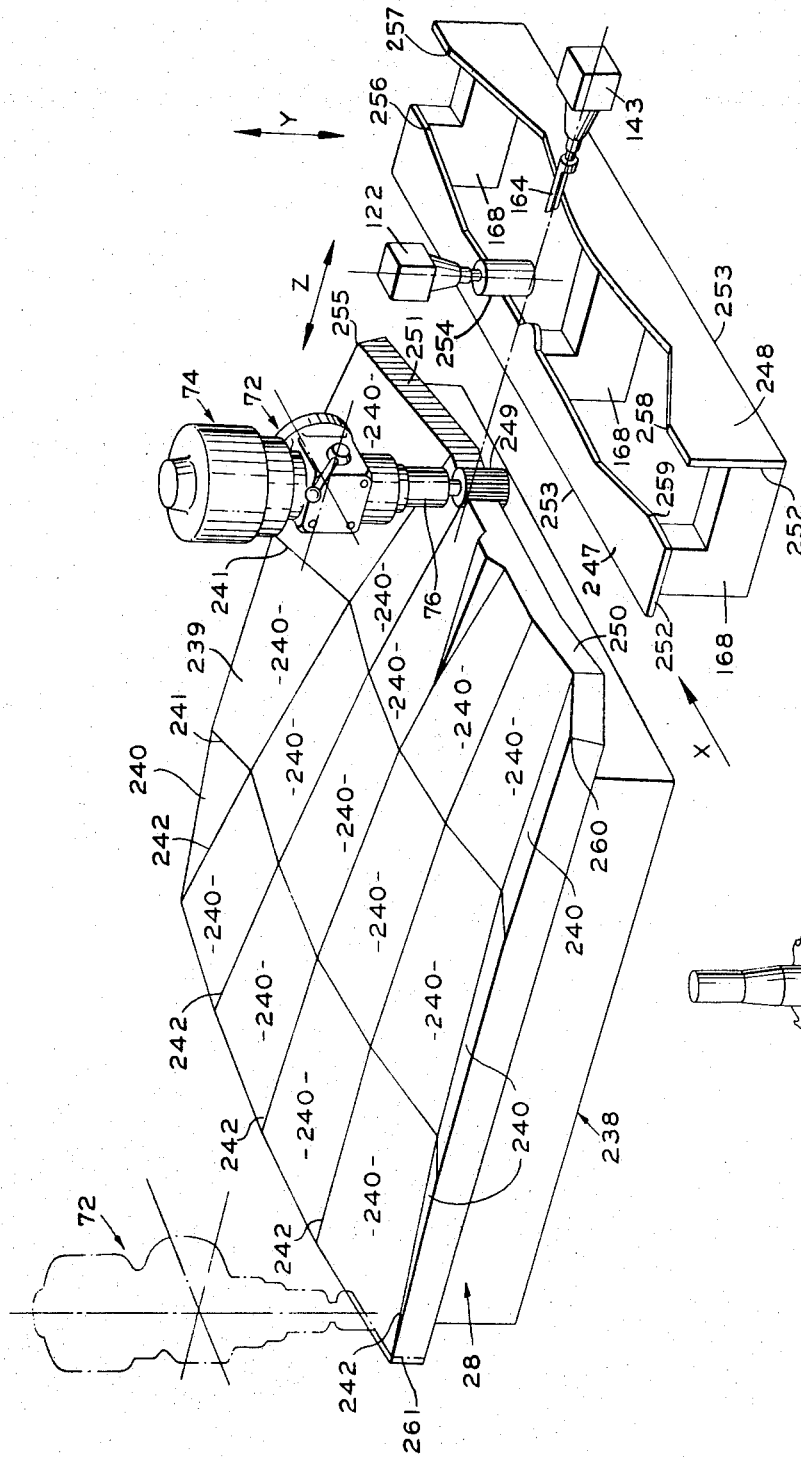

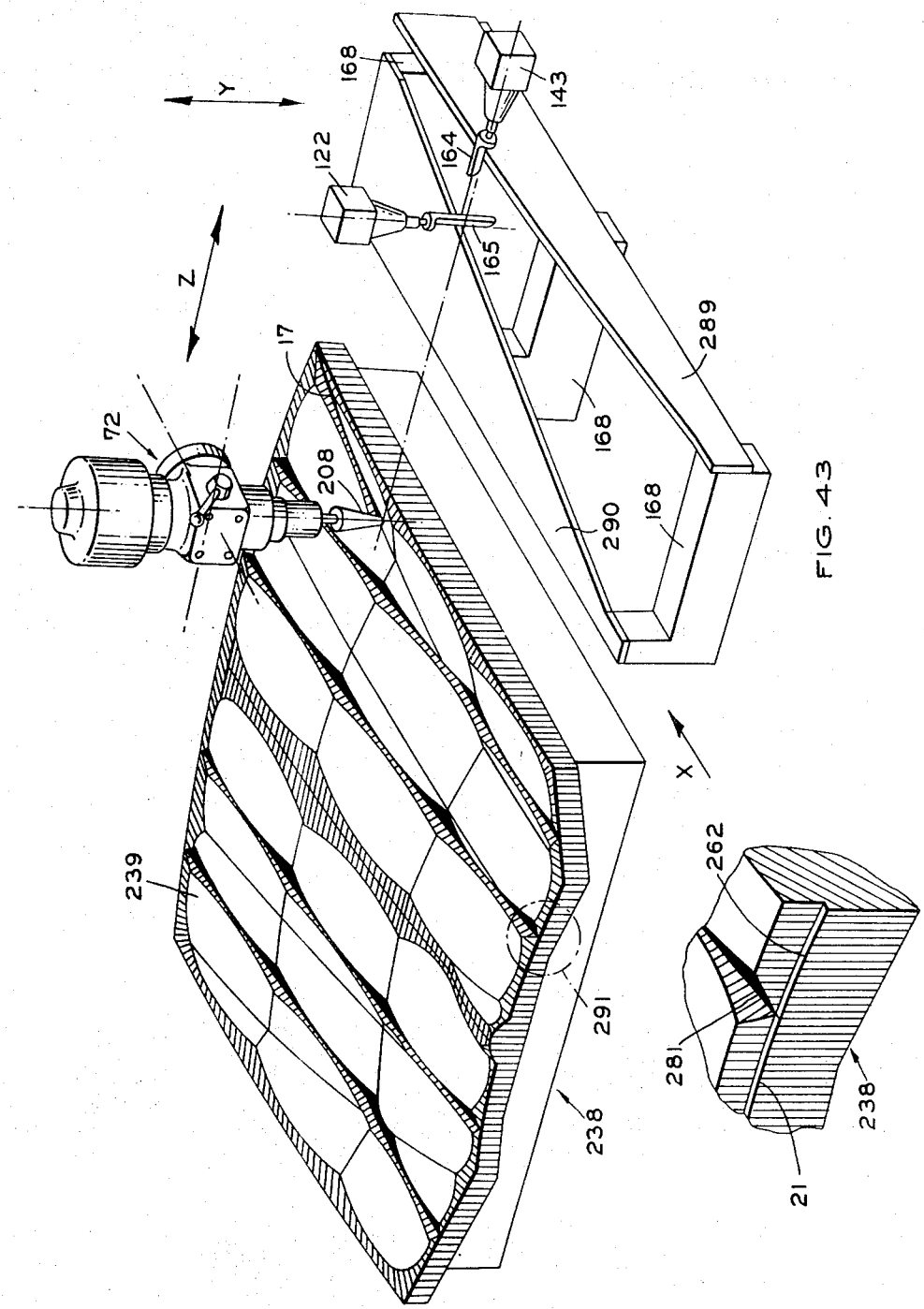

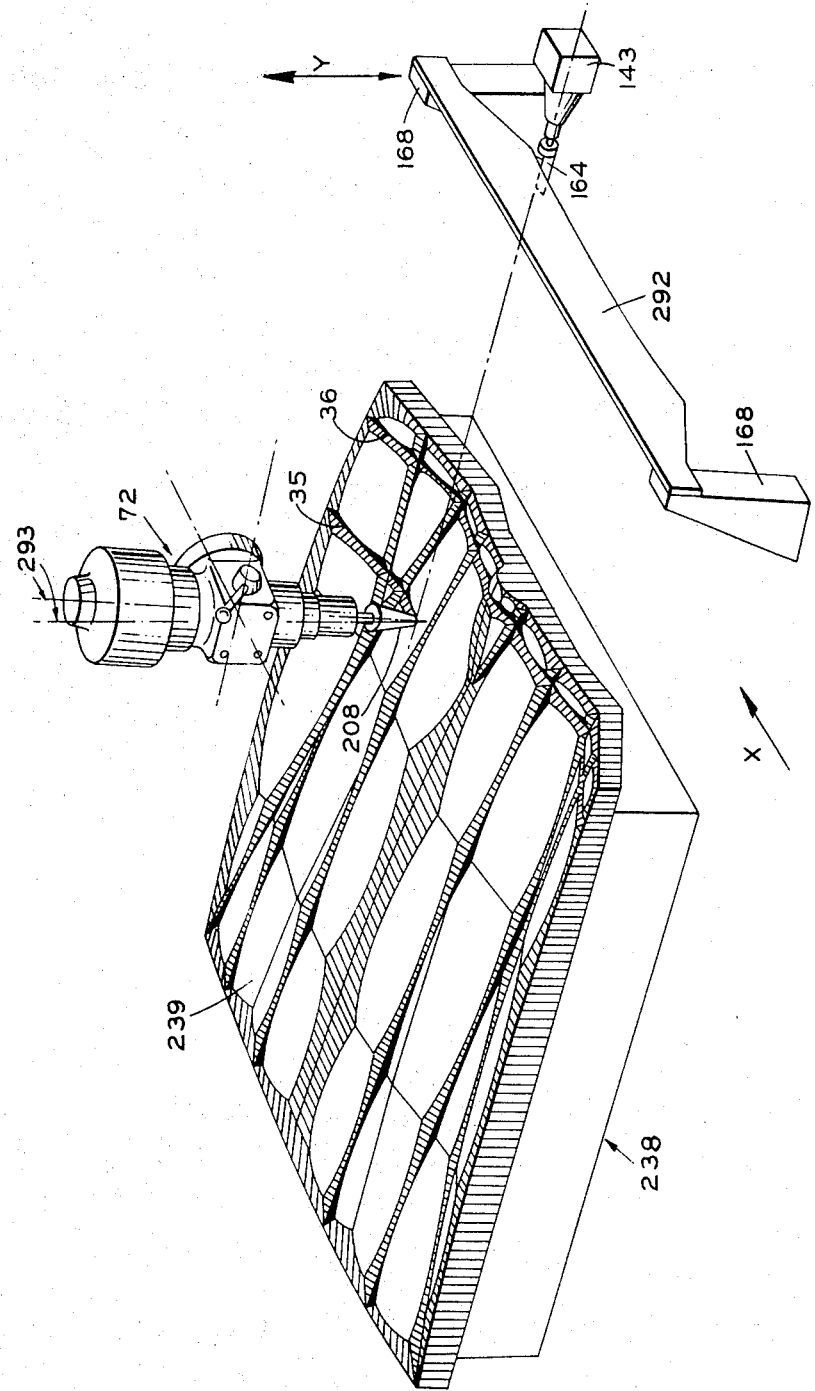

APPARATUS FOR MAKING MASTER MODELS

SUMMARY OF THE INVENTION

This is a division of application Ser. No. 864,650, filed Oct. 8, 1969, now U.S. Pat. No. 3,640,182.

This invention relates generally to the art of model making, and more particularly to a novel and improved method and means for making master models including the producing of precise two-dimensionally variant lines or surfaces on master models from single sources of two-dimensional controlling data, and the producing of precise three-dimensionally variant lines or surfaces on master models from multiple sources of two-dimensional controlling data, and precisely checking the models to the controlling data.

The word "precise" and its related forms as used herein is intended to denote accuracy to at least within the tolerances of the industry for which a model is being produced. The term "master models" as used herein is intended to denote the first or original model which has heretofore been produced by hand-methods, and which is a precise three-dimensional form established from only two-dimensional data. It is with this type of model that the present invention is specifically concerned.

The method of making master models in accordance with the principles of the present invention may be broadly described as comprising the steps of, providing a rough model; automatically machining guide lines and surfaces in said rough model from two-dimensional data; producing a final model from said rough model by removing excess material down to said guide lines; and, if desired or required, automatic machine checking said final model to said two-dimensional data.

A master model is made in accordance with the principles of the method of this invention by utilizing machines which are capable of performing certain operations automatically, and the operations are controlled by signaling devices activated by various forms of only two-dimensional data. The control requirements generated by multiple sources of two-dimensional data are automatically and simultaneously combined to produce a single operation. The majority of the machines and associated devices employed in the practice of the method of this invention to produce the desired results are more or less common in industry. However, their separate functions and characteristics are employed in a novel manner which was never practiced in the prior art, and an improved result is achieved which was not obtained by the prior art.

The prime controlling data from which an object such as a master model is produced are generally line drawings, which are made to record the detailed concept of the designers and to transmit it to the builders. The desired form of the object is defined in the drawings by a series of line illustrations comprising views of the various surfaces of the object, wherein the termination of a surface or a change in form of a surface are depicted by lines. Additional views in the form of longitudinal, transverse, and diagonal cross sections through the object further define the contours of the object. These cross section views have a precise dimensional relationship to each other, and are taken at as many spaced locations as is deemed necessary to adequately define the desired surface form, and may or may not be dimensionally notated. The other contour lines and surfaces of the object are generally variant in three dimensions, and consequently at least two views are required to define such a line or surface. Thus, the prime controlling data in the model making art is basically only two-dimensional, and prior to the present invention, no method existed for automatically combining two sources of two-dimensional data to produce a three-dimensional result in a single operation, and therefore, three-dimensional models had to be completely made by arduous hand methods.

In accordance with the prior art practices, a variant surface master model, such as an automobile body-panel model, is shaped to the configuration of numerous templates, which duplicate the various contours depicted in said line drawings. A single template is required to establish a particular two-dimensional cross section contour, wherein only a hypothetical line on the final surface of a model along the plane of the template must conform to the template contour. A combination of two templates is required to establish a three-dimensional character line, such as a corner formed by two angled conterminous surfaces, or a reference line denoting the precise but imperceptible location of a change in form on a surface. The cross sectional surface contours are produced on the model by hand methods first, and then the intermediate surfaces between the cross sectional surface contours are worked down by hand methods to produce a final surface partially defined by and blending into the said cross sectional surface contours. The character lines are generally formed as a result of producing said cross sectional surface contours and subsequently working down the intermediate surfaces, but may be also the result of producing a peripheral contour and subsequently working down the conterminous surfaces. By the method of the present invention, the cross sectional surface contours are produced as simple, narrow lines in the body of a model, easily and accurately by automatically machining, and hereinafter will be referred to as the "cross section lines." Also, the character and reference lines are not a resultant of working down intermediate surfaces but are produced directly by automatic machining as actual lines in the body of a model.

The producing of precise lines which define the final surface form on the model is obviously the most critical operation in making a model, and various methods for more efficiently producing cross sectional surface contours from templates on models have been developed, such as is disclosed in my prior U.S. Pat. No. 2,887,726. Also, a method of more efficiently producing precise character and reference lines has been developed, such as is disclosed in my prior U.S. Pat. No. 3,076,231. None of these methods have succeeded in overcoming certain inaccuracies that inherently occur in the use of templates, which will be more fully explained hereinafter. In carrying out the method of the present invention, these inherent inaccuracies are totally avoided by employing automatic equipment, which is insensitive to the specific inaccuracies of the templates which formerly produced aberrations of the desired surface of the model, and required repairs.

In the practice of the model making art, another complication is encountered wherein many models incorporate stepped contours which have walls such as a curved ribbon. In carrying out the method of the prior art, these features are arduously hand carved, or are sometimes formed by additional operations wherein the contour is hand machined to the contour of a template on a separate piece, which is subsequently attached to the model in the proper location. The method of the present invention greatly simplifies the producing of these features by automatically machining a completely finished surface directly on the main body of a model, and provides an even greater advantage by the automatic machining of multiple finished surfaces directly on the main body of the model in one operation, thus avoiding the multiple operations of the prior art methods.

After the surface of the model is completely finished, the lines and surfaces must be checked to determine the degree of conformity to the controlling data, which is generally a dimensioned drawing, but may also be templates. The dimensional data, whether it is obtained from a drawing or from the contoured edge of a template, is the more arduous to check to, due to the fact that the character and reference lines depicting the contour usually can only be dimensionally described by a series of spaced coordinates, thus requiring two separate views to establish a tri-ordinate or three-dimensional point on a variant line, and therefore two separate checking operations for each point. In accordance with the present invention, it is possible to quickly and accurately check the lines and surfaces with the same automatic machinery and techniques which are employed to produce said lines and surfaces.

In the practice of the prior model making art, producing and checking lines and surfaces on a model to the critical precision required by industry involves compounded operations arduously performed by hand methods, which are thereby highly subject to human errors and inconsistencies. The automatic machining operations used in carrying out the method of the present invention eliminates a number of the most difficult hand operations of the prior art, and thereby the human errors and inconsistencies connected therewith.

From the foregoing, it can readily be appreciated that the complexity of the operations, the requirement for precision, and the human inadequacies, combine to prolongate the hand methods, and considerable time is consumed in producing a model. The situation is further compounded by the fact that completion schedules for models are generally critical, yet the hand methods cannot be rushed without penalizing the desired results. The automatic machining operations used in carrying out the method of the present invention alleviates the arduous and prolonged hand methods of the prior art, and thereby considerable time is saved, thus expediting the producing of the model.

An expanding market for new products creates a need for more models, but the production potential for the model making industry is limited by the size of the force of highly skilled model makers, which is inadequate for meeting peak demands and the growth potential of the model making industry. Many years are required to develop a competent model maker; he must not only have had extensive experience in making models, but must also have considerable personal ability, in order to achieve the high degree of skill required for this work. These requirements automatically limit the field of potential model makers to a very small force. It is recognized in industry that automatic machine operators do not require as much personal ability as the corresponding hand worker when producing equivalent work, and thus the field of potential automatic machine operators is much larger than the potential model maker field. Also, an automatic machine operator may be trained and can attain a high degree of skill in far less time, producing superior results more consistently in less time. The method of the present invention is adapted to employ automatic machine operators on a number of critical operations, thereby taking advantage of the larger field of such workers, and reducing the requirement for highly skilled model makers.

Though models are formed in the prior art by predominately hand working methods, certain hand machining operations are utilized to speed the process, such as shaping the periphery of a model under the control of a template. It is generally conceded in industry that hand machining is more accurate, more consistent, and faster than hand working, and automatic machining is more accurate, more consistent, and faster than hand machining, but certain hand worked results have never been successfully duplicated by machining, losing either or both time and accuracy. Thus, models are formed by hand methods even though automatic machines ostensibly could achieve the same results. This is held to be necessary by those skilled in either or both the machining and model making arts, due to the fact that no method utilizing automatic machines has existed prior to this invention which could produce a master model from two-dimensional data. The method of the present invention successfully performs certain critical operations by automatic means, and not only duplicates the hand worked results, but exceeds them by increased accuracy and a saving of time.

A master model has never been produced by a method which includes the use of automatic machining operations prior to this invention, chiefly because in all cases the prime controlling data is only two-dimensional, and combining the control requirements from two sources of only two-dimensional data to produce a single three-dimensional result is not a practice of even the art of machining. Three-dimensional machining is practiced in the art of machining, but it is to be noted that the source of controlling data is a single three-dimensional model, and the total surface of an object is machined to a semi-finished condition. Multiple sources of two-dimensional data which merely define spaced-apart individual lines cannot be used in conjunction with automatic machining to semi-finish a surface, and therefore the machining art has not had any requirement to automatically combine multiple sources of two-dimensional data to obtain a three-dimensional machining result in one operation. The requirement for simple lines, whether they be two or three-dimensionally variant, is peculiar to the art of model making, and consequently no methods have been developed in the art of machining to produce such lines, prior to this invention.

In the machine process known as "Kellering," a three-dimensional object is produced under the control of a three-dimensional model by the use of a spherical nosed cutter. However, it is not feasible to use a spherical nosed cutter in conjunction with two-dimensional data to produce a surface on a three-dimensional model. When cutting a two-dimensionally variant line, such as a cross section line, it may be possible to reposition a spherical nosed cutter to one side of the line by some means to avoid undercutting the intended final surface, but where the intended surface alternately rises and falls on both sides of an intended line, it is not feasible to manually reposition a spherical nosed cutter alternately on each side of the intended line as would be required to avoid such undercutting. In accordance with the present invention, such a two-dimensionally variant line may be easily cut, and the aforementioned difficulties avoided by the use of a pointed tool.

For the purposes of this specification the term "spherical nosed cutter" is employed to designate a cutter having cutting surfaces which curve convexly and form no point. In contrast, the term "pointed cutter" shall be defined as a cutter having cutting surfaces which are shaped to form a point.

In the prior art of model making, the aforementioned tolerance or allowable deviation from a desired dimension expressed in thousandths of an inch has usually been of necessity 0.010 inch plus or minus from the desired dimension, which is a range of 0.020 inch deviation allowed. This tolerance was established as a practical range which was achievable by the prior art hand methods. Industry would like to reduce this tolerance range to achieve more accurate models, or models closer to the desired dimensions, but this has not been practical due to the excessive amount of time and repairs due to undercutting the desired surface that would be necessitated in the carrying out of the prior art hand methods in order to bring a particular model below the present tolerance range. During the experimental and developmental stages of the present invention, it was found that it was practical to lower this tolerance range to plus or minus 0.005 inch deviation from the desired dimension, which can be easily achieved by the method of the present invention. In fact, the method of this invention frequently achieves a tolerance of plus or minus 0.001 or 0.002 inch. Major automobile manufacturers in the United States and abroad have recognized the superior results obtained by the method of this invention, and have stipulated the new low tolerance for their latest models. The arduous hand methods of the prior art are further prolonged by the requirement for such precision, and therefore can neither economically nor chronologically match the results of the method of this invention.

In view of the foregoing, it is an important objective of this invention to provide a novel and improved method of making master models which includes the steps of providing a rough surface model, automatically machining guide lines and surfaces in said rough surface model from two-dimensional data, producing the final model forms from said rough surface model by removing excess material down to said guide lines, and, if desired or required, checking said final model to said two-dimensional data, by the use of automatic machines.

It is an objective of this invention to provide a novel and improved method for producing precise lines on master models from two-dimensional data by automatic means.

It is another objective of this invention to provide a novel and improved method for producing precise surfaces on master models from two-dimensional data by automatic means.

It is still another objective of this invention to provide a novel and improved method for producing precise two-dimensionally variant lines on master models from two-dimensional data by automatic means.

It is a further objective of this invention to provide a novel and improved method for producing precise three-dimensionally variant lines on master models from a plurality of two-dimensional data sources by automatic means.

It is a still further objective of this invention to provide a novel and improved method for producing a precise two-dimensionally variant surface on master models from two-dimensional data by automatic means.

It is still another objective of this invention to provide a novel and improved method of producing a precise three-dimensionally variant surface on master models from a plurality of two-dimensional data by automatic means.

It is still another objective of this invention to provide a novel and improved method for producing precise two-dimensionally variant multiple surfaces on master models from two-dimensional data by automatic means.

It is still another objective of this invention to provide a novel and improved method for producing precise three-dimensionally variant multiple surfaces on master models from a plurality of two-dimensional data by automatic means.

It is still another objective of this invention to provide a novel and improved method for achieving greater and more consistent accuracy in the producing of lines and surfaces on master models.

It is still a further objective of this invention to provide a novel and improved method for producing precise lines and surfaces on master models in less time than is attainable by prior art methods.

It is an important objective of this invention to provide a novel and simpler method for producing precise lines and surfaces on master models which method permits the use of more widely available skills than can be utilized in prior art methods.

It is still another objective of this invention to provide a novel and improved method for checking lines and surfaces on master models from two-dimensional data by the use of automatic means.

It is another objective of this invention to provide a novel and improved method to produce two-dimensionally variant cross section lines, and three-dimensionally variant character and reference lines in the body of a model with a pointed tool.

It is another objective of this invention to provide a novel and improved method for producing two or three-dimensionally variant multiple surfaces on master models in one operation from a plurality of two-dimensional data sources with a cutter which is shaped to produce the final surfaces.

It is a further objective of this invention to provide a novel and improved method of making master models wherein the tolerance range, or amount of allowable deviation from a desired dimension, is significantly reduced to provide more accurate models, or models conforming to the final dimension within closer tolerances than those obtainable with the prior art methods.

It is another objective of this invention to provide a novel and improved method for making master models wherein it is possible to make the right hand side, of a model which is symmetrical about its center line, conform exactly to the left hand side with less arduous and time consuming effort than heretofore possible.

It is another objective of this invention to provide a novel and improved method for making master models wherein a visually good surface may be produced on a model in relation to guide lines produced in the model regardless of any inconsistencies between the depth of the guide lines.

It is a further objective of this invention to provide a novel and improved method for making master models wherein warpage in a two-dimensional template will not be reflected in the producing of guide lines and surfaces in a model so as to produce aberrations of the model final surface.

It is another objective of this invention to provide a novel and improved method for making master models wherein a rough model need not be prepared as an oversize approximate semblance of the final form, but may be prepared as a very rough oversize form which does not bear any semblance to the final form, thus eliminating the step of removing the excess material prior to the producing of the guide lines on the model.

It is another objective of the present invention to provide a novel and improved method for making master models wherein discrepancies between the proper relative levels of the cross section, character and reference lines can be definitely determined at an earlier stage than heretofore possible, and thus avoid the inadvertent removal of any valid portion of the intended surface.

It is another objective of this invention to provide a novel and improved sensing element, for use in making master models, that activates a signaling device which controls one of the movements of an automatic machine, and which is shaped to permit axial movement of the sensing element without activating the signaling device.

It is another objective of this invention to provide a novel and improved means on automatic machines for positioning a tool in the most advantageous angular relationship to a model for performing certain operations in the making of master models.

It is a further objective of this invention to provide a novel and improved means on automatic machines for positioning a pointed tool at an angle whereby the point of the tool is located on an axis about which the axis of the pointed tool may be rotated, during a machining operation in the making of master models, so as to be able to cut vertical, horizontal and diagonal surfaces on diametrically opposite sides of a model without having to reposition the model.

It is a further objective of this invention to provide a novel and improved control system for controlling the movement of three basic components on an automatic machine used in the making of master models, whereby the movement of two of the three basic components of the machine are controlled by two signaling devices which are activated by two sources of two-dimensional data, and the movements of the three basic components are simultaneously combined to produce a single three-dimensional movement of a tool in relation to a model.

It is still another object of this invention to provide a novel and improved method of making master models, which includes the step of producing a final model from a rough surface model that has guide lines automatically machined in said rough surface model, by utilizing a numerically controlled machine to remove the greater portion of the excess material down to the guide lines to expedite the producing of the final surface by hand methods.

Other objectives, features and advantages of this invention will be apparent from the following detailed description, appended claims, and the accompanying drawings.

In the drawings: The 170. thereof.

FIG. 1 is a perspective view of a complete set of approved master models assembled on a basic supporting cube structure;

FIG. 2 is an enlarged perspective view of a completely finished automobile engine compartment hood panel die model;

FIGS. 3a–3i are an illustration of a line drawing of three views and sections of the hood panel shown in FIG. 2;

FIG. 4 is a true side view of a longitudinal template at the 20 inch line for the hood panel model;

FIG. 5 is a composite view of the transverse cross section lines as shown in FIG. 3;

FIG. 6 is a composite of the same transverse cross sections as shown in FIG. 5, and a spherical nosed and a pointed cutter;

FIG. 8 is a composite view of the transverse cross section lines taken through the front fender of the automobile model of FIG. 1;

FIG. 13 is an enlarged perspective view of the Z-slide, tool head, and signaling device, operatively mounted on a fragmentary portion of the Y-slide of the machine illustrated in FIG. 11;

FIG. 17 is a perspective view of the Z-slide saddle and a fragmentary portion of the Y-slide rail of the machine illustrated in FIG. 11, showing a plurality of gaging means;

FIG. 18 is a perspective view of a tracer adaptor structure;

FIG. 19 is a fragmentary cross sectional view taken through FIG. 18, along the line 19—19 and looking in the direction of the arrows;

FIG. 20 is a fragmentary cross sectional view taken through FIG. 19, along the line 20—20, and looking in the direction of the arrows;

FIG. 24 is a fragmentary view showing the line relationship of a pointed cutter and two blade-type stylii during the cutting of a three-dimensional variant line;

FIG. 25 is a horizontal view of the structure illustrated in FIG. 24, taken along the line 25—25 thereof, and looking in the direction of the arrows;

FIG. 26 is a view of a blade-type stylus, showing the structure of the stylus in relation to a hydraulic tracer and template;

FIG. 27 is a horizontal section view of the stylus structure illustrated in FIG. 26, taken along the line 27—27 thereof, and looking in the direction of the arrows;

FIG. 28 is a horizontal section view of the stylus structure illustrated in FIG. 26, taken along the line 28—28 thereof, and looking in the direction of the arrows;

FIG. 31 is a fragmentary sectional view of a defective template;

FIG. 32 is a view looking at the contoured edge of a template, showing both flat and warped template conditions;

FIG. 33 is a sectional view of the template structure illustrated in FIG. 32, taken along the line 33—33 thereof, and looking in the direction of the arrows;

FIG. 34 is an elevational cross section of a rough model;

FIG. 35 is a diagrammatic perspective view depicting the cutting of the front peripheral contour surface;

FIG. 36 is a perspective view of a large cylindrical cutter;

FIG. 43 is a diagrammatic perspective view depicting the cutting of a longitudinal reference line on the model illustrated in FIG. 41;

FIG. 44 is an enlarged fragmentary perspective view of a portion of the model shown in FIG. 43;

FIG. 45 is a diagrammatic perspective view depicting the cutting of a transverse section line on the model illustrated in FIG. 43;

THE FINISHED MODEL

Figure 7:
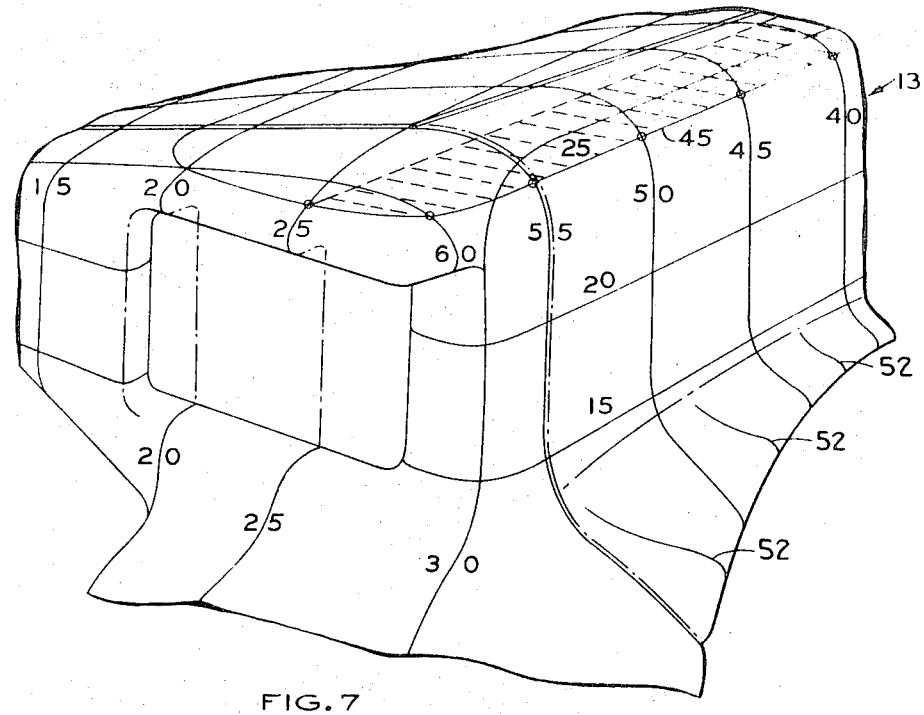
FIG. 7 is a fragmentary perspective view of the front fender area of the automobile model illustrated in FIG. 1.

Referring now to the drawings, and in particular to FIG. 1, the numeral 10 generally designates a master model stack comprising a full size scale automobile body formed by a number of individual body panel master die models, which are made in accordance with the principles of the present invention. The master model stack 10 is shown as being mounted on a basic supporting cube structure which is located and fixed on a surface plate generally indicated by the numeral 11. A suitable basic supporting cube structure is shown and described in detail in my prior U.S. Pat. No. 2,076,231.

The principles of the present invention will be partially illustrated hereinafter by reference to various views of the hood panel final master die model generally indicated by the numeral 12 in FIGS. 1 and 2. The hood panel master die model 12 is shown in FIGS. 1 and 2 as a completely finished model, but in describing the invention the model 12 is shown and described as the rough surface model in various stages prior to the finished stage shown in FIGS. 1 and 2. The numeral 13 generally indicates the front fender master die model of the illustrative full size scale automobile body, and this master die model will be referred to hereinafter to illustrate certain principles of the present invention.

As best seen in FIG. 2, the representative completely finished hood panel master die model 12 is depicted as being provided with a final upper surface on which a plurality of two-dimensionally variant longitudinal and transverse cross section lines 14 and 15, respectively, are shown as physical lines, which may not appear on an actual final model. The right hand and left hand three-dimensionally variant reference lines 16 and 17, respectively, and the right hand and left hand three-dimensionally variant reference lines 18 and 19, respectively, are also shown as they would appear at the time the model would be checked, but it is to be understood that on a completely finished model these lines may be covered with a material which may form a fillet between the conterminous surfaces.

The master model 12 shown in FIG. 2 is further provided with a completely finished three-dimensionally variant front peripheral contour surface 20, which with the conterminous three-dimensionally variant upper surface forms the three-dimensionally variant front peripheral character line 21. The three-dimensionally variant front under line 22 is formed with the front peripheral contour surface 20 and a conterminous front under surface which cannot be seen in this view, but which terminates at its inner end at the vertical surface 23. The right hand, left hand and rear three-dimensionally variant peripheral character lines 24, 25 and 26 are formed on the model with similar characteristics. These lines and surfaces are formed on the portion of the model hereinafter referred to as the body, indicated by the numeral 27 in FIG. 2.

The master model 12 comprises the body 27 and a base structure 28. It will be understood that the body 27 and the base 28 may be formed as an integral unit, or they may be formed as separate members and detachably connected together. In some particular cases it may be necessary to provide body extension members which continue certain characteristics of the body, and which can be removed to facilitate other operations.

The base structure 28 includes the function of providing the precise reference planes which are required to produce and check a model, and may also include features which facilitate the application of suitable holding means to securely retain the model 12 in the desired location on the hereinafter described machines without interfering with the machining operations. The base structure 28 may be made of any suitable materials, as for example, solid sections of wood, tubular plastic, or sandwich type sections, such as that known in the trade as honeycomb tooling panels.

As shown in FIG. 2, the base structure 28 includes the front vertical wall 29, a pair of side vertical walls as illustrated by the side wall 30, a rear wall (not shown) similar to the front wall 29, and internally disposed spaced apart transverse and longitudinal walls (not shown). It is to be understood that the configuration of the base structure for any particular model may vary to suit the requirements for the total model.

Although the illustrative hood panel model 12 does not require diagonal cross sections to properly define its surface form, due to the comparative simplicity of the surface form, it is to be understood that diagonal cross sections are necessary for many models, such as the diagonal cross sections commonly indicated by the numeral 52 on the front fender master die model 13, as best seen in FIG. 7. These diagonal cross sections are required to adequately define the contour of the front wheel opening, and each successive one is at a different angle. In the practice of the method of the present invention, the producing of diagonal cross section lines on a model may be accomplished with the same facility as the producing of the longitudinal and transverse cross section lines.

THE TWO-DIMENSIONAL CONTROLLING DATA

The various models which form the master model stack illustrated in FIG. 1 must be constructed in accordance with engineering data which is usually the aforementioned line drawings. FIG. 3 is an illustration of a line drawing of this type for the hood panel master die model 12. FIG. 3 comprises a plan view, front view and side view, and various tranverse cross sections of the hood panel 12 in a form similar to that received by a model maker from the designers. The variant surface of the hood panel master die model 12 is defined by a series of longitudinal and transverse cross sections, but only the transverse cross sections are shown in FIG. 3, as indicated by the numerals 31 through 36. Numerous templates are made from the line drawings to duplicate the surface contours. Templates would be made for the longitudinal cross sections (not shown), the transverse cross sections 31 through 36, and as shown in the plan view of FIG. 3; the front peripheral character line 21; the right side peripheral character line 24, which is also used for producing the character line 25; the rear peripheral character line 26; the right hand reference line 16, which is also used for the left hand reference line 17; and the reference line 18, which is also used for the right hand reference line 19. For each of these character and reference lines, two templates must be made, one template for these lines as shown in the plan view of FIG. 3, and a second template corresponding to the lines designated by a like numeral in the side or front views of FIG. 3.

As will be more fully explained further on, the method of this invention provides an advantage whereby it is possible to cut transverse, longitudinal or diagonal cross section lines from either a male or female template, whereas the prior art cannot use a male template for these operations. For the purpose of clarity, the complete hood panel has been shown in FIG. 3, but it will be understood that in actual practice generally only the right hand side, as viewed from the driver's position, is depicted in engineering drawings for an automobile body panel which is symmetrical about a centerline.

For the sake of brevity, the description of the method of this invention will be limited to the use of templates as the source of two-dimensional controlling data, although other sources such as the original drawings or coded data may be used.

As previously stated, a variant surface master model is usually shaped to the configuration of numerous templates, and certain inaccuracies inherently occur in the use of the templates, which produce aberrations of the desired surface of the model, and require repairs to the desired surface.

One of the inaccuracies that occurs in the use of templates results from the fact that many cross sections are taken through models which are symmetrical about a centerline, and consequently only one side of the contour is developed on the engineering drawings, and only a half-template is made for that contour. The half-template is first used on one side of the center-line, and then is subsequently reversed and used to form the other half of the symmetrical contour. Since only a hypothetical line on the surface of a model must conform to the template contour, and the template has a thickness of usually one-eighth of an inch, it will be understood that actually two separate contour lines are used when the template is reversed, due to the fact that the surface of the contoured edge of a template is not necessarily at precisely 90° to the plane of a template. This condition is illustrated in FIG. 31, wherein a fragmentary section of a defective template 226 is depicted as having a contoured edge surface 227 that is not precisely at 90° to the plane of the template. The point 228 indicates the line which would be used for the right hand side of a symmetrical model, and the point 229 indicates the line which would be used for the left hand side. It is obvious that this condition will produce surfaces at two different levels from the right side to the left side, thus compounding the difficulties encountered in producing a master model by the prior art methods. The method of the present invention, however, utilizes the same templates, but will produce a right hand and left hand contour identical to each other due to the fact that both the right and left contours are always produced from the edge of the template which is extended furthest from the template body, such as the edge denoted by the numeral 229 in FIG. 31.

Another characteristic of templates which produces inaccuracies in the making of master models by the methods of the prior art is the tendency of long templates to warp or bow. In use, a template must be carefully positioned in relation to a model by a means which aligns and supports the template at its opposite ends, whereby the center is unsupported, and therefore free to warp or bow.

It should be understood that not only the positioning of the template is critical, but also the trueness of the template plane. The template is intended to be only a two-dimensional control means, but any distortion of the plane of the contour will generate a third dimension and will result in an aberration of the intended contour. This distortion of the template plane is illustrated in FIGS. 32 and 33, wherein the distortion of the template plane is depicted as a simple bowed condition, with the center of the template curved outwardly midway between the ends of the template. In FIGS. 32 and 33 the true surface of a template 230 is indicated by the numeral 231, and the aforedescribed bowed surface is indicated by the numeral 232. In FIG. 33, a cross section through the template surface illustrated in FIG. 32 is shown as taken along the line 33—33, and looking in the direction of the arrows, wherein the contoured edge 233 of the template 230 is shown as being in contact with the model at the corner point 234, which is formed by the intersection of the contoured edge 233 of the template 230 and the valid side surface 231. In FIG. 33 the numeral 235 designates the desired model surface, and it can be seen that the bowed template surface 232 at the corresponding corner 236 will produce the aberrated surface 237. This condition is completely avoided by the method of the present invention due to the fact that only the two-dimensional contour of the edge of the template will activate the signaling device, and the third dimension generated by a warp or bow is excluded from the resulting cutter action.

It will be understood that the aforedescribed conditions apply to both the cutting or machining of the lines and surfaces on the model, as well as to the machine checking of the model, as described hereinafter in detail.

A COMPARISON OF SPHERICAL NOSED TO POINTED CUTTERS

In order to machine a two-dimensionally variant cross section contour line from two-dimensional data such as a template, the slope of the conterminous surfaces to each side of the line must be taken into consideration. In explanation, reference is now had to FIG. 4 wherein a true side view of a template 37 is depicted. The template 37 is a longitudinal cross section template which comprises a contoured edge 38 produced upon the upper edge, in relation to the vertical datum plane 39 on the right hand edge and the horizontal datum plane 40 on the bottom edge. A template of this size, which is approximately 55 inches long, is generally produced from an aluminum sheet ⅛ inch thick. The template 37 represents on its contoured edge 38 the surface of the hood panel model 12, as shown in FIG. 2, along a hypothetical line on the surface at the 20 inch line, which can be seen in the plan view of the hood panel in FIG. 3. Referring now to FIG. 5, it is to be noted that the vertical plane of the template 37 is on the 20 inch line. FIG. 5 is a composite view of fragmentary portions of the transverse cross section lines 31 through 36, taken within the dotted circles marked 41 in FIG. 3. The template plane on the 20 inch line is shown intersecting these transverse cross section lines at a plurality of points such as 42. It may be seen in FIG. 5 that the slope of the surface at the intersection points 42 varies to each side of the template plane on the 20 inch line. Referring now to FIG. 6, the transverse cross section lines as shown in FIG. 5 have been superimposed at the intersection point 42, whereby the related slope of the surface to each side of the template plane line can be clearly seen. A fragmentary portion of the template 37 is shown in proper alignment to the point 42, and a conventional spherical nosed cutter 43 is shown in cutting position relative to the contoured edge 38 of the template 37. The illustration in FIG. 6 clearly shows that the surface will definitely be undercut in certain areas along the line of the section by employing a spherical nosed cutter to attempt to produce a line from two dimensional data such as a template, along a contoured surface such as the surface of the hood panel model 12. A pointed cutter 44 is shown superimposed in cutting position in FIG. 6, and this is intended to illustrate the fact that a pointed cutter can definitely produce a valid line without undercutting the desired surface.

Figure 9:
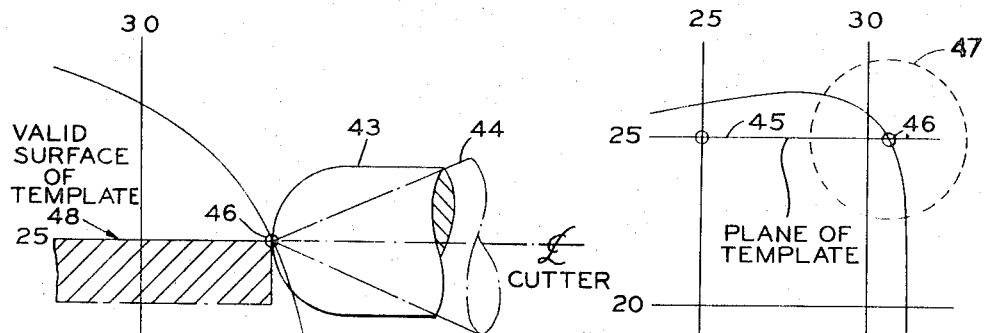
FIG. 9 is a composite of the same transverse cross sections as shown in FIG. 8, and a spherical nosed and a pointed cutter.

A similar condition is illustrated in FIGS. 7, 8 and 9. FIG. 7 is a fragmentary, perspective view of the front fender area as shown in FIG. 1, and a template plane 45 is shown at the upper portion of the front fender model 13. FIG. 8 is a composite view similar to FIG. 5, showing the cross sections of the front fender at the 10 inch lines superimposed on the common reference planes or 5-inch lines. The template plane 45 at the 25 inch line is shown as intersecting the outer contour of the fender panel at the point 46. FIG. 9 is an enlarged view of the superimposed cross section lines in the circle 47 in FIG. 8, similar to the view of FIG. 6. Again a fragmentary section of a template 48 is shown in proper position, and the spherical nosed cutter 43 is shown in proper cutting position relative to the edge of the template 48. Again, it can be seen that the spherical nosed cutter in conjunction with such controlling data will undercut the desired surface. The pointed cutter 44 is also shown in proper cutting position, to clearly illustrate that it will not undercut the surface.

Figure 10:
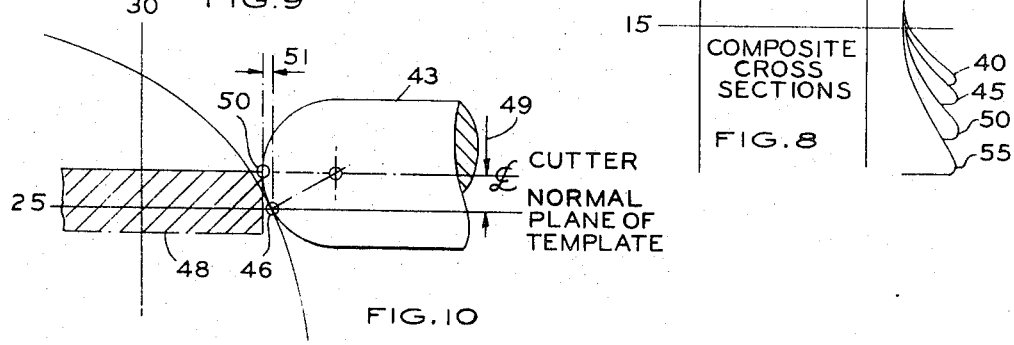
FIG. 10 is the same view as FIG. 9, but showing the spherical nosed cutter displaced.

FIG. 10 is a view similar to FIG. 9, and illustrates that the undercutting of the desired surface of the model by a spherical nosed cutter can only be avoided by misplacing the template 48 and the spherical nosed cutter 43 in the manner shown in FIG. 10. It can be seen that the template 48 and the centerline of the spherical nosed cutter 43 must be displaced in relation to the horizontal 25 inch line by the distance 49, to place the tangent or contacting point of the spherical nosed cutter on the desired point 46 on the model surface. The template 48 and the spherical nosed cutter 43 must, at their conjunction point 50, also be displaced in relation to the desired point 46 by the distance 51. The condition illustrated in FIG. 10 is intended to clarify the fact that the pointed cutter is the most practical type of cutter to use to cut such a line.

THE SEMI-AUTOMATIC MACHINE

The machines utilized in the practice of the method of this invention must have at least three basic components, namely an X-component, a Y-component, and a Z-component, and these components each are powered and controlled to move in a straight line. The X-component has a horizontal, longitudinal X movement; the Y-component has a vertical Y movement; and the Z-component has a horizontal Z movement at 90° to the X movement. These movements are common to many machines, such as planers, mills, surface grinders, and the like, and the required size of the machine is governed by the size of the object to be machined.

Figure 11:
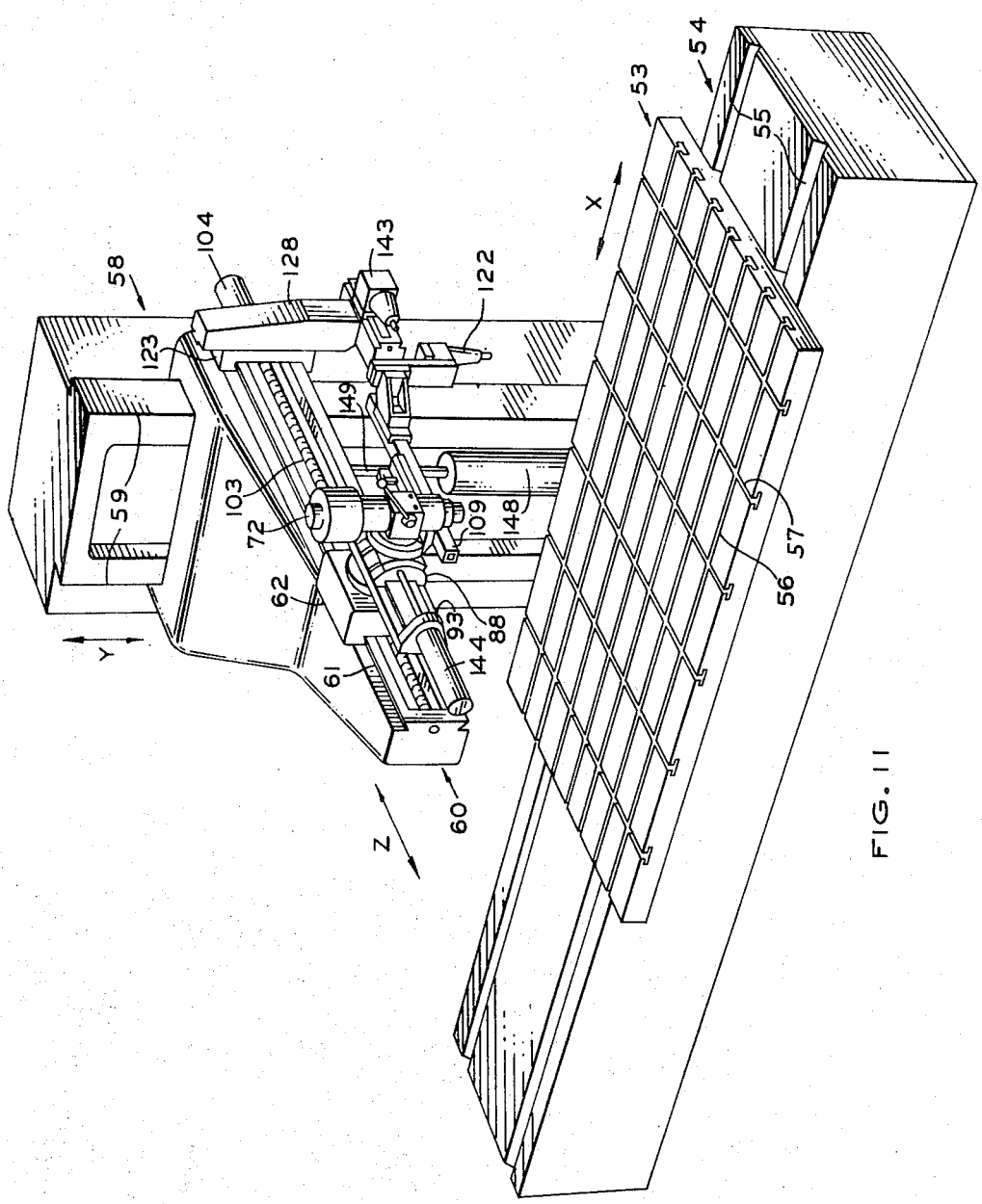
FIG. 11 is a perspective view of one type of machine which will accommodate large size models.
Figure 12:
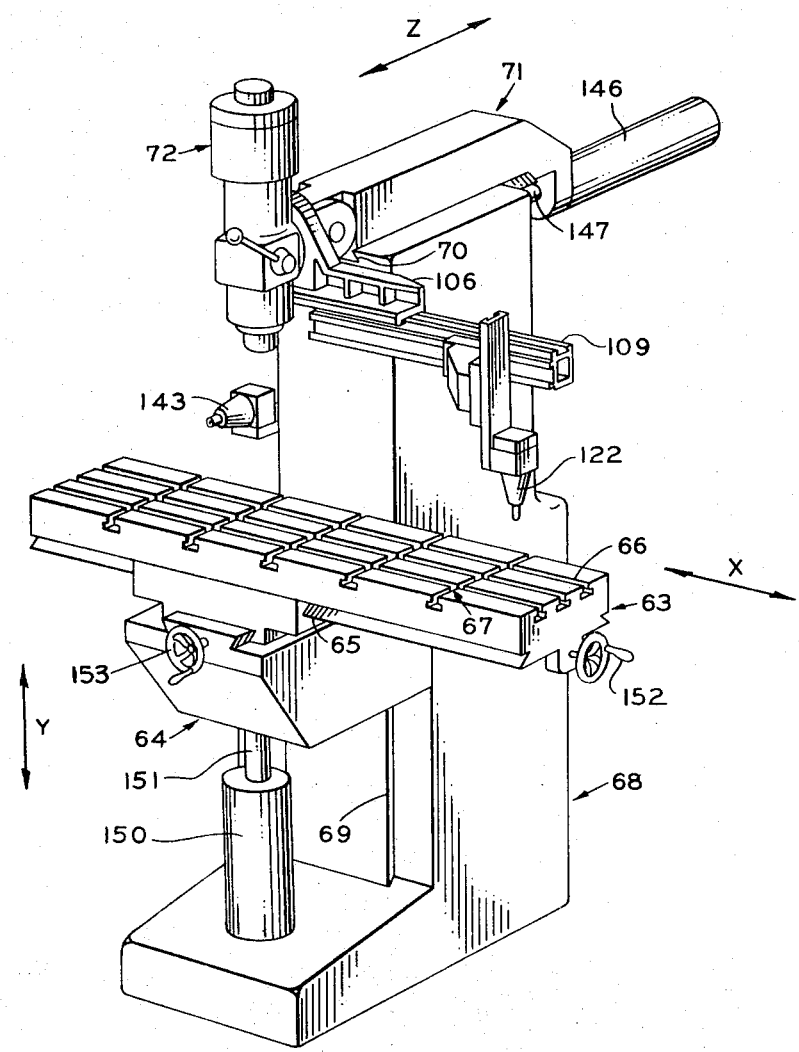
FIG. 12 is a perspective view of one type of machine which will accommodate small size models.

FIGS. 11 and 12 illustrate two types of machines which are adapted to be utilized in the practice of the method of the present invention. FIG. 11 is a perspective view of a large machine which will accommodate large size models. FIG. 12 is a perspective view of a smaller machine which will accommodate small size models. The machines illustrated in FIGS. 11 and 12 have at least three basic components, namely, an X-component, a Y-component, and a Z-component, which are each powered and controlled to move in a straight line.

The X-component in the machine illustrated in FIG. 11 is the X-slide indicated by the table 53. The X-slide table 53 comprises a precision surfaced table which is operatively mounted for longitudinal movement on the elongated bed 54. As illustrated, the X-slide table 53 is guided by the V-ways 55. The X-slide table 53 is provided with common longitudinal T-slots 56 and transverse T-slots 57 which are precisely aligned and spaced for locating and retaining a model in place on the X-slide table 53. The X-slide table 53 is powered backwardly and forwardly on the bed 54 by a manual operator-controlled means of a conventional type for planer tables, but using a motor of substantially less horse power.

Rigidly affixed to the rear side of the bed 54 at a suitable location is the vertically extended column 58 which is provided on the front and one side thereof with ways 59. The ways 59 form the vertical guides for the Y-component component which is illustrated as comprising a Y-slide rail 60. The Y-slide rail 60 is disposed on a horizontal plane and extends transversely over the bed 54 and is perpendicular relative to the column 58.

As shown in FIG. 11, the Y-slide rail 60 is provided on the front or operator side thereof with a pair of vertically spaced apart ways 61 which extend longitudinally of the rail. The Z-slide saddle 62 and the tool head mounting means comprise the Z-component, and are slidably mounted on the ways 61 for forward and backward movement on these ways, and for transverse movement relative to the X-slide table 53. The Z-slide saddle 62 carries the tool head and tool head mounting means which will be described in detail hereinafter.

The X-component in the machine illustrated in FIG. 12 is the X-slide table 63. The machine illustrated in FIG. 12, is of the type made by the Bridgeport Machine Company of Bridgeport, Connecticut. The X-slide table 63 comprises a precision surfaces table which is operatively mounted for longitudinal movement on the Y-slide knee 64. As illustrated, the X-slide table 63 is guided by the dovetail way 65 which is formed on the upper side of the Y-slide knee 64. The X-slide table 63 is provided with common longitudinal T-slots 66 and transverse T-slots 67 which are precisely aligned and spaced for locating and retaining a model in place on the X-slide table 63. The X-slide table 63 is powered forwardly and backwardly on the Y-slide knee 64 by the conventional power means employed in said Bridgeport type machine.

The machine illustrated in FIG. 12 is provided with a combined base and column generally indicated by the numeral 68 which supports the afore-mentioned X-, Y- and Z-basic components. Extended vertically on the front or operator's side of the combined base column 68 is a guideway 69 on which is slidably mounted the Y-slide knee 64.

Formed on the top of the combined base column is the ways 70 on which is slidably mounted the Z-slide ram 71. A tool head generally indicated by the numeral 72 is operatively mounted on the front or operator's end of the Z-slide ram 71. As shown in FIGS. 11 and 12, the tool head 72 is interchangeable between the machines illustrated in FIGS. 11 and 12, although it is mounted on different components on each machine.

THE TOOL HEADS

Various types of tool heads may be utilized to produce the desired results. One type is a tool head which holds the tool and rotates the tool holder on its own axis by a power means; another type is a tool head which holds the tool and moves the tool holder in a straight line with a reciprocating action by a power means. These are conventional tool heads which are produced by the Bridgeport Machine Co. and are well known in the machining field. For the sake of brevity, only one tool head is described hereinafter.

Figure 14:
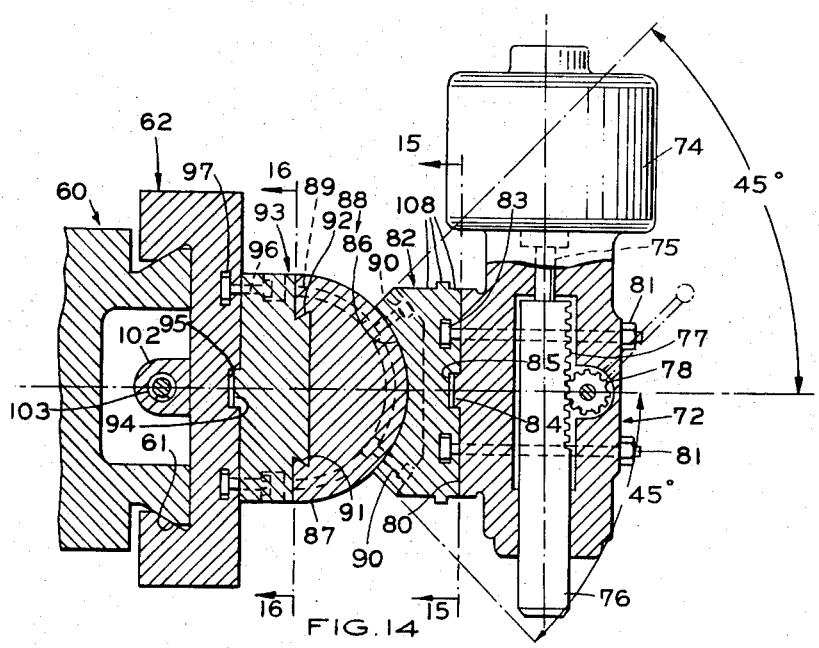
FIG. 14 is a fragmentary elevational sectional view of the structure illustrated in FIG. 13, taken along the line 14—14 thereof, and looking in the direction of the arrows.

As best seen in FIGS. 13 and 14, the tool head 72 includes the vertically disposed tubular body 73, on the upper end of which is operatively mounted a drive motor 74 which may be any suitable electric or fluid motor. The output shaft of the motor 74 is operatively connected to the drive shaft 75, which is slidably engaged with a conventional spline in the quill 76. Formed in the outer face of the quill 76 is the gear rack 77, which is meshably engaged with the pinion 78 which is connected to the hand control 79 for rotating the pinion 78 to manually move the quill 76 upwardly and downwardly. The quill may be locked in adjusted positions by conventional locking means.

As best seen in FIG. 14, the tool head 72 is provided on the rear side thereof with an integral mounting surface 80 which is releasably secured by means of the bolts 81 to the pivot head 82. The pivot head 82 is provided with a circular T-slot 83, in which the heads of the bolts 81 are retained. Integrally formed on the rear side of the tool head mounting surface 80 is a pilot boss 84 which is rotatably mounted in the mating pilot hole 85 formed in the front face of the pivot head 32. It will be understood that the tool head 72 may be adjusted to any desired angular position within 360° relative to the pivot head 82 by pivoting around the pilot boss 84, and may be retained in that position by tightening the bolts 81.

THE TOOL HEAD MOUNTING

On such machines as shown in FIGS. 11 and 12, the tool head must be mounted by some means wherein it may be angled in respect to the three basic movements; such mounting means may be a type common to many machines. The following described tool head mounting, however, provides particular facility for carrying out the method of the present invention.

Figure 15:
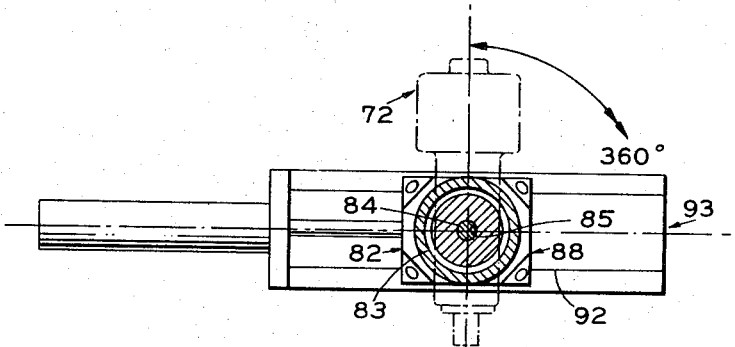
FIG. 15 is a fragmentary, elevational sectional view, with parts removed, of the structure illustrated in FIG. 14, taken along the line 15—15 thereof, and looking in the direction of the arrows.

As best seen in FIGS. 13, 14 and 15, the tool head is mounted to the pivot head 32, which is provided on the rear side thereof with the concave seating surface 86 which is adapted to be seated on the mating convex surface 87 formed on the front side of the pivot slide 88. The convex surface 87 is provided with a pair of laterally spaced apart T-slots 89 in which the bolts 90 are retained. It will be understood that the pivot read 82 may be adjusted to any desired angular position within 90° relative to the pivot slide 88 and retained in that position by tightening the bolts 90. The pivot slide 88 is slidably mounted on the dovetail ways 92 formed on the front of the slide base 93, by a pair of vertically spaced apart dovetail mounting members 91.

Figure 16:
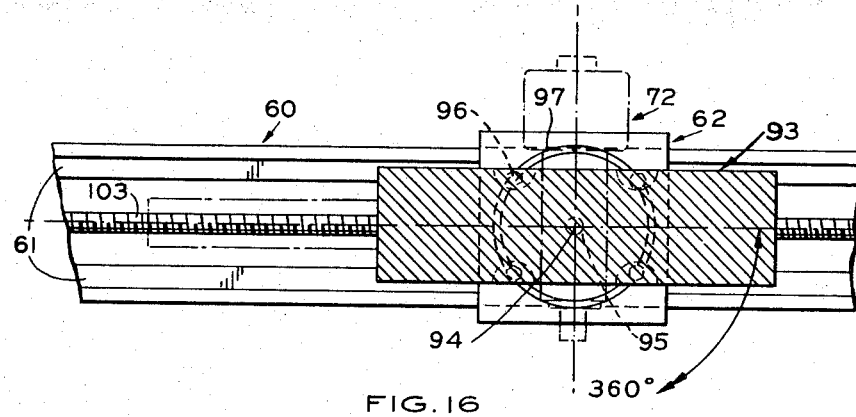
FIG. 16 is a fragmentary, elevational sectional view of the structure illustrated in FIG. 14, taken along the line 16—16 thereof, and looking in the direction of the arrows.

As shown in FIGS. 14 and 16, the slide base 93 is provided on the rear side thereof with the integral pilot boss 94 which is rotatably mounted in the mating pilot hole 95 formed on the front side of the Z-slide saddle 62. The slide base 93 is adapted to be releasably secured in angular positions relative to the Z-slide saddle 62 by means of a plurality of bolts 96, the heads of which are retained in the annular T-slot 97 formed on the front side of the Z-slide saddle 62.

It is to be understood that the construction features of the equipment between the Z-slide saddle 62 and the tool head 72 inherently enable the tool head 72 to be angled in different directions, and that it may be used horizontally as a Z-slide or it may be turned vertically and used as a Y-slide. It may also be adjusted to assume any angled position in between, and the tool may be moved under tracer control along the plane established by the angle of the slide base 93.

THE GAGING ELEMENTS

The machines which are used in carrying out the method of this invention must embody, on either the linear or rotary movement guide means, or the motive means, such as a screw, shaft, cylinder, or the like, a means for precisely gaging the relative distance the moved components travel, to permit precise positioning of the components for a machining operation. Such gaging means are common to many machines, and may be a direct reading type, such as a scale, or indirect reading type, such as a revolution counter.

All of the components, which either or both support and position the model to be machined on such aforedescribed machines, must have suitable means for locating the model in the proper position to insure accuracy. Such means may also provide features which accommodate other means for securely retaining the model in that position, such features including common T-slots, precisely aligned and spaced for those purposes.

Some of the gaging means which may be adapted to precisely measure said component travel distance are shown in FIG. 17, which is a perspective view of the Z-slide saddle 62 and a fragmentary portion of the Y-slide rail 60 of the machine illustrated in FIG. 11. In FIG. 17 the numeral 98 designates a conventional rule, which is attached to the front face of the Y-slide rail 60. Mounted on one side of the Z-slide saddle 62 is a vernier scale 99, which is secured to the saddle by any suitable means, and which is adapted to coact with the rule 98 in order to permit the operator of the machine to gage the position of the Z-slide saddle 62 relative to the Y-slide rail 60. The numeral 100 designates another type of gage which is a conventional odometer type instrument, that is adapted to precisely measure the accumulated distance which the Z-slide saddle 62 travels relative to the Y-slide rail 60. The odometer 100 is fixedly secured to the Z-slide saddle 62 by any suitable means, as by the bracket 101. It will be seen that the odometer 100 is provided with a suitable rotatable member, which is in rolling contact with the Y-slide rail 60 as the Z-slide saddle 62 moves relative to the Y-slide rail.

An indirect type of gage, such as a revolution counter, may also be utilized to measure the aforedescribed component travel distance. As shown in FIGS. 13, 14 and 17, the Y-slide saddle 62 is moved by a conventional lead screw and nut means. A nut 102 as best seen in FIG. 14 is mounted on the rear side of the Z-slide saddle 62, and is threadably engaged with the lead screw 103 which is operatively mounted in the Y-slide rail 60. As shown in FIG. 17 the lead screw 103 is driven by the motor 104, which may be any suitable electric or fluid drive motor. Operatively connected to the shaft of the motor 104 is a revolution counter 105, which is illustrated as being of the mechanical type, although it will be understood that it may be of any other suitable type, as for example a remote reading electronic counter.

The aforementioned X-, Y- and Z-components, and any pair of components of the machine which move relative to each other and which are involved in carrying out the method of the present invention, would be provided with one of the gaging means of the types illustrated in FIG. 17.

THE SIGNALING DEVICE MOUNTING

The machines utilized in carrying out the method of this invention have the movements of two of the three basic components controlled by signaling devices. The movement of the X-component is a steady feeding movement in one direction, whereas the movement of the Y- and Z-components may be a reciprocating movement under the control of signaling devices. The signaling device which controls the movement of the Y-component is referred to hereinafter as the "XY-tracer;" and the signaling device which controls the movement of the Z-component, is referred to hereinafter as the "XZ-tracer." The XY-tracer and the XZ-tracer, which will be described in detail hereinafter, must be mounted on the machine by means which permit adjustment in three directions, so that the signaling device may be properly aligned before a machine operation with the tool which contacts the model. The XZ-tracer is attached to the aforementioned tool head by an adjustable mechanism referred to hereinafter as the "XZ-tracer adaptor structure." The XY-tracer is attached to the Y-slide rail by an adjustable mechanism hereinafter referred to as the "XY-tracer positioning mechanism."

Referring now to FIG. 18, an illustrative XZ-tracer and adaptor structure is shown in operative relationship to an outline of the tool head and its mounting structure. The numeral 106 designates a tracer adaptor bracket, which is provided with the adaptor yoke 107 for mounting the adaptor bracket on the mating surface 108 (shown in FIG. 14) and formed on the front side of the pivot head 82, which may be best seen in FIGS. 13 and 14. The tracer adaptor structure of FIG. 18 further includes the extension bar 109, which may also be seen in FIGS. 19 and 20, and which is adjustably secured to the adaptor bracket 106 by a plurality of dovetail cuts 110, which are secured in place by a plurality of lock screws 111. As best seen in FIGS. 19 and 20, a tracer pivot slide 112 is slidably mounted on the extension bar 109, and is adapted to be adjustably secured in place by means of the dovetailed nut 113, which is secured in place by one of the hex head screws 114. The pivot slide 112 is provided with an integral, outwardly extended pilot 115, on which is rotatably mounted the pivot bracket 116. The pivot bracket 116 is illustrated as being releasably secured on the pilot 115 by the taper lock 117 and spanner nut 118.

A second tracer pivot slide 119 is adjustably mounted on the outer end of the pivot bracket 116 in the same manner and by a similar structure as shown in FIG. 20, which connects the pivot bracket 116 to the pivot slide 112. As shown in FIGS. 18, 19 and 20, an extension arm 120 is adjustably mounted on the outer face of the second pivot slide 119, and is secured thereto by a similar dovetailed nut as 113. A dovetailed adaptor bracket 121 is operatively mounted on the lower end of the extension arm 120 for receiving the dovetailed mating structure of the hydraulic tracer 122.

It will be understood that the XZ-tracer and adaptor structure shown attached to the machine of FIG. 12 is the same as the XZ-tracer and adaptor structure shown attached to the machine of FIG. 11, and is operatively attached to the tool head 72 in the same manner as illustrated in FIG. 18.

Referring back to FIG. 13, an XY-tracer and positioning mechanism is shown in operative position on the Y-slide rail 60, and comprise an XY-tracer saddle 123 that is slidably mounted on the ways 61 on the Y-slide rail 60. The XY-tracer saddle 123 is adapted to be fixedly secured in a desired adjusted position on the ways 61 by means of the conventional tapered lock 124, which is locked in place by the screw 125. The XY-tracer saddle 123 is provided on the front or operator's side with the dovetail ways 126, which mate with the dovetail 127 formed on the rear side of the XY-tracer vertical slide 128. The XY-tracer vertical slide 128 is manually adjustable upwardly and downwardly by the handwheel 129, which is operatively connected to the shaft 130 and which is provided on the inner end thereof with the worm 131. The worm 131 is meshably engaged with the worm gear 132, which is fixedly mounted on the shaft 133 that carries on the opposite end thereof the bevel gear 134, which is meshably engaged with the mating bevel gear 135. The bevel gear 135 is fixedly mounted on the lower end of the lead screw 136, which is threadably engaged in the nut 137 that is attached on the front side of the XY-tracer saddle 123.

As shown in FIG. 13, the XY-tracer slide base 138 is attached to the lower end of the XY-tracer vertical slide 128 by any suitable means. The XY-tracer slide base 138 is provided with the dovetail ways 139 on the front side thereof, on which is slidably mounted the XY-tracer slide 140. The XY-tracer slide 140 is manually adjustable by the hand wheel 141, which is operatively connected to the lead screw 142, and threadably engaged with a nut (not shown) which is attached to the rear side of the XY-tracer slide 140 and is similar to nut 137. The XY-tracer 143 is carried on the XY-tracer slide 140, and is secured thereto by any suitable means. The XY-tracer 143 is a conventional hydraulic tracer which is similar to the tracer 122.

Similarly, in carrying out the method of this invention, the machine illustrated in FIG. 12 is provided with an XY-tracer positioning mechanism as shown in FIG. 13, which is mounted on the base column 68 in any necessary or required position. It will be understood that since the models produced with the machine illustrated in FIG. 12 are on a smaller scale, the corresponding XY-tracer positioning mechanism would be made proportionately smaller.

THE SIGNALING DEVICE

The signaling devices utilized in carrying out the method of this invention and which regulate the movements of the Y- and Z-components precisely in accordance with the controlling data may include hydraulic tracers, photo-electric scanners, electromagnetic followers, punch-card and tape readers, and the like. A suitable photoelectric tracer is available from Westinghouse Canada, Ltd., and a suitable electromechanical tracer is available from the Electronics Division of Seneca Falls Machine Co. of Seneca Falls, Wisconsin. Suitable electrical signaling systems which may be employed in the invention are shown and described in detail in U.S. Pat. Nos. 2,959,191 and 3,017,863. A suitable hydraulic servo drive system adapted for use with a numerical control means is shown and described in detail in U.S. Pat. No. 2,994,304.

For the sake of brevity, the signaling devices used in the description of the method of this invention will be limited to hydraulic tracers, though the aforementioned devices could be used.

Figure 23:
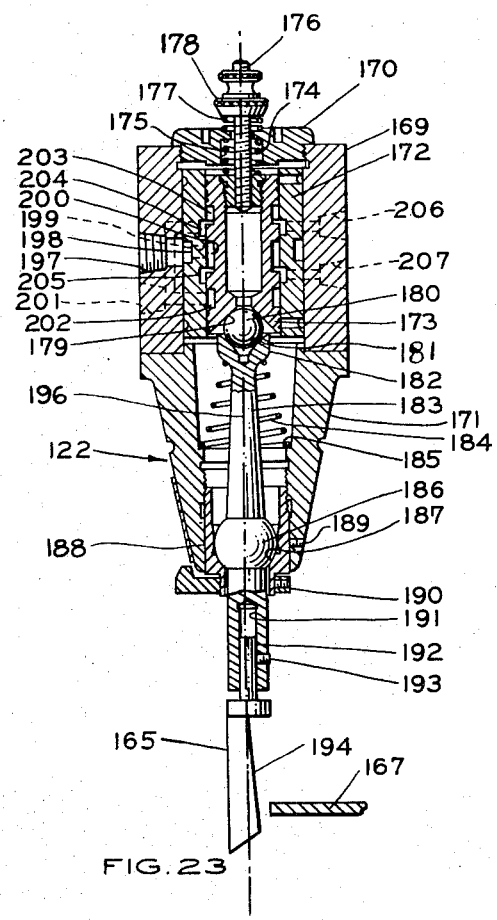
FIG. 23 is an elevational sectional view of a hydraulic tracer adapted for use in practicing the invention.

A suitable, conventional hydraulic tracer 122 is shown in cross section in FIG. 23, and a brief description of the operation of this tracer will suffice since the structure and function of tracers of this type is well known. The tracer 122 is available from the True Trace Corporation, of El Monte, California, as Model No. S-180-DS, and is a type which is intended to control the action of only one cylinder.

As shown in Fig. 23, the tracer 122 comprises the cylindrical body 169, which is enclosed at the upper end thereof by the threadably mounted cap 170. Operatively attached to the lower end of the body 169 is the tubular conical nose 171. A valve sleeve 172 is fixed in the body 169 by any suitable means, and slidably mounted in the sleeve 172 is the valve spool 173. The spool 173 is adapted to control the flow of pressure and exhaust fluid to and from the aforedescribed hydraulic cylinder in accordance with the position of the spool in the sleeve 172.

The spool 173 is adapted to be biased downwardly by means of the control spring 173, which abuts the upper end of the spool 173 and is seated in the recess 175 in the cap 170. Th tension of the control spring 174 may be adjusted by means of the knob 178, which is threadably mounted on the screw 176. The screw 176 is threadably affixed to the upper end of the spool 173, and extends through the cap 179. Mounted around the outer end of the screw 176 is a tension adjusting spring 177, which abuts the cap at one end thereof and the knob 178 at the other end thereon.

The valve spool 173 is adapted to be moved upwardly against the downward bias of the spring 174 by pressure exerted on the ball 180 which has its upper surface seated in the conical seat 179, formed on the lower end of the valve spool 173. The bottom of the ball 130 is seated in the conical seat 181, formed on the upper side of the enlarged head 182 of the tracer spindle 183. The spindle 183 is normally biased into a central position, coaxial with the centerline of the tracer spool 173, by means of the ball 180 and the conical spring 184. The small upper end of the spring 184 abuts the lower side of the enlarged spindle portion 182, and the larger bottom end abuts the internal flange 185, which is formed in the chamber of the conical nose 171.

The spindle 183 is provided with the integral ball-shaped pivot member 186, which is seated in the concave seat 187 that is formed in the sleeve 188. The sleeve 188 is threadably mounted in the lower end of the nose 171, and is secured in position by the lock screw 189. The sensitivity of the tracer valve operation may be adjusted by means of the adjustment arm 190. The spindle 183 extends outwardly of the nose 171 and is provided with the axial bore 191 in which the shank 192 of a sensing element, hereinafter referred to as a stylus, is mounted. The shank 192 of the illustrative blade type stylus 165 is detachably secured in the bore 191 by means of the lock screw 193.

It will be seen that when a template engaging surface 194 of the stylus 165 engages the contoured edge of the template 167 and moves across the same, the spindle 183 will be rocked about the seat 187, thereby moving the ball 180, and consequently moving the tracer valve spool 173 axially relative to the tracer centerline 196.

When the spindle 183 is in coaxial alignment with the centerline 196 of the valve spool 173, the valve spool 173 is biased downwardly by the spring 174, to the position in which fluid is applied under pressure to the rod end of a controlled cylinder (not shown). As shown in FIG. 23, the tracer 122 is provided with the pressure fluid inlet port 197, which would be connected to a pressure fluid supply line. Pressure fluid is passed through the port 197 to the annular passage 198 formed in the sleeve 172, from whence it passes through the passage 199 into the annular recess 200 formed in the outer surface of the valve spool 173. A fluid exhaust line would be connected to the exhaust passage 201, formed in the tracer body 169 and the sleeve 172. The exhaust passage 201 is extended to communicate with the two annular recesses 202 and 203, which are formed in the outer periphery of the valve spool 173. The valve sleeve 172 is provided with the spaced apart annular recesses 204 and 205, which communicate with the ports 206 and 207, from which fluid lines would connect to the opposite ends of a controlled cylinder.

It may be seen in FIG. 23 that the position of the valve spool 173 would direct the pressure fluid from the annular recess 200 into the annular passage 205, and out through the port 207 into a related line and aforementioned cylinder. Simultaneously, fluid is being exhausted from the opposite end of the aforementioned cylinder, through a related line, to the port 206, the annular recess 204, to the port 201, through an exhaust line, and thence back to a reservoir.

When the spindle 183 is deflected, the valve spool 173 will be moved to a null position wherein the flow of pressure fluid between the tracer 122 and a cylinder is stopped. This position would be reached when the spool recess 200 is centrally disposed between the cylinder recesses 204 and 205. Thus it may be understood that the spindle and stylus must be deflected a certain amount in order to stop the motion of a controlled cylinder. Deflection of the stylus and spindle beyond this point will result in continued movement of the spool in an upward direction, whereby the pressure fluid will flow from the annular recess 200 to the annular passage 204, through the port 206, through the related line to the opposite end of a cylinder, thus producing a reverse movement. From the foregoing, it may be understood that a signaling device such as a hydraulic tracer is a fluid valve which is activated by deflection of a sensing element such as a stylus, and the valve mechanism is spring biased to cause the mechanism it controls to position the valve in such a manner as to either deflect the stylus a certain amount, or relieve the deflection of the stylus and thereby cause the valve to close.

THE STYLII

The signaling device, as represented by the hydraulic tracer in FIG. 23, is activated by deflection of the stylus; the stylus is caused to deflect by contacting a surface which tends to displace it. The stylus in general conforms to the shape of the cutter being used, but it is made larger in diameter than the cutter to allow for the deflection required to actuate the tracer valve. In carrying out the method of this invention, cylindrical cutters of various diameters are used for certain operations, and stylii are provided which are basically cylindrically shaped, but are of a slightly larger diameter than the corresponding cutter. Further, the so-called cylindrical stylus actually must be slightly cone-shaped, for reasons which are more fully explained hereinafter.

In carrying out certain other operations in the method of this invention, another particular type of stylus must be used that is hereinafter referred to as a blade-type stylus, which does not in any way conform to the size or shape of the corresponding cutter. For example, in order to cut a three-dimensionally variant line from two-dimensional data such as templates, a pointed cutter, as previously stated, must be used. Referring now to FIG. 24, it will be seen that two of the blade-type stylii as indicated by the numerals 164 and 165 must be used in conjunction with the pointed cutter. The particular shape of the stylii 164 and 165 in FIG. 24 is necessary to properly represent the point of the cutter, and the length of the stylus 165 is necessary to accommodate the axial travel of the stylus, which is more fully explained further on.

In FIG. 24 a fragmentary portion of a model such as the hood panel model 12, and a template holding means 168 are shown in position on the surface of an X-slide such as the table 53. A pointed cutter represented by the conical cutter 208 is shown in operative position on the model, and a long blade-type stylus 165 and a short blade-type stylus 164 are shown in operative positions, respectively, on the templates 167 and 166, which are mounted on the template holding means 168. The point of the cutter 208 is indicated by a numeral 209 and is depicted as establishing a line representing the desired surface 210 at that point, by cutting through the rough surface 211 of the model 12. A hypothetical horizontal level line 212 is taken from the intersection of the desired surface 210 and the centerline of the cutter 208, represented by the point 209, and is projected horizontally to the right, wherein the valid surface of the template 167 is shown on that line. The level line 212 is projected further to the right wherein a section of the contoured edge of the template 166 is shown on the same line. The long blade-type stylus 165 is shown in operative contact with the contoured edge of the template 167 in a deflected position, wherein the centerline 213 of the blade-type stylus 165 is shown in an angled position in relation to the true vertical centerline 214 of the signaling device carrying the stylus 165. A true vertical line 215 is generated from the intersection of the valid surface of the template 166 and the line 212, and it is to be noted that the true vertical lines 214 and 215 are parallel to the centerline of the cutter 208. The short stylus 164 is shown in operative contact with the edge of the template 166 in a deflected position, wherein the centerline 216 of the blade stylus 164 is shown in angular relationship to the hypothetical horizontal level line 212. It is to be noted in FIG. 24 that the contacting edges of the stylii 164 and 165 are shown as contacting the templates 166 and 167 respectively, precisely perpendicular to the plane of their templates and thus may be axially moved without generating a lesser or greater deflection.

Figures 21, 22:
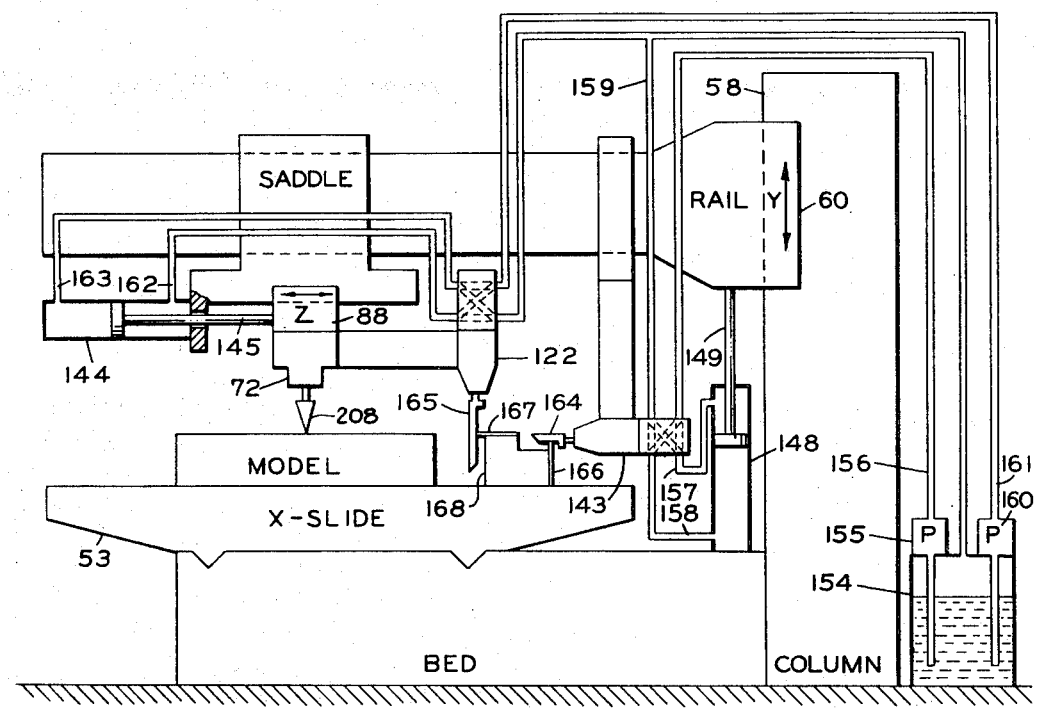
FIG. 21 is a schematic diagram of an illustrative control circuit for the machine illustrated in FIG. 11.
FIG. 22 is a schematic diagram of an illustrative control circuit for the machine illustrated in FIG. 12.

Referring to FIG. 21, which may be considered for the purpose of this explanation as a total view of the fragmentary arrangement shown in FIG. 24, it may be seen that the long blade-type stylus 165 is affixed to the XZ-tracer 122, which is mounted by the means previously described in FIG. 18 to the tool head 72, and thereby will move with the tool head 72. The tool head 72 not only will be moved horizontally by action of the cylinder rod 145, but will also be moved vertically with the Y-slide rail 60, as it is moved by action of the cylinder rod 149. The short blade-type stylus 164 may be seen affixed to the XY-tracer 143, which is mounted by the means previously described in FIG. 13 to the Y-slide rail 60, and will move with the rail as it is moved. The stylus 164 therefore has only a vertical movement, and does not move horizontally during a machining operation but may be axially repositioned before a machining operation.

Referring to FIG. 24, it will be understood from the foregoing that the stylus 165 has an axial vertical travel during a three-dimensional machining operation, and the lowest position of the stylus is indicated by the numeral 217 and the highest position is indicated by the numeral 218. The stylus 165 is adjusted at the beginning of a machining operation, through the means previously described in FIG. 18, so that it may axially raise and lower in unhindered contact with the contoured edge of the template 167 as it traverses the length of the template. In contrast, the short blade-type stylus 164 does not have an axial movement during the machining operation, and consequently may be much shorter than the stylus 165, although it is identical in all other characteristics.

Referring now to FIG. 26, the long blade-type stylus 165 may be seen affixed to a fragmentary portion of the tracer valve 122, in contact with the contoured edge of the template 167. The stylus 165 is depicted in a non-deflected position, wherein the true centerline 213 of the stylus is coaxial with the true centerline 196 of the tracer valve 122. Advantageously, the blade-type stylus 165 has a definite taper throughout its length, in relation to the true centerline 213 and the contacting edge 194. The taper as depicted in FIG. 26 is exaggerated for the sake of clarity, but in actual practice it is a very subtle taper, being approximately six-thousandths of an inch per inch of length, depending upon the peculiarities of the particular tracer valve used.

In explanation of the reason for the taper of the blade-type stylii, it is to be recalled that the deflection of the stylus determines the position of the spool in the tracer valve, and the tracer valve is biased so that the fluid will be passed to a cylinder if the stylus is in a non-deflected position. The cylinder to which the fluis is passed will move the tracer valve and the related stylus so as to cause the stylus to deflect to the position whereby the valve is closed. Therefore, it may be said that the stylus will always tend to seek a deflected position, and will always be deflected a certain amount when in contact with an object. As best seen in FIGS. 21 and 24, as the X-slide table 53 is moved, the template 166 will pass under the stylus 164. An upwardly inclined edge of the template 166 will deflect the stylus 164, thus causing the tracer valve 143 to pass fluid to the Y-cylinder 148, and the cylinder rod 149 will move the Y-slide rail 60 and the tracer valve 143 upward until deflection of the stylus 164 is relieved. The tracer valve 122 and the stylus 165 will also move upward at the same time. As cam best be seen in FIG. 24, the taper of the contacting surface 194 in relation to the true centerline 213 of the blade type stylus 165 serves to keep the tracer valve closed as the axial position of the stylus 165 changes in relation to the template 167, and consequently the critical distance between the centerline of the cutter 208 and the contoured edge of the template 167 remains precisely the same at any given point.

In contrast to the foregoing, when axial movement takes place during a machining operation, and a stylus is utilized which does not have a contacting edge which tapers in relation to the centerline of the stylus, an undesirable movement of the cutter in relation to the controlling template will result. In explanation, it may be seen that as the tracer valve 122 is raised, a lower section of the stylus will be in contact with the contoured edge of the template 167, and a lesser amount of deflection will be generated if the stylus does not have the aforementioned taper. Conversely, as the tracer valve 122 is lowered, an upper section of the stylus will be in contact with the contoured edge of the template 167 and a greater amount of deflection will be generated. Either action will cause fluid to pass to the cylinder 144, which will cause the rod 145 to move the Z-slide 88 and its attached equipment, including the tracer valve 122, until the stylus is again deflected to the position which closes the valve. Thus, the undesirable movement of the Z-slide 88 would reposition the cutter 208, and consequently the critical distance between the centerline of the cutter 208 and the contoured edge of the template 167 would be adversely changed, and would produce a cut which does not conform to the contour of the template 167.

Although the blade stylus 164 does not have an axial movement during the cutting operation, the blade still is provided with the same taper due to the fact that the tracer valve 143 may not be always positioned in the same relationship to the template 166, and consequently the amount of deflection would vary. Therefore, the taper in the short stylus 164 is required just as much as the taper for the long stylus 165.

The blade-type stylus 165 depicted in FIG. 26 further includes features which accommodate certain conditions encountered in carrying out the method of this invention. An upper section through the blade of the stylus 165 in FIG. 26 is taken at the line 27-27, and a lower section is taken at the line 28—28, both looking in the direction of the arrows. Referring now to FIGS. 27 and 28, it will be seen that the contacting surface 194 of the stylus 165 is in contact with the contoured edge 219 of the template 167, and that the contacting surface 194 is formed with a constant radius generated from the intersection of the centerline 213 and the coordinate centerline 220. The distance from the centerline 213 to the contoured edge 219 of the template 167 in FIG. 28 will be seen to be increased from the distance shown in FIG. 27, which is due to the aforementioned taper. The contacting surface 194 is rounded in a smooth radius to permit a sidewise contact of the stylus with a contoured edge such as is shown, which will result in the same amount of deflection of the stylus no matter where the tangent point of contact may be within 180°, and consequently will insure that the cut line conforms precisely to the template line. From the foregoing description of the structure of the stylii 164 and 165 it is apparent that the stylii comprise an axially bisected conical contacting surface formed on a rigid support.

FIG. 25 is projected from and shown above FIG. 24 and shows the relationship of the blade stylii to a conical cutter in a plan view, looking down on the arrangement of FIG. 24, as they would be set up for a machining operation. FIG. 25 represents a cross section taken at the level of a line 212 as shown in FIG. 24, and the line 212 is shown connecting the cutter 208, the blade stylus 165, and the blade stylus 164. The numeral 209 designates the point of the cutter at the level of the line 212, and the numeral 221 to the right designates the intersection of the true vertical centerline 214 with the line 212, and the numeral 222 designates the intersection of the true vertical line 215 with the centerline of the blade stylus 164, which coincides with the line 212. The significant point to be noted in FIG. 25 is that the cutter and the stylii are on the common line 212, and this line is precisely parallel to the face of the Y-slide rail 60.

THE AUTOMATIC CONTROL SYSTEM

The aforedescribed semi-automatic machines used in carrying out the method of this invention are shown as having the movements of the Z- and Y- components controlled by automatic means during the machining operations, while the movement of the X-component progresses in the direction and at the speed selected by the operator.

The automatically controlled components of the machines illustrated in FIGS. 11 and 12 are similar in that they are powered and controlled to move in the same directions, but are physically different structures.

As best seen in FIG. 13, the pivot slide 88 of the machine illustrated in FIG. 11 is powered along the dovetail ways 92 on the slide base 93 by the hydraulic cylinder 144, which is fixed to one end of the slide base 93 with the rod 145 thereof fixed to the pivot slide 88. The operation of the hydraulic cylinder 144 is controlled by the XY-tracer 122 as seen in FIG. 18, which is activated by the deflection that is produced through engagement of a stylus (not shown) with the contour of an XZ-template which is described hereinafter.

In the machine structure shown in FIG. 12, the Z-slide ram 71 is powered backwardly and forwardly by means of the hydraulic Z-cylinder 146 which is fixed to the Z-slide ram 71, and the cylinder 147 is fixed to the base column 68. The operation of the Z-cylinder 146 is controlled by the XZ-tracer 122 in the same manner as the XZ-tracer 122 in FIG. 18 controls the Z-cylinder 144 for the machine illustrated in FIG. 11.

As shown in FIG. 11, the Y-slide rail 60 is powered upwardly and downwardly on the ways 59 by means of the hydraulic Y-cylinder 148 which is fixed to the base of the Y-column 58, and te rod 149 that is fixed to the Y-slide rail 60. The operation of the Y-cylinder 148 is controlled by the XY-tracer 143 and the XY-template as described hereinafter.

In FIG. 12, the Y-slide knee 64 is powered upwardly and downwardly by the Y-cylinder 150 which is fixed to the base column 68 and the rod 151 of the Y-cylinder 150 that is fixed to the Y-slide knee 64. The operation of Y-cylinder 150 is controlled by the XY-tracer 143 and the XY-template hereinafter described.

The machine shown in FIG. 12 is provided with conventional hand wheel adjustment means 152 and 153 for precisely adjusting the X-slide table 63 longitudinally and transversely, respectively, to position a model disposed on the X-slide table 63 in a desired relationship to the tool head.

It will be understood that all of the machine components hereinbefore described which are involved in the machining of a model are provided with the aforedescribed manual means for precise positioning of these components in an initial starting position from which the operator of the aforedescribed tracer control mechanism thenceforward controls the movements of said components.

FIGS. 21 and 22 are schematic control diagrams for the machines illustrated in FIGS. 11 and 12, respectively. As previously stated, certain components of these machines must be under the control of signaling devices which are activated by two dimensional data in order to carry out certain steps of the method of the present invention.

Referring now to FIG. 21, it will be understood that the movement of the X-slide 53 is under the control of the machine operator, while the Y and Z movements are automatically controlled. The automatic control system for the Y and Z movements includes the hydraulic fluid reservoir 154 on the top of which is operatively mounted a Y-pump 155. The Y-pump 155 takes fluid from the reservoir 154 and forces it under pressure through the hydraulic feed line 156 to the valve portion of the XY-tracer 143. According to the position of the valve in the XY-tracer 143, the fluid will either pass through the hydraulic feed line 157 or 158, to respectively move the cylinder rod 149 upwardly or downwardly. The upward and downward movement of the cylinder rod 149 will raise or lower the Y-slide rail 60 on the column 58 in accordance with the position of the valve in the XY-tracer 143. Assuming that the hydraulic fluid under pressure is being admitted into the upper end of the cylinder 148 through the line 157, the hydraulic fluid in the lower end of the cylinder 148 will be exhausted through the hydraulic line 158, directed through the valve on the XY-tracer 143, and thence through the exhaust line 159 back to the reservoir 154.

It will be understood that in the control system shown in FIG. 21 that the inherent operation of the tracer causes the Y-slide 60 always to feed downward unless acted upon to produce an upward or holding movement. Therefore, in this arrangement the stylus 164 attached to the XY-tracer 143 is always maintained in contact with the contoured edge of the template 166. The template 166 is mounted on the X-slide 53 by the template positioning means 168, and relative movement between the template 166 and the stylus 164 is produced by the movement of the X-slide 53. As the contoured edge of the template 166 tends to displace the stylus 164, a minute deflection is produced which alters the position of the valve in the XY-tracer 143, thus producing the resultant motion in the Y-slide 60. For example, when the stylus 164 is in contact with a horizontal portion of the contoured edge of the template 166, it is deflected to the position whereby the valve is closed, and no fluid can pass through either the line 157 or 158, and the Y-slide 60 is maintained in a holding position. When the stylus 164 contacts an upwardly directed or sloping portion of the contoured edge of the template 166, it will be deflected to the position whereby the valve is opened and will pass fluid under pressure through the line 158 and exhaust fluid through the line 157, which will move the cylinder rod 149 and the Y-slide 60 upwardly. When the stylus 164 contacts a downwardly sloping portion of the contoured edge of the template 164, the valve in the XY-tracer 143 will inherently be moved in the opposite direction to keep the stylus in contact with the contoured edge, thereby exhausting fluid from the cylinder 148 through the line 158 and admitting fluid under pressure to the line 157 so as to move the cylinder rod 149 and the Y-slide 60 downwardly. The XY-tracer 143 is affixed to the Y-slide 60 by means of the aforedescribed XY-tracer positioning mechanism as shown in detail in FIG. 13, and it will be understood that these two components move in a vertical direction as a single unit.

As shown in FIG. 21, the reservoir 154 also supports a hydraulic Z-pump 160, which is adapted to take fluid from the reservoir 154 and force it under pressure through the hydraulic feed line 161 to the valve portion of the XZ-tracer 122. The valve of the XZ-tracer 122 selectively feeds the fluid under pressure to either the line 162 or 163 to the hydraulic cylinder 144 to respectively move the cylinder rod 145 and the Z-slide 88 in accordance with the position of said valve. If the fluid is being admitted into the cylinder 144 through the line 162, the fluid in the opposite end of the cylinder is exhausted through the line 163 and directed through the valve of the XZ-tracer 122 and thence to the exhaust line 159 and back to the reservoir 154. The XZ-tracer 122 functions in the same manner as the aforedescribed XY-tracer 143, and causes the tool head 72 to be moved in a transverse direction relative to the X-slide 53. The XZ-tracer 122 is adjustably connected to the pivot head by the aforedescribed tracer adaptor mechanism shown in FIG. 18. The XZ-tracer 122 is shown as being provided with a blade-type stylus 165. The stylus 165 contacts the contoured edge of the XZ-template 167 which is mounted on the template holding means 168 on the X-slide 53.

FIG. 22 is a schematic diagram of the control circuit for the machine shown in FIG. 12. The parts of the control circuit of FIG. 22 which are similar to the parts of the control circuit of FIG. 21 are marked with the same reference numerals. It will be understood that the movement of the X-slide 63 is under the control of the operator of the machine in a similar manner as the control of the movement of the X-slide 53 for the machine of FIG. 21. The XZ-tracer 122 controls the movement of the Z-slide ram 71 in the same manner as described for the XZ-tracer 122 and Z-slide 88 in FIG. 21, and is attached to the tool head 72 by the same means as shown in FIG. 21. The XZ-tracer 122 is actuated by the same type of template arrangement described in FIG. 21, with the exception that the template 167 is illustratively mounted on a separate mounting means 168. The Y-slide knee 64 is under the control of the XY-tracer 143 in the same manner as described for the Y-slide 60 and XY-tracer 143 in FIG. 21. However, the XY-tracer 143 shown in FIG. 22 is mounted to the base column 68, and does not move with the Y-slide knee 64. It will also be seen that the template 166 is illustratively mounted on a separate mounting means 168.

Although the automatic control circuits are the same, there is a difference in the physical arrangement between the machine structures of FIGS. 11 and 12 which is clearly seen in FIGS. 21 and 22. That is, in the machine structures shown in FIGS. 11 and 21, the tool head 72 is moved upwardly and downwardly relative to the X-slide 53, while in the machine structure illustrated in FIGS. 12 and 22 the X-slide 63 is moved upwardly and downwardly relative to the tool head 72. It will be understood that other variations in the physical arrangement of such machines are possible, but the automatic control circuit will be basically unchanged.

It is to be understood that the aforedescribed arrangement is only one of several possible. For instance, it may be desired to provide an arrangement wherein the controlling data is mounted on a stationary component of the machine, and the signaling device is mounted independent of the tool head. The signaling device and the tool head are each separately mounted and powered to change position, but are in precise synchronization, and the movement of the signaling device in relation to the controlling data produces signals which are transmitted to the motive means of the tool head, and the tool head is caused to duplicate the relative movement of the signaling device. An alternate but similar arrangement may be used, wherein the arrangement is the same except that the tool head remains stationary, and the component on which the model is mounted is caused to move by the signals from the signalling device, and the relative movement of the tool head to the model duplicates the relative movement of the signaling device to the controlling data.

From the foregoing description, it will be understood that the automatic control system is insensitive to the aforementioned specific inaccuracies of the controlling templates which formerly produced aberrations of the desired surface of the model. Due to the tracer mechanisms employed in the automatic control system, only a change of contour on the contoured edge of a template will produce deflection of the tracer stylus and the resultant cutter movement. The tracer is therefore insensitive to any warpage in the plane of the template, as previously described, since such warpage is always at 90° to the only direction of change that can activate the tracer, namely, the direction of change in the contoured edge of the template.

THE CUTTERS

Figure 29:
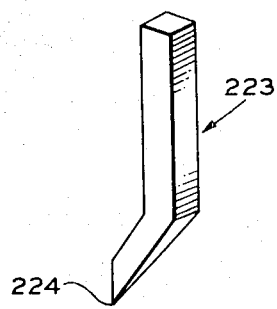
FIG. 29 is a perspective view of a pointed tool which cuts by a linear action.

Various tools are utilized in the practice of the method of this invention to produce lines or surfaces. Cylindrical cutters, as previously mentioned, are used to produce surfaces, and pointed cutters are used to primarily produce lines, but may also be used to produce certain surfaces. The previously mentioned conical cutter cuts with a rotary action, and may produce either lines or surfaces. Another type of pointed cutter may also be used, as illustrated in FIG. 29, wherein the numeral 223 designates a pointed cutter which cuts by a linear, reciprocating action, and the cutting point is designated by the numeral 224. This cutter would primarily be used to cut surfaces, but may also cut certain lines.

Certain surfaces on master models, such as the "curved ribbon" type previously mentioned, occur in the configuration of a model, and frequently exist as a series of conterminous stepped contours. These surfaces are of a three-dimensionally variant nature, but maintain a constant cross section, which means that the relationship of the size, shape and arrangement of the conterminous surfaces to each other does not change from one cross section to another.

In carrying out the method of this invention, it is expedient to provide a special cutter which is capable of cutting such multiple surfaces in one operation. This cutter is referred to hereinafter as a "form cutter," and its form is derived from the combined characteristics of the shape of the surfaces to be cut and the plane of rotation of the cutter. This means that the cutting profile of the cutter does not necessarily conform to the cross section of the surface at any particular point, but rather that the shape of the surface is generated by a progressive cut, and although it does not conform to the profile of the cutter, it will precisely conform to desired profile as specified on the engineering drawings.

Figure 30:
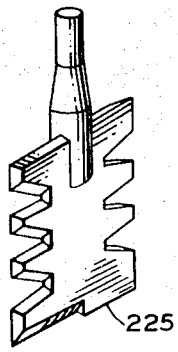
FIG. 30 is a perspective view of a rotary form cutter for cutting multiple surfaces.

A complex form cutter is indicated by the numeral 225 in FIG. 30, which is adapted to cut multiple surfaces which are varient in three dimensions. By the methods of the prior art, these multiple surfaces would have to be arduously cut by hand. The form of the cutter 225 in FIG. 30 is carefully derived from the shape of the surfaces to be cut, and although this is a complex operation requiring skill and time, it is much less costly to produce such a cutter to cut multiple three-dimensionally variant surfaces in one operation, than it is to attempt to produce such surfaces to close tolerances by the prolongated hand methods of the prior art.

THE ROUGH MODEL

The first broad step in the method of making master models in accordance with the principles of the present invention is the providing of a rough model. In FIG. 35, such a rough model is indicated by the numeral 238. The rough model 238 is similar to the finished model 12 as depicted in FIG. 2, in that it comprises a body and a base structure 28. However, the rough body 239 in FIG. 35 has been rough-formed to an oversize semblance of the final body 27 to provide sufficient material for finishing the rough body 239 to the desired form as represented by the final body 27 in FIG. 2.

The rough body 239 is made from any suitable workable material, as, for example, wood, or a plastic material having wood-like qualities. The rough body 239 may comprise a plurality of joined pieces, or it may be a homogenous mass, as for example when it is cast from a plastic material. The rough body 239 may be located with dowels, and attached to the base structure 28 by any suitable means, as for example permanently gluing, or by detachably mounting it with wood screws or the like. The rough body 239 may be initially rough-formed by hand working or hand machining the surface in approximate conformation to engineering data. In the rough model 238 illustrated in FIG. 35, the rough surfaces are depicted as being a series of conterminous flat planes 240 wherein the lines 241 and 242 illustrate the transverse and longitudinal boundaries of the conterminous flat planes 240. It will be understood, however, that this is only one configuration which a rough model may assume.

The illustrative base structure 28 of the model shown in FIG. 35 is also initially built to an oversize semblance of the desired final form. In order to position the rough model 238 on the machine in FIG. 11 for the hereinafter described machining steps of the method of the present invention, the base structure 28 is provided with precise reference planes or surfaces. The bottom surface of the base structure 28 is first machined to a precise flat plane. The outer surfaces of the front, rear and side walls are then machined to precise flat planes perpendicular to each other and the bottom surface. The machining of the side and bottom surfaces of the base structure 28 may be carried out on any machine having the capacity to receive the size of the base structure involved, and the accuracy to machine the said surfaces in a precise manner. Many machines available on the market may be used to carry out this surface machining operation, as, for example, a planer mill. However, the machine illustrated in FIG. 11, which is adapted to carry out the principles of the present invention, is particularly adapted to carry out the aforedescribed surfacing operations with greater facility than the other conventional aforementioned machines.

After the base structure 28 has been machined to a precise configuration, the rough model body 239 is then attached to the base structure 28 as previously described, in approximate relationship to the reference planes of the base.

A rough model, as shown in FIG. 35, is produced in accordance with a method wherein the rough body 239 is formed to an oversize semblance of the final form by producing the plurality of flat planes 240, roughly conforming to the desired shape of the model. This type of rough model is the same as would be required for producing the model by only the hand methods of the prior art. In carrying out the method of this invention, whereby the rough body 239 is machined to controlling templates, it is possible to eliminate the aforementioned rough forming operation, and only large blocks of wood need be used to form the rough body 239 in such a manner that it would bear little semblance to the desired form.

FIG. 34 depicts a cross section through such a model. The cross section would be taken along the same plane, or 20 inch line, as shown in FIG. 4 on the hood panel die model. In FIG. 34, the outline of the rough model in general is denoted by the numeral 243, and the upper surfaces are denoted by the numeral 244. The desired final surface is denoted by the phantom line 245. As can be seen in FIG. 34, the excess stock represented by the exterior lines 244 is considerably different from the desired form denoted by the line 245.

The transverse cross section planes as noted from zero to 55 occur every five inches, and templates are made to correspond to these cross section lines, which are subsequently cut into the rough model 243. Although the previous illustrations have only shown cross sections at the 10 inch lines for the sake of clarity, it is to be understood that on such a model the longitudinal and transverse cross section lines are generally produced every five inches.

The rough model 243 shown in FIG. 34 would be processed by first cutting the transverse cross section line marked zero. The sequential cross section lines 5 through 55 are cut in the same manner from their corresponding templates. The producing of the final surface, by hand carving down the intermediate surface between the cross section lines, obviously may be expedited by removing as much of the excess stock as possible. Rather than the additional operation of cutting the flat planes, indicated by the numeral 240 in FIG. 35, the excess stock can be removed from an extremely rough model such as indicated in FIG. 34 by machining it away at the same time the cross section lines are cut. This may be accomplished by first cutting a transverse or longitudinal section line from a related template, and then cutting the surfaces indicated by the numeral 246 in relation to the same template. Each succeeding line and surface is cut from a single template by moving the cutter out to the next template line, which will produce the stepped surface as seen in FIG. 34. By this process the greater part of the excess stock on the model is removed, leaving only a small portion to be removed by the hand methods of the model maker.

THE FRONT AND REAR PERIPHERAL CONTOUR SURFACE CUTS

The second broad step in the method of making master models in accordance with the invention is the automatic machining of guide lines and surfaces in the rough body of a model from two-dimensional data. It is to be understood that in the broad steps of automatically machining lines and surfaces, the various machining operations comprising the broad steps may be carried out in any selectively different order than in the order illustrated and hereinafter described in the present invention.

In FIG. 35 a machining operation is depicted in a diagrammatic perspective view such as would be seen by the operator of the machine depicted in FIG. 11. For the purpose of clarity, in the view of FIG. 35 and the subsequent views of FIGS. 37 through 47, only the model, the tool head, the template mounting means, the related templates, the signaling devices, certain tool head attachments, cutters and related stylii are shown, and the basic machine structure which has been previously illustrated is eliminated. The movements of the three basic machine components are denoted in these views by arrows which indicate the direction of the component movements, and are identified by the letter corresponding to the particular movement. It will be understood that the direction of the movement of the X-slide is indicated by the arrow X, and the direction of the movement of the Y-slide is indicated by the arrow Y, and the direction of the movement of the Z-slide is indicated by the arrow Z. It will be further understood that the model 238 is positioned and retained on the X-slide such as the table 53 of the machine in FIG. 11 by any suitable means disposed in the T slots 56 and 57, and secured to the base structure 28 of the model. It is to be noted that full templates are shown in FIG. 35 for the sake of clarity, but it will be understood that half-templates, as previously stated, may be used.

The machining operation as depicted in FIG. 35 is intended to produce only a two-dimensionally variant surface corresponding to the plan view of the front peripheral character line 21, as shown in the plan view of FIG. 3, but the arrangement depicted in FIG. 35 is actually the arrangement required to produce a three-dimensionally variant surface. The surface that will be produced by this machining operation must conform only to the XZ-template 247, but the XY-template 248 is used to raise and lower the cutter 249 in such a manner that the front edge 250 of the rough model 238 will be totally covered by the cutter 249, and only one movement of the X-slide would be required to complete the machining cut and a long cutter is not required. It is to be noted that the front peripheral contour surface 251 is not the final surface to be produced on the model in this area, but comprises the first step in the forming of the front peripheral character line 21 of the final model.

It will be recalled from a previous description that a contoured edge is produced on a template in relation to reference planes. These reference planes are represented on the templates 247 and 248 in FIG. 35 by the edges 252 and 253. The templates are positioned on the template mounting means 268 and the reference edges 252 and 253 are aligned in precise relationship to the front and side reference planes of the model base structure 28. The templates are retained in place on the template mounting means 168 by any suitable means such as C-clamps.

A cylindrical cutter 249 is shown operatively mounted in the quill 76 of the tool head 72, and is shown in greater detail in FIG. 36. A related substantially cylindrical stylus 254 constructed with an outwardly tapering cylindrical surface corresponding to the taper of the stylii 164, 165 is shown operatively mounted in the XZ-tracer 122. A short blade type stylus 164 as previously described is shown operatively mounted in the XY-tracer 143.

The tool head 72 is then positioned on the Y-slide rail 60 so as to align the surface of the cutter 249 with the point 255, which is the starting point for forming the front peripheral contour on the body 239. It is to be understood that although the cutter is depicted as having started at the point 255, it may be started at some other point along the desired surface, such as the centerline point at the front of the model, or at the opposite end of the desired surface, and the direction of movement of the X-slide would be reversed from the direction indicated by the arrow X in FIG. 35. The XZ-tracer 122 is positioned by means of the structure shown in FIG. 18, so as to place the surface of the stylus 254 at the template starting point 256, and the XY-tracer 143 is positioned by means of the structure shown in FIG. 13, so as to place the contacting surface of the stylus 164 at the template starting point 257. The front peripheral contour 251 of the model 239 is then cut in accordance with the configuration of the contoured edge of the template 247, in the following described manner.

The aforedescribed automatic control system is energized, and the cutter 249 is rotated by means of the motor 74 on the tool head 72. The operator then activates the X-slide table 53 to move in the direction of the arrow X, at a speed which is selected in accordance with proper machining practice, taking into consideration the nature of the cutter and the type of the material to be cut, and the configuration of the surface to be cut. The operation of the X-slide table 53 moves the templates 247 and 248 and the model 239 past the respective stylii 254 and 164 and the cutter 249, until these members reach the terminal points 258, 259, and 260, respectively, on the template and the model. At this point the automatic operation of the tracer control system is stopped by the operator, and the machine is manually operated to cause the cutter 249 and the stylii 164 and 254 to respectively clear the model 239 and the templates 247 and 248.

The model 239 in FIG. 35 is further depicted as being provided with a rear peripheral contour surface 261, as indicated by the phantom outline of the tool head 72 shown at the rear of the model 239. It will be understood that the rear peripheral contour surface 261 for this particular model is cut with the same cylindrical cutter 249 and related stylii 254 and 164, but the templates 247 and 248 would of course be replaced with a set of templates corresponding to the rear peripheral character line 26. Due to the fact that the hood panel model 239 is of considerable length, the XZ-template corresponding to the plan view of the rear peripheral character line 26 may have to be positioned at the rear of the model in close proximity to the tool head 72, and mounted on a separate template mounting means similar to template mounting means 168 at the front of the model. Or, an alternate arrangement may be made wherein the XZ and XY templates would remain in the position shown in FIG. 25, and the model 239 may be turned horizontally 180° on the X-slide table 53 from the position shown, and the cutting of the rear peripheral character line would then proceed with the tool head 72 in the same position as shown in FIG. 35.

THE FRONT AND REAR UPPER CONTERMINOUS SURFACE CUTS

Figure 37:
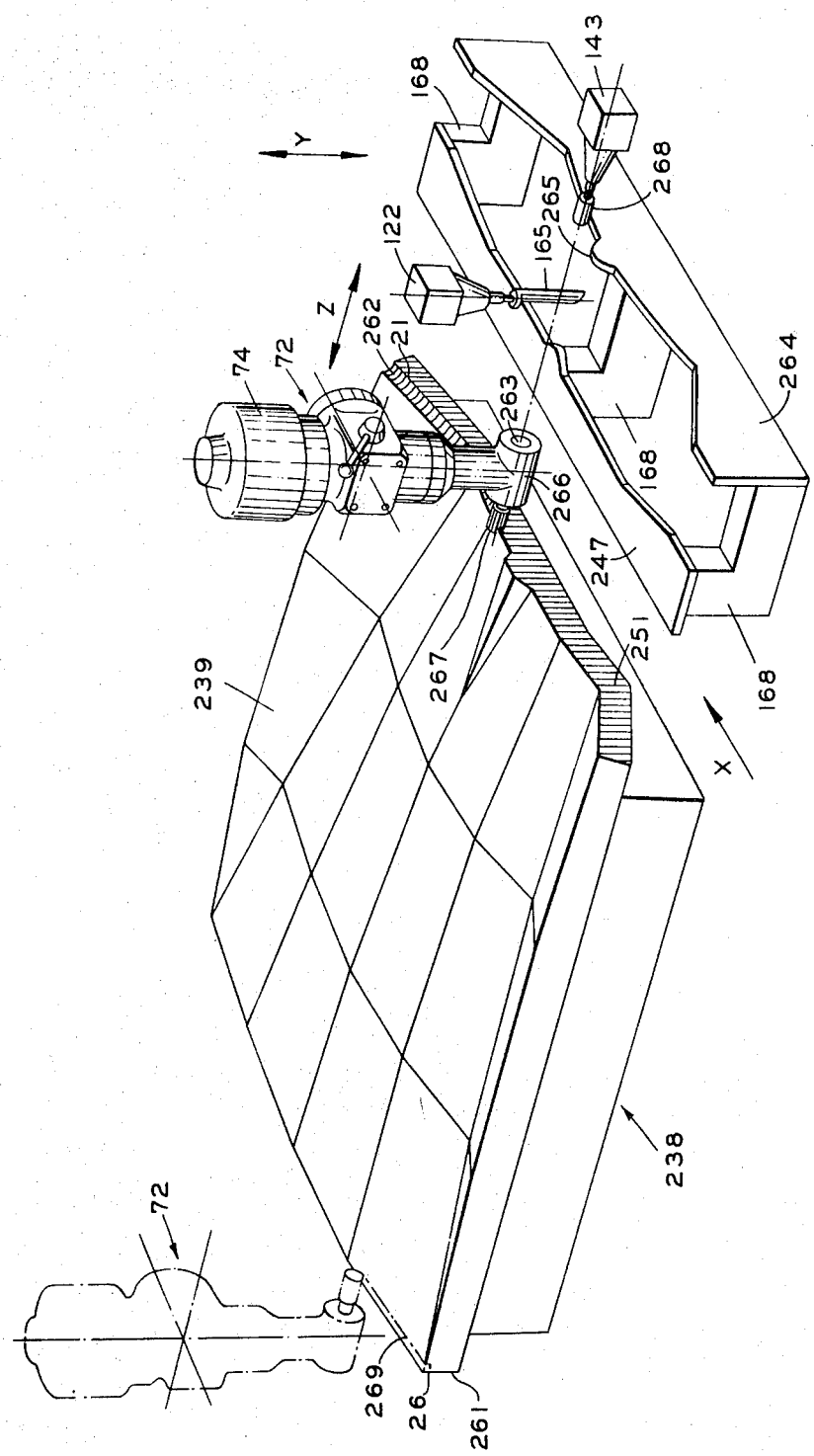
FIG. 37 is a diagrammatic perspective view depicting the cutting of the front conterminous surface on the model illustrated in FIG. 35.

As depicted in FIG. 37, the model 239 may next be machined to provide a front upper surface 262 which is conterminous to the front peripheral contour surface 251, thereby producing the front peripheral character line 21. The surface 262 will only be approximately ten thousandths of an inch wide, to avoid removing any of the desired surface which will later be produced in relation to the resultant front peripheral character line 21.

The arrangement depicted in FIG. 37 will be seen to be basically the same as the arrangement of FIG. 35. The model 239, the template holding means 168, and the XZ-template 247 remain in the same position on the X-slide table 53, and the XZ-tracer 122, the XY-tracer 143, and the tool head 72 are in the required relationship to the templates and model.

The XY-template 264 which incorporates the center contour 265 replaces the XY-template 248 as seen in FIG. 35, which did not incorporate such a contour. A conventional right angle drive attachment 266 which is manufactured by the aforementioned Bridgeport Machine Company is shown operatively mounted on the tool head 72. A cylindrical cutter 267 which has a smaller diameter than the cylindrical cutter 49 of FIG. 36 is operatively mounted in the attachment 266, and a related substantially cylindrical stylus 268 having an outward taper corresponding to stylus 254 replaces the blade stylus 164 in the XY-tracer 143. A long blade type stylus 165 replaces the cylindrical stylus 254 in the XZ-tracer 122.

The tool head 72 and the tracers 122 and 143 would be positioned at selected starting points as previously described, and the cutting of the front upper conterminous surface would proceed in the same manner as described in FIG. 35 for the cutting of the front peripheral contour surface 251.

A rear upper surface 269 which is conterminous to the rear peripheral contour surface 261 may next be provided, to produce the rear peripheral character line 26. This machining operation would proceed basically the same as the operation described for cutting the rear peripheral contour surface 261 in FIG. 35, and the relocation of the tool head and related XZ-template to the rear of the model, or the repositioning of the model, may be done if desired.

Due to the condition that the final desired conterminous surface in this area will slope downwardly away from the rear peripheral character line 26, the rear upper conterminous surface 269 may be much wider than the front upper conterminous surface 262, thereby quickly removing excess material which would have to be otherwise removed by laborious hand methods. It will be understood that in the process of cutting the rear upper conterminous surface 269 that the right angle drive attachment 266 on the tool head 72 must be turned 180° horizontally from the previous position, or the cutter 267 must be replaced in the opposite end 263 of the right angle drive attachment 266.

THE RIGHT AND LEFT SIDE PERIPHERAL CONTOUR SURFACE CUTS

Figure 38:
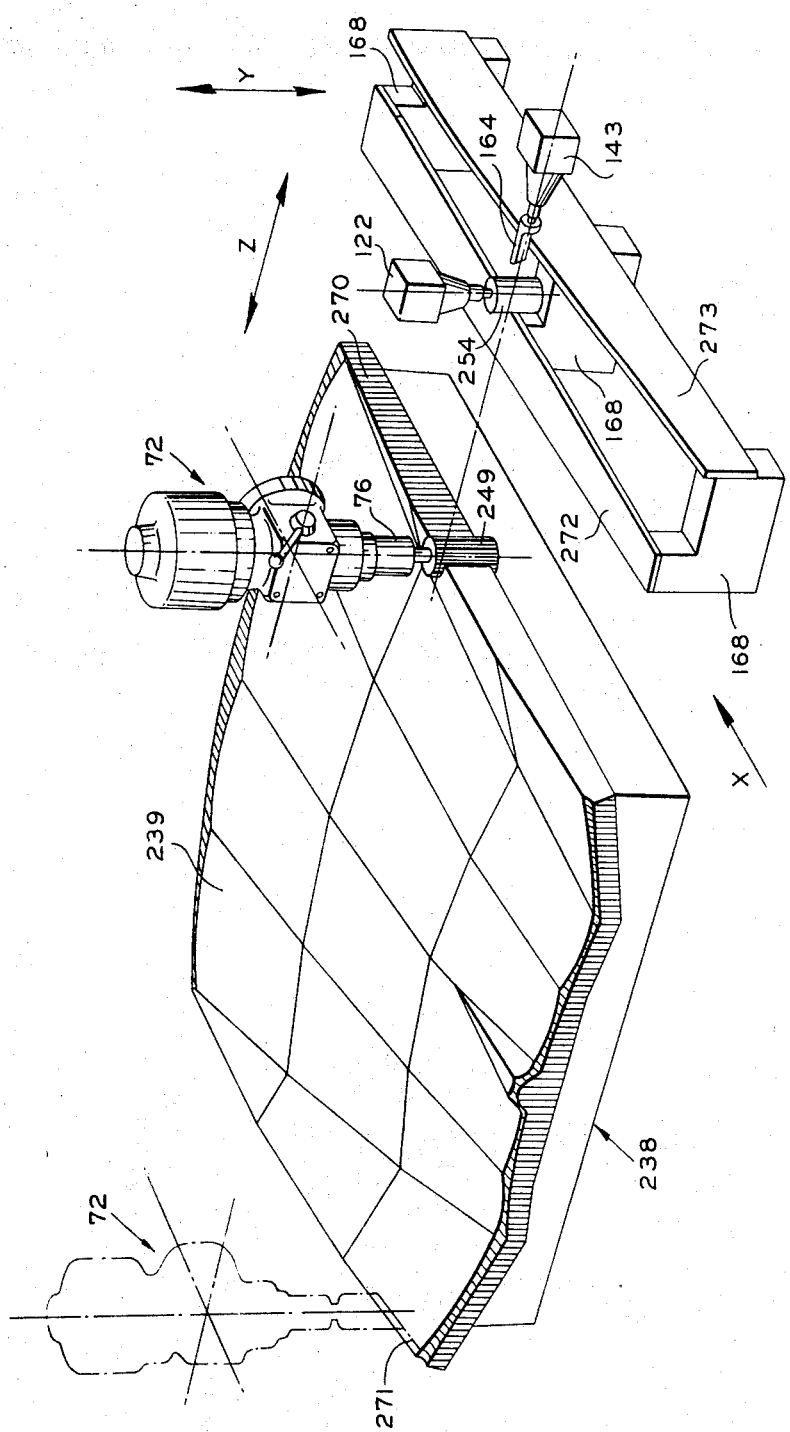
FIG. 38 is a diagrammatic perspective view depicting the cutting of a side peripheral surface on the model illustrated in FIG. 37.

A side peripheral contour surface 270 on the body 239 may next be cut, as shown in FIG. 38. The machining operation depicted in FIG. 38 is similar to the machining operation of FIG. 35, in that it is intended to produce only two-dimensionally variant surfaces corresponding to the plan view of the side peripheral character lines 24 and 25, as shown in the plan view of FIG. 3. Also, it is to be noted that the side peripheral contour surfaces 270 and 271 are not the final surfaces to be produced on the model in those areas, but comprise the first operation in producing the side peripheral character lines 24 and 25 of the final model.

The model 239 in FIG. 38 is turned 90° horizontally on the X-slide table 53 from the position last shown in FIG. 37, and is positioned and retained as previously described. The right angle drive attachment 266 is removed from the tool head 72, to permit mounting the cutter in the spindle 76. The templates 247 and 264 are removed from the template mounting means 168, and an XZ-template 272 and an XY-template 273 corresponding to the plan and side view, respectively, of the side peripheral character lines 24 and 25, are aligned and retained as shown in FIG. 38 on the template mounting means 168. The same cutter 249, stylii 254 and 164, and tracers 122 and 143 as used for the machining operation of FIG. 35 will again be used. The cutter 249 and stylii 254 and 164 will be positioned at starting points as previously described, and the machining operation depicted in FIG. 38 will then proceed the same as the machining operation of FIG. 35.

After the left hand side peripheral contour surface cut is completed, the XZ-template 272 will be reversed to correspond to the position for the right hand side, and the cutting of the right hand side peripheral contour surface 271 may proceed. Again, the tool head 72 and the XZ-template 272 may be moved to the opposite side of the model, or the model may be turned 180° horizontally on the X-slide table 53, in which case the templates 272 and 273 would also be turned 180°.

THE RIGHT AND LEFT SIDE UPPER CONTERMINOUS SURFACE CUTS

Figure 39:
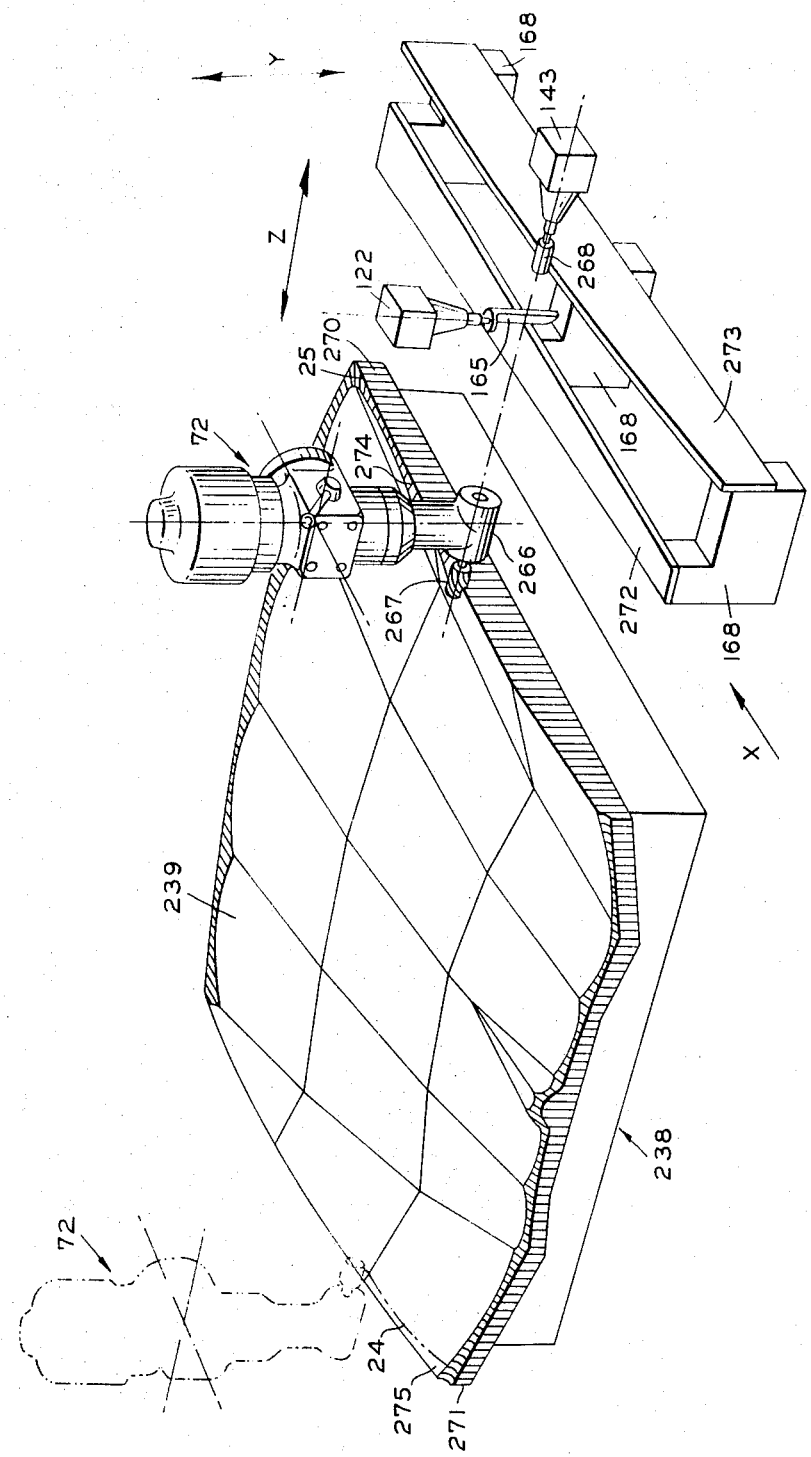
FIG. 39 is a diagrammatic perspective view depicting the cutting of a side upper conterminous surface on the model illustrated in FIG. 38.

In FIG. 39, the model 238 is depicted as being provided with a left side upper surface 274 and a right side upper surface 275 which are conterminous with the left and right side peripheral contour surfaces 270 and 271, respectively, thereby producing the left side peripheral line 25 and the right side peripheral character line 24.

The machining operation depicted in FIG. 39 is essentially the same as the operation depicted in FIG. 37 for producing the rear upper conterminous surface, in the sense that the final desired surface slopes downward from the character lines being produced, and consequently the upper conterminous surface may be quite wide, thus removing the maximum excess stock. Also, the same small cylindrical cutter 267, right angle drive attachment 266, and stylii 165 and 268 are again used.

The arrangement depicted in FIG. 39 is the same as the arrangement of FIG. 38, and the same templates 272 and 273 are again used, for both the right and left side upper conterminous surface cuts. The machining operation of FIG. 39 would proceed in the same manner as described for the previous operations.

THE CENTER CONTOUR SURFACE CUT

Figure 40:
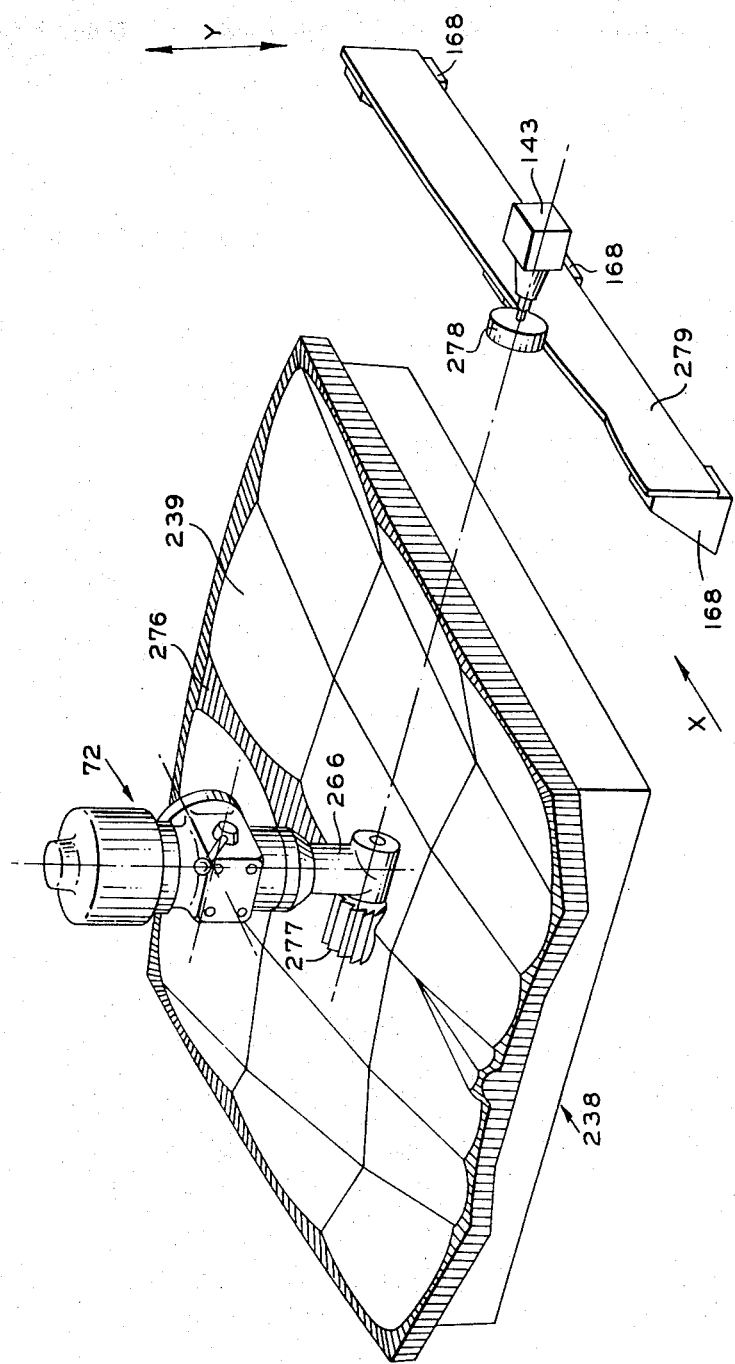
FIG. 40 is a diagrammatic perspective view depicting the cutting of a center contour surface on the model illustrated in FIG. 39.

The next machining operation in the illustrative order, as depicted in FIG. 40, produces a two-dimensionally variant surface on the top center surface of the model 238. The center contour surface 276 thus produced constitutes the longitudinal highline of the curvature of the desired surface at the centerline of the model 238, and it is to be understood that this surface is not the final desired surface to be produced in that area, but is rather the result of removing the maximum amount of excess material from the rough body 239 down to the level of the aforesaid highline.

It will be seen in FIG. 40 that the arrangement is similar to the previous arrangement of FIG. 39, in that the model 238 remains in the same position on the X-slide, and the right angle drive attachment 266 is retained on the tool head 72. The machining operation of FIG. 40, however, requires only two-dimensional control of the cutter, and consequently only one template and one tracer are required.

A larger diameter cutter than the cutter 249 shown in FIG. 36 is required, and it will be seen in FIG. 40 that the cylinder cutter 277 is of a diameter sufficiently larger than the horizontal drive shaft housing of the right angle drive attachment 266 to permit the housing to clear the rough body 239 during the machining operation.

A related substantially cylindrical stylus 278 having a taper corresponding to stylus 254 is shown operatively mounted in the XY-tracer 143, in contact with the XY-template 279, which corresponds to the aforesaid longitudinal highline. The template 279 is aligned and retained on a template mounting means 168 in the manner previously described. The XZ-tracer 122 as shown in FIG. 39 has been moved to a storage position, and it will be understood that there is no automatic Z-movement of the tool head 72 during the cutting operation.

The tool head 72 and cutter 277, and the tracer 143 and stylus 278 are aligned to each other and moved to starting points as previously described, and the cutting of the center contour surface 276 may then proceed.

If the cutter 277 is not axially long enough to completely remove the excess material as shown in FIG. 40, the tool head 72 and the cutter 277 may be repositioned in the Z-direction of the Y-slide rail 60 by the means described in FIGS. 13 through 17, and a second cut may be taken to remove the remaining excess material, thus widening the surface 276.

THE LONGITUDINAL CROSS-SECTION LINE CUTS

Figure 41:
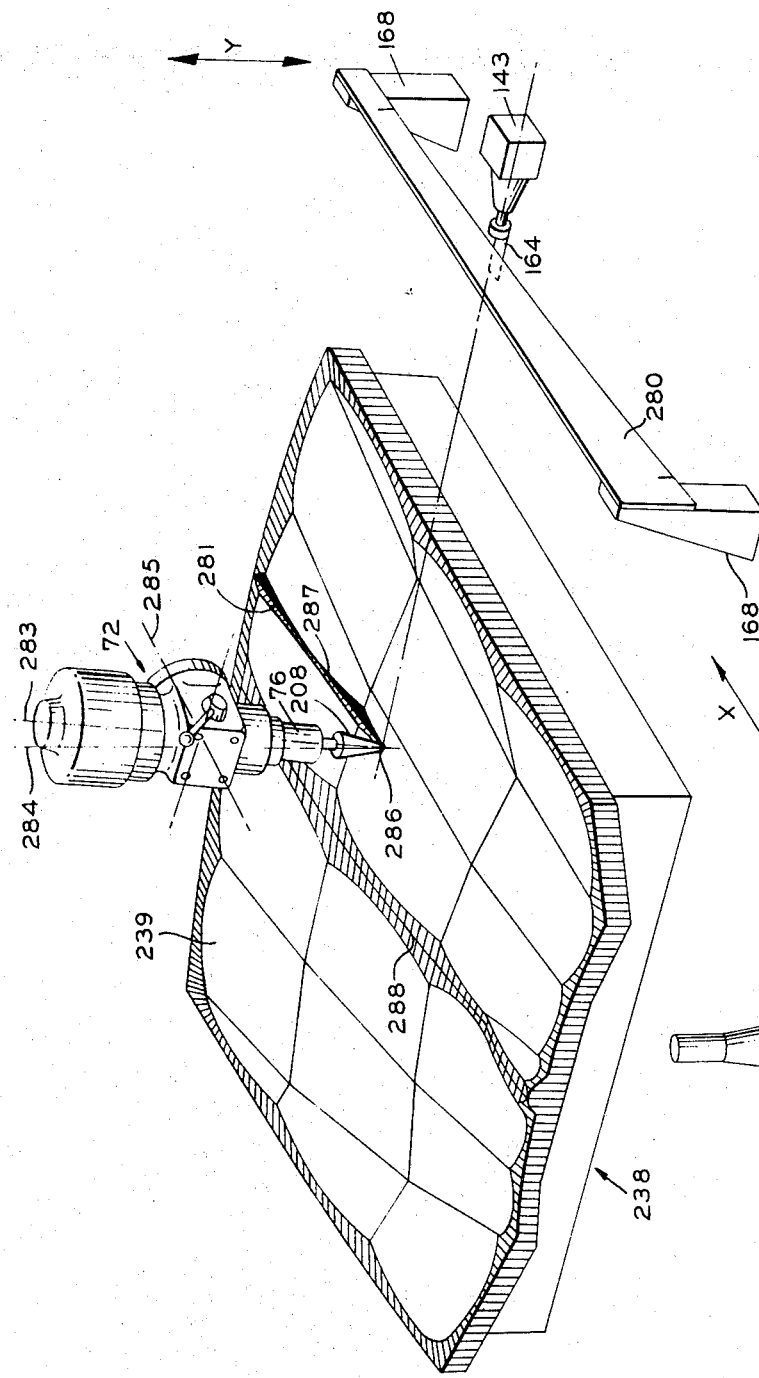
FIG. 41 is a diagrammatic perspective view depicting the cutting of a longitudinal cross section line on the model illustrated in FIG. 40.
Figure 42:
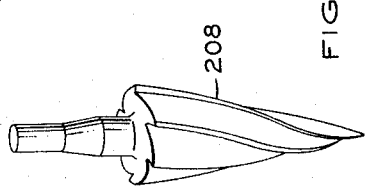
FIG. 42 is a perspective view of a pointed tool which cuts by a rotary action.

In the next machining operation in the illustrative order, as depicted in FIG. 41, the arrangement remains basically the same as the previous arrangement shown in FIG. 39, in that the model 238 is retained in the same position on the X-slide, and only one template is required to produce a longitudinal cross-section line cut. Also, there is no Z-movement of the tool head 72 during the cutting operation. The right angle drive attachment used in the previous operation has been removed from the tool head 72, and a pointed or conical cutter 208, which is shown in detail in FIG. 42, is installed in the quill 76 of the tool head 72. As previously stated, a blade-type stylus must be used in conjunction with a pointed cutter, and also the XY-tracer and related stylus do not have axial movement; therefore a short blade-type stylus 164 may be used in the XY-tracer 143.

The templates which are provided to produce the transverse, longitudinal, and diagonal cross section lines on a model are generally a female type, and as previously stated, the method of the present invention is adapted to use either a female or male template for producing such lines. In the arrangement shown in FIG. 41, a female type XY-template 280, corresponding to the 10 inch longitudinal cross section as shown in the plan view of the hood panel in FIG. 3, is shown aligned and retained on the template holding means 168.

It is to be understood that the conical cutter 208 and the stylus 164 are aligned to each other as previously described in FIGS. 24 and 25, and are positioned at starting points from which the machining operation depicted in FIG. 41 may proceed.

The machining operation depicted in FIG. 41 will produce a left hand longitudinal cross section line 281 which conforms to a hypothetical line on the desired surface, as defined and controlled by the contour of the template 280. A right hand longitudinal cross section line will also be produced from the same template, merely by repositioning the tool head 72 and cutter 208 on the Y-slide to conform to the location of the right hand longitudinal cross section line.

Experience with the method of the present invention has shown that it is desirable to tilt the tool head so as to position the axis of the pointed cutter 208 approximately perpendicular to a hypothetical tangent line, generated from the curvature of the desired surface at 90° to the direction of the cut, from the point where the centerline of the pointed cutter intersects the desired surface. In FIG. 41, the vertical axis 283 of the tool head 72 is shown tilted from the true vertical centerline 284 by pivoting the tool head 72 about the horizontal axis 285, thereby placing the axis of the pointed cutter 208 approximately perpendicular to the tangency of the desired surface at 90° to the intersecting point 286. This arrangement has proven to be necessary, in that the two sloping walls of the V-groove 287 produced by the conical cutter 208 will be of equal height as the rough surface is worked down to the level of the line 281 for the final surface, thus serving as a more easily observed guide for the model maker during his carving operations. On other more extremely sloping surfaces, it is imperative that the V-groove be produced as described, in order to prevent one wall of the groove from being completely carved-out, thus losing the guide line formed at the bottom of the two sloping walls, and consequently losing control over the surface in the area of the line.

Additional longitudinal cross section lines will be cut in the body 239 of the model 238 in the same manner, by substituting the related template for the depicted template 280, and repositioning the tool head 72 and cutter 208 to conform to the location of the new line and the curvature of the surface. A center line 288 will also be added, to the surface 276 which was produced by the previous machining operation depicted in FIG. 40, in the same manner as herein described, using the template 279 as shown in FIG. 40.

THE LONGITUDINAL REFERENCE LINE CUTS

As depicted in FIG. 43, the next machining operation in the illustrative order produces a three-dimensionally variant longitudinal reference line 17 on the left side of the model 238. The nature of the line 17 is such that the pointed or conical cutter 208 is best positioned perpendicular to the surface of the X-slide, rather than being tilted as was shown in the previous operation of FIG. 41.

The model is retained in the same position on the X-slide, the cutter 208 remains in the tool head 72, and the short blade stylus 164 remains in the XY-tracer 143. An XY-template 289, which duplicates the side view of the reference line 17 as shown in FIG. 3, replaces the template 280 of FIG. 41, and a corresponding XZ-template 290, which duplicates the plan view of the reference line 17 as shown in FIG. 3, is also mounted on the template holding means 168. Both templates are aligned and retained in the same manner as previously described.

A long blade type stylus 165 is installed in the XZ-tracer 122, which has been moved from the storage position into the operating position. The XZ-tracer positioning mechanism, as previously described, will be adjusted to position the stylus 165 so that it will be in unhindered vertical contact along the edge of the template 290, as the tool head 72 and tracer 122 are caused to lower under the control of the XY-tracer 143.

As previously described for the other machining operations, the cutter 208 and the stylii 164 and 165 are aligned to each other and the model and templates, and are positioned at starting points, and the machining operation may then proceed.

It is to be noted that the reference lines 16 and 17, as best seen in FIG. 3, are the boundary lines between conterminous surfaces which are angled in respect to each other, and the reference lines 16 and 17 are initially created for engineering and model making purposes only. The finished model will not have these reference lines per se, but will have a fillet connecting the conterminous surfaces. The fillet is omitted at this stage of the model making procedure to facilitate the construction and checking of the conterminous surfaces, which must join together at a particular level at a particular location, as defined by the lines 16 and 17. The fillet is added to the model only after the model has been checked and certified.

A reference line in place of a fillet is a recurring condition in the art of model making, and the model 238 will also include the reference lines 18 and 19, as best seen in FIG. 3.

The right side reference line 16 will be produced on the model 238 in the same manner as the left side reference line 17, and from the same set of templates, but it will be understood that the XZ-template 290 will be repositioned to conform to the location of the right side reference line 16 as best seen in the plan view of the hood panel in FIG. 3. The reference lines 18 and 19, also as best seen in FIG. 3, will be produced on the model 238 from their respective templates in the manner as herein described for the cutting of three-dimensionally variant reference lines.

In FIG. 44, an enlarged fragmentary portion of the model 238, from the area in the circle 291 of FIG. 43, clearly shows the relationship of a longitudinal line, such as the aforedescribed line 281, intersecting the front peripheral character line 21. The view of FIG. 44 depicts an ideal condition, wherein the line 281 is shown as perfectly matching the level of the front upper conterminous surface 262.

THE TRANSVERSE CROSS SECTION LINE CUTS

FIG. 45 depicts the next machining operation of the illustrative order, which is only a two-dimensionally controlled operation, and accordingly is basically the same type of operation as depicted in FIG. 41 for the machining of the longitudinal cross section lines.

It will be noted in FIG. 45 that the model 238 has been horizontally rotated on the X-slide to a position 90° removed from the previous position depicted in FIG. 43, and the XZ-tracer 122 has been removed to a storage position which is not shown. The XY-tracer 143 and short blade stylus 164 are retained from the previous operation of FIG. 43, as well as the pointed cutter 208. An XY-template 292, which corresponds to the transverse cross-section line 35 at the 40 inch line of the hood panel, as best seen in FIG. 3, is shown in operative position on the template mounting means 168. It should be noted that the template 292 is a female template, and also that it is depicted as a full template, whereas a half-template would generally be used due to the fact that the cross section is symmetrical about the centerline of the model.

The operation depicted in FIG. 45 will be carried out essentially the same as the operation of FIG. 41, including the tilting of the tool head 72 as indicated by the numeral 293, to place the pointed cutter 208 approximately perpendicular to a hypothetical tangent line generated from the curvature of the surface at 90° to the direction of the cut, as previously explained for FIG. 41.

Additional transverse cross section lines will be cut in the body 239 of the model 238 in the same manner, for the transverse cross section lines from the zero line to the 50 inch line, as indicated by the numerals 31 through 36 in FIG. 3, by substituting the related template for the depicted template 292, and repositioning the tool head 72 and cutter 208 to conform to the location of the new line and the curvature of the surface.

THE FRONT UNDER LINE CUTS

Figure 46:
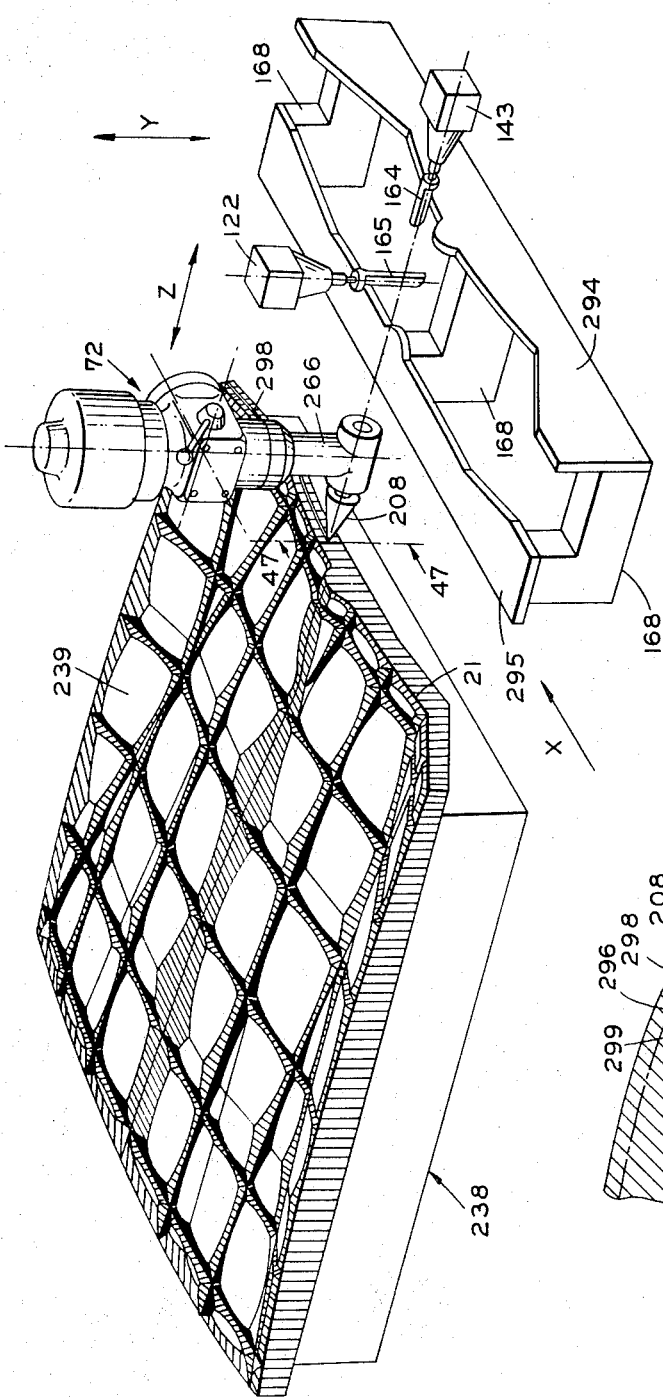
FIG. 46 is a diagrammatic perspective view depicting the cutting of the front underline on the model illustrated in FIG. 45.
Figure 47:
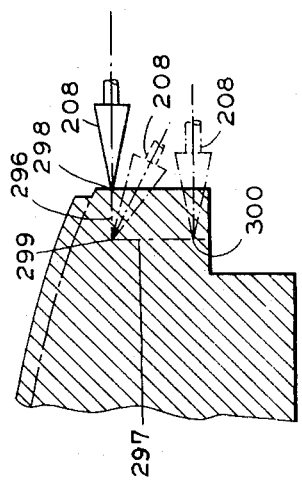
FIG. 47 is a fragmentary sectional view of the model shown in FIG. 46 taken along the line 47—47 and looking in the direction of the arrows.

The producing of the front under line cuts by the next machining operation of the illustrative order is depicted in FIGS. 46 and 47 and is a three-dimensionally controlled operation, In FIG. 46 the model 238 remains in the same position on the X-slide as was shown for the previous operation of FIG. 45. The right angle drive attachment 266 has again been attached to the tool head 72, with the conical cutter 208. The short blade stylus 164 and XY-tracer 143 are again used, and the XZ-tracer 122 and long blade stylus 165 have been moved from the storage position to the operating position.

An XY-template 294 which corresponds to a front view of the undersurface 296, as best seen in FIG. 47, and an XZ-template 295 which corresponds to a plan view of the front peripheral character line 21, are aligned and retained on the tempalte mounting means 168 in the manner as previously described.

Due to the particular three-dimensionally variant shape of the front end of the hood panel as shown in FIG. 3, it is not possible to completely machine the undersurface 296 or the conterminous wall 297, as best seen in FIG. 47, with either the conical cutter 208 or a form cutter. Therefore, the three-dimensionally variant surfaces are defined in the body 239 of the rough model 238 by the boundary lines 298, 299, and 300, as best indicated in FIG. 47 by the points bearing those numbers.

The underlines 298, 299 and 300 would be cut in sequence from their respective templates using the conical cutter 208 to produce a guide line similar to the longitudinal and transverse section lines, and the machining operation will proceed in the same manner as hereinbefore described. The excess material between the lines will be removed later by hand methods to produce the final intermediate surfaces.

THE RIGHT AND LEFT SIDES AND REAR MULTIPLE SURFACE CUTS

Figure 48:
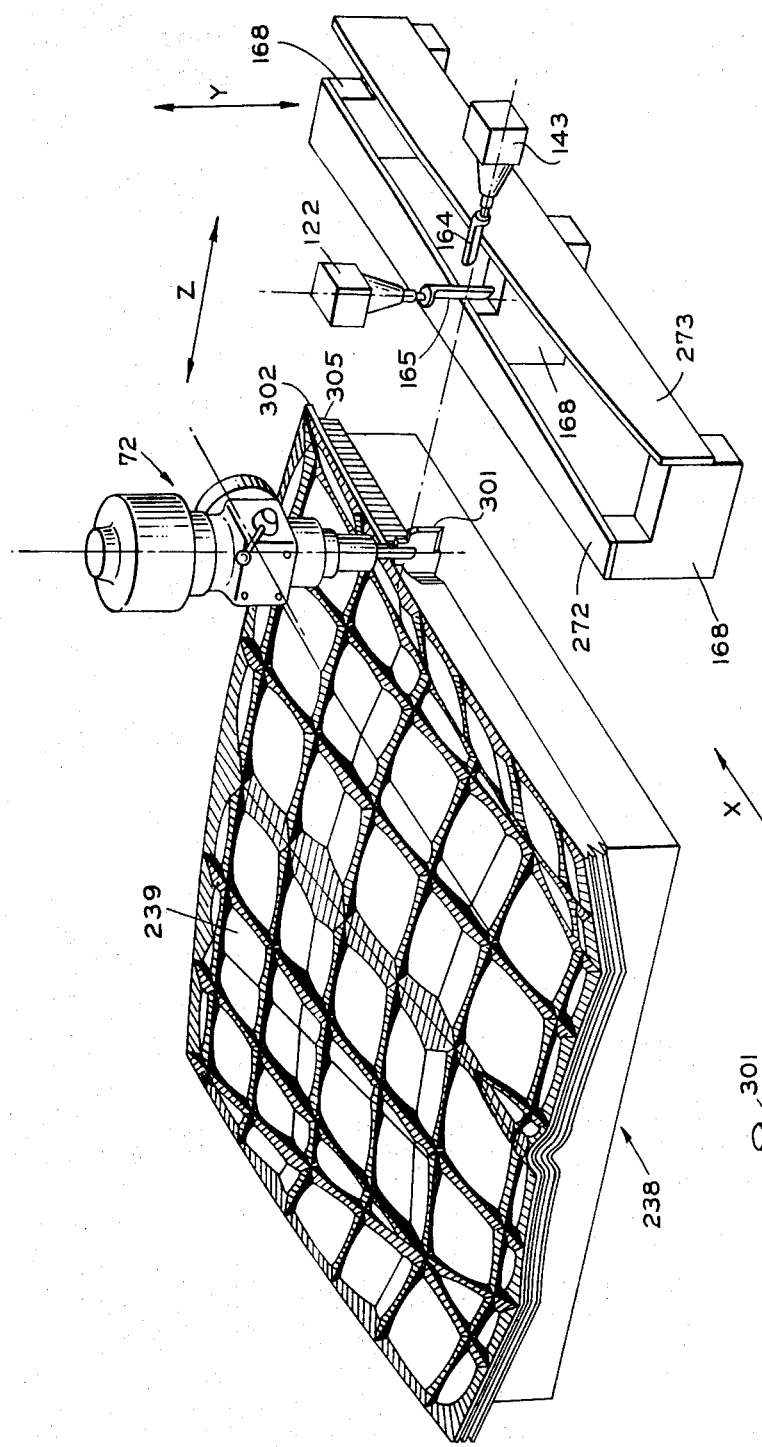
FIG. 48 is a diagrammatic perspective view depicting the cutting of side multiple surfaces on the model illustrated in FIG. 45.

The next machining operation, of the illustrative order, as depicted in FIG. 48 is identical to the machining operation depicted in FIG. 38, except for the cutter, XZ-stylus and the shape of the surface which is produced.

Figure 49:
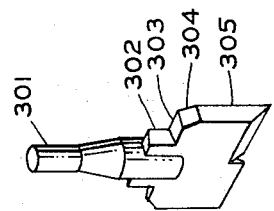
FIG. 49 is an enlarged perspective view of the multiple surface form cutter shown in FIG. 48.

The same templates 272 and 273 are utilized, but a long blade stylus 165 is used in the XZ-tracer 122. A form cutter 301, which is shown in detail in FIG. 49, is shown mounted in the tool head 72. The form cutter 301 is made in accordance with the principles previously described and produces four, three-dimensionally variant surfaces from the cutter surfaces as indicated by the numerals 302 through 305 in FIG. 49. These three-dimensionally variant surfaces are the final surfaces for the model, and no further material need be removed from these surfaces.

The cutting of the right and left side multiple surfaces will proceed in the same manner as the operation of FIG. 38. An identical multiple surface cut may be made along the rear end of the model 238, or a different multiple surface may be produced with a different form cutter. If the rear multiple surfaces should be such that a form cutter could not be devised to produce them, then the rear surfaces would be produced in the same manner as the front surfaces as previously described, and as shown in FIG. 46.

PRODUCING THE FINAL SURFACE

Figure 51:
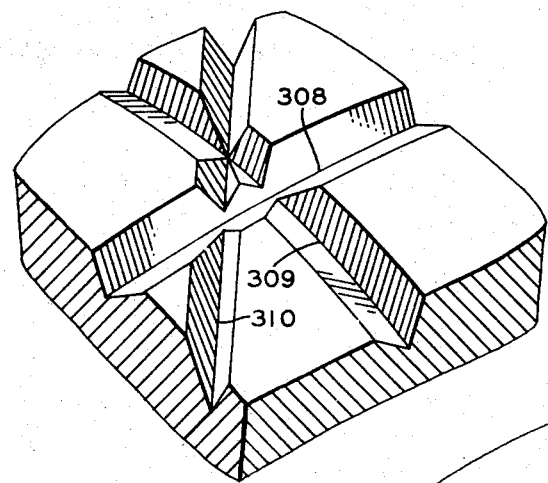
FIG. 51 is a perspective view of a fragmentary portion of the machined surface of a model, showing three V-cuts intersecting each other at different levels.
Figure 50:
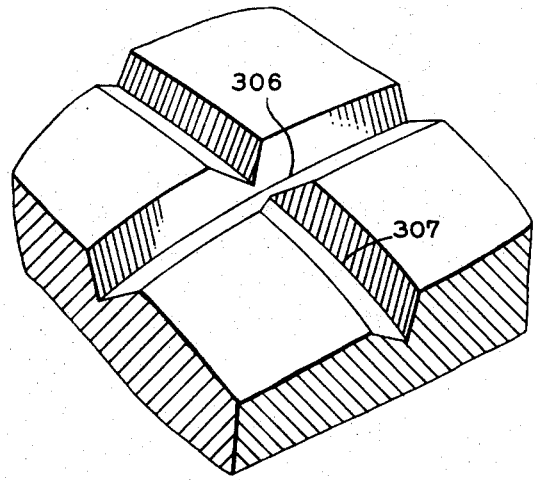
FIG. 50 is a perspective view of a fragmentary portion of the machined surface of a model, showing a pair of V-cuts intersecting each other at different levels.

The model 238 as shown in FIG. 48, when provided with the right, left and rear multiple surface cuts, is in the condition where all of the automatic machining operations which are required before producing the final surface have been completed. If the final desired surface of the model is to be completely produced by hand methods, the partly processed model 238 is then removed from the machine, and placed upon a suitable precision surface table for further processing by hand methods. The excess stock in the areas between the transverse and longitudinal cross section lines and the reference lines, and any other surfaces having excess stock, is gradually and carefully removed by hand methods, such as carving with a spoke-shave or draw knife in the manner of the prior model making art, down to a desired surface as defined by the engineering information and the V-groove lines. During this operation, any discrepancy in the engineering information will become evident to the model maker from the mismatched levels of the V-groove lines, which is illustrated in FIGS. 50 and 51. In FIG. 50, a longitudinal cross section line 306 and a transverse cross section line 307 are depicted as intersecting at mismatched levels.

One or the other of the two lines 306 and 307 are at the wrong level, and the incorrect one may be determined by considering the levels of the adjacent lines as the surface is worked down. If the walls of the adjacent V-groove lines are higher than the walls of the line 307, then it will be known that the line 307 is incorrectly high; but if the walls of the adjacent V-groove lines are lower than the walls of the line 306, then it will be known that the line 306 is incorrectly low.

Figure 52:
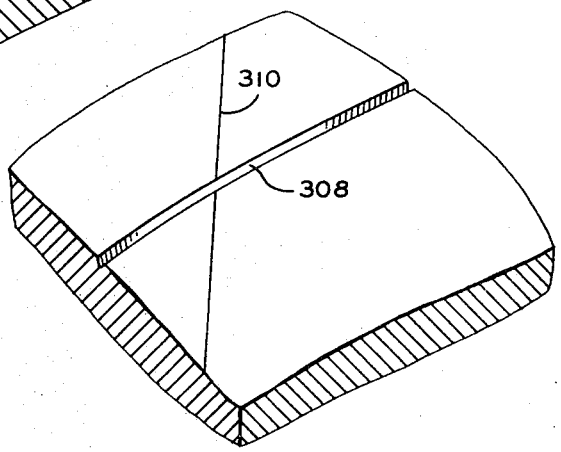
FIG. 52 is a perspective view of the fragmentary model portion of FIG. 51, finished to the level of the V-cuts shown in FIG. 51.

In FIG. 51, a similar condition is depicted, wherein a longitudinal line 308 is intersected by a transverse line 309 and a diagonal line 310, and all three lines are at different levels. The same area is depicted in FIG. 52 as being completely finished to the level of the diagonal line 310, which was determined to be correct in relation to the adjacent lines by the smoothness of the intermediate surface. As can be seen in FIG. 52, the longitudinal line 308 proved to be too low, and the transverse line 309 proved to be too high.

The controlling engineering data is intended to produce surfaces conforming to a certain shape, and to permit the coordination of matching parts and tools to those surfaces. After a model is completed by the method of this invention it will be found that any discrepancies in the engineering data have been reconciled, and the desired surfaces are effectively perfect, which is the goal of the engineering. The model is physical proof that the surfaces are good, and any discrepancy between the model and the engineering data may be rectified at this time by changing the engineering data to properly represent the certified model. Therefore, one of the advantages of the method of this invention is that the coordination of mating parts and tools is simplified and assured.

The producing of a final surface on a master model, by the method of this inveniton, may not only be done completely by hand methods as described above, but may also be partially produced by automatically machining away the greater portion of the excess material down to the aforesaid guide lines. The machines utilized in this operation will be similar to the hereinbefore described machines, in that they will have three basic components, powered and controlled to move in three basic directions, but the signaling devices which control the movements of the three basic components would be different, in that they will be activated by three-dimensional data rather than two-dimensional data, and the three-dimensional data will be in the form of magnetic or punched tapes. Such a machine is generally referred to as a numerically controlled machine, and machines and machining systems of this type have gained wide acceptance in industry. A suitable numerical control system which may be employed to convert a three-axis milling machine into a numerically-controlled machine is one available on the open market and produced by the Seneca Falls Machine Co. of Seneca Falls, New York, and which is described in the Seneca Falls Machine Co. Bulletin EE 1019, entitled "Seneca Falls Tapetronic Control System, Numerical Control for Continuous Path Contouring and Point-to-Point Positioning."

It is to be understood that a numerically controlled machine operation on a model will produce a partially finished final surface, which will consist of a series of closely spaced, shallow grooves which are usually concave, and the bottom of the concave grooves define the desired surface. The conterminous ridges which are formed between the concave grooves are removed by hand methods, down to the bottom of the concave grooves thus producing the final desired surface. It will thus be seen that by the use of numerically controlled machining, nearly all of the remaining excess stock is quickly removed, thereby considerably expediting the producing of the final desired surface.

The machining of such a surface by the use of a numerically controlled machine could be done prior to the producing of the aforedescribed guide lines, but this sequence is undesirable, due to the fact that the preparation of the controlling data for a numerically controlled machine is a complex procedure, and therefore highly subject to error, whereby an improper surface could be produced without warning, and extensive repairs to the model would be required. By first producing the aforedescribed guide lines, each concave groove produced by the numerically controlled machine may be visually checked by the machine operator in relation to the guide lines as each cut progresses, and any serious discrepancy may be noted as it develops, and the machining operation may then be stopped at that point and suitable corrections may be made, before extensive repairs are required.

If the possibility of producing an undesirable surface by the use of numerically controlled machining is disregarded, and the surface is machined without the aid of guide lines, it will then be found that it is extremely difficult to check the model for confirmation to the engineering data. This condition is due to the fact that the taped controlling data for the numerically controlled machine merely describes the contour of the surface of the model along a series of parallel, two-dimensionally variant paths, and the critical three-dimensionally variant character and reference lines, hereinbefore described, are produced as a resultant of the configuration of the parallel two-dimensionally variant cutter paths. Therefore, in order to check the three-dimensionally variant character and reference lines directly to the engineering data, either new controlling tapes must be prepared so that a gaging element may be guided along the three-dimensionally variant character or reference lines, or these lines must be checked at tri-ordinate points by the prolongated hand methods of the prior model making art.

Thus it will be readily appreciated that the producing of the aforedescribed guide lines by the method of this invention, in conjunction with the partial machining of the final surface under numerical control, has further advantages in acting as an immediate check on the validity of the numerically controlled machine surface, and in aiding the final checking operations on the model.

Although the nature and function of numerically controlled machines suited to the producing of the final surface on a model in accordance with the method of this invention are relatively well known and understood, the nature and derivation of the controlling data is somewhat obscure due to the complex problems encountered in the preparation of numerical data which describes a three-dimensionally variant surface. Two systems may be used to derive this data, which are adapted to the carrying out of the method of this invention. The more difficult and time consuming system of the two, arrives at the definition of the surface in relation to a particularly shaped cutter by the use of mathematical systems to describe the nature of the surface, and the use of a computer to integrate the nature of the surface with the shape of a particular cutter, and produces the taped data necessary to control the movements of the cutter in relation to the workpiece. Such a mathematical system is described by Mr. John F. Dollries of the General Electric Company, in a published report entitled "Mesh of Points," and copies of this report may be obtained from the General Electric Company, Evendale Computations Operation (ECO), Cincinnati 15, Ohio.

The simpler and more preferable of the two systems, makes use of the full size clay model which is first produced to establish the characteristics of an automobile, and from which the engineering data is taken. The cross-sectional, character, and reference lines depicted in the engineering drawings are derived from this clay model, and must conform as closely as possible to the actual configuration of the clay model. The engineering drawings then become the prime authority and the prime controlling data for the automobile body, but differ from the clay model in the correction of minor faults. Thus it is logical to assume that the three-dimensional full-size clay model may be used as a prime source of the three-dimensional dat which is required to produce a final three-dimensionally variant surface on a model, by the use of automatic means such as a numerically controlled machine.

The taped data required to control a numerically controlled machine in the producing of a three-dimensionally variant surface on a workpiece would be taken from the clay model by the use of a machine which would guide a sensing element over the surface of the clay model, in the same manner as a cutter will be subsequently moved over the desired model. Such a machine may be substantially the same as the aforementioned numerically controlled machine, which will do the final work, with the exception that a sensing element and signaling device will be used to control the movements of the machine, and simultaneously record such movements on a data tape. After the tapes which describe a given surface have been prepared, the data produced thereon is further processed by a computer, to eliminate any discrepancies that may exist in the configuration of a given cutter path, and to produce a mathematically correct line in relation to the adjacent lines. The taped data may then be further compared to and integrated with the engineering data. Computers and computer programming systems adapted to carry out these operations are available from various companies, such as the Radio Corporation of America, National Cash Register Co., Burroughs Corp., Control Data Corp. and the International Business Machines Corp.

It is to be understood that the sensing element used in the operation described above is so shaped as to conform to the shape of the cutter which will be used to produce the final surface and no further integration of the nature of the surface to the shape of the cutter is required. It will be further understood that the nature of the sensing element and signaling device is such that the sensing element does not have to make contact with the surface of the clay model, but rather operates on a principle whereby the sensing element is kept a fixed distance away from the surface, and thus avoids the possibility of damaging the vulnerable clay surface. The principles and operation of such devices are well known to the electronic engineers, and many such devices are available on the open market. Two such systems adapted to perform these operations are available on the market from Farrand Controls, Inc., 4401 Bronx Blvd., New York 70, N.Y., under the name "Farrand Inductosyn Linear and Angular Micro Positioning System."

CHECKING THE MODEL

After the total desired surface has been produced, the model will appear as a completely finished automobile engine compartment hood panel master die model as illustrated in FIG. 2 by the numeral 12. The master model 12 must be certified and this is done by checking the model after completion to the controlling data, which in this case are the aforedescribed templates. Heretofore, in order to check a master model to templates it was necessary that the model to be checked be placed upon a surface which was a precise flat plane, and means to precisely position the plane of a template in relation to the reference planes of the model were provided, such as angle plates, which also permitted said template to be lowered along said plane to bring its contoured surface into contact with the model to determine if any light showed therebetween, thereby indicating a low surface. On the other hand, the template may have contacted the surface before the reference planes on the template were in the required relationship to the reference planes on the model, thereby indicating a high surface.

In carrying out the checking of a master model to templates in accordance with the method fo the present invention, the finished master model 12 is remounted on the X-slide 53 of the machine of FIG. 11, and the pertinent templates are remounted in precise relationship to the model in the same manner as described in FIGS. 35 through 48. The following described typical conditions will suffice to teach the checking of all of the lines and surfaces, which may be encountered in checking such a model by the method of this invention.

A peripheral character line is generally varient in three dimensions, and therefore it is one of the more complex lines to be checked. The finished master model 12 and the templates 264 and 247 will be mounted in the same arrangement as that shown in FIG. 37, in order to check the front peripheral character line 21. The checking of the character line 21 is a two-step operation, wherein a complete linear check is first made on the front peripheral surface 251 in as close proximity to the line 21 as the gauging tool will permit. The front upper conterminous surface 262 is then checked in the same manner.

Figure 53:
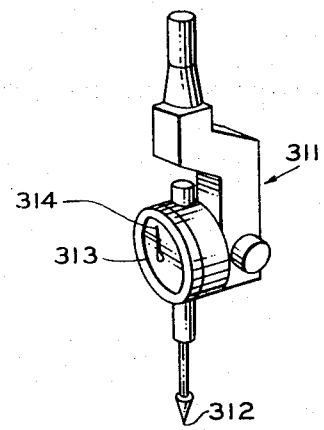
FIG. 53 is a perspective view of a dial indicator type gaging tool.

The front conterminous surface 251 will first be checked by mounting the right angle drive attachment 266 to the tool head 72, and the dial indicator gage checking unit 311 shown in FIG. 53 will be mounted in the drive spindle of the right angle drive attachment 266. The sensing tip 312 of the dial indicator gage 311 will be placed under pressure in contact with the front peripheral surface 251 in a position as close to the character line 21 as possible. The motor 74 of the tool head 72 is not operated during a gaging operation. The dial indicator gauge 311 is rotated to place the dial face 313 in such a position so as to be readily observed by the machine operator, and the dial is adjusted to place the zero mark on the dial under the indicator gage needle 314 to set up the dial gage for the initial starting position. The X-slide table 53 is again under the control of the operator, and the tracer mechanisms 122 and 143 are activated in the same manner as described hereinbefore during the cutting operations illustrated in FIG. 37. As the sensing point 312 is caused to move relative to and along the contacting front peripheral surface 251, any plus or minus deviations of that surface in relation to the template 247 will be observed by the operator, according to the position of the needle 314 on the gate 311.

In order to check the front upper conterminous surface 262 and thereby the line 21, the right angle drive attachment 266 will be removed from the tool head 72, and the dial indicator gage 311 will be mounted in the quill 76 of the tool head. The front upper conterminous surface 262 is then checked in the same manner as described for the checking of the front conterminous surface 251, but any deviation of the surface will be in relation to the template 264. It will be understood that although the conterminous surfaces are being checked by the dial indicator gage 311, it is only desired to check the line 21, and this must be done in relation to the two templates 247 and 264, which correspond to the conterminous surfaces at the line 21.

The rear peripheral character line 26, the left hand peripheral character line 17, the right hand peripheral character line 16, the front under surface 296, the left side multiple surfaces 302 through 305, and the similar right side multiple surface and rear end multiple surface which are not numbered, may be checked by a similar procedure. It will be understood that the axis of the dial indicator 311 must always be disposed during these checking operations parallel to the plane of the template to which it is checking.

All of the longitudinal and transverse cross section lines may be checked to their respective templates by a dial indicator gage arrangement similar to the arrangement shown in FIGS. 41 and 45. In order to check all of the longitudinal and transverse cross section lines, the cutter 208 is replaced by the dial indicator gage 311, and the checking of these cross section lines then proceeds in the same manner as described hereinbefore for the cutting of these lines. It will be understood that any deviation in the contour of the line will be observed as described hereinbefore for the checking of the peripheral contour lines.

In regard to the checking of the model by the method of this invention, it may be expedient to set up a machine similar to the machine of FIG. 11 which would be concerned only with the checking of models. In this event, the tool head 72 with the motor 74 would not be required, since there would be no need to rotate the quill 76. Consequently, the tool head 72 would be removed from the pivot slide 82 as best seen in FIG. 13, and a simple motorless tool holder would be mounted on the face of the pivot slide 82. This simple tool holder type tool head would be very similar in construction to the tool head 72, in that it would be provided with a quill 76 which may be positioned upwardly and downwardly in a vertical line by means of the hand adjustment 79, as best seen in FIG. 13. A dial indicator checking devicesuch as shown in FIG. 53 would then be mounted, as hereinbefore described, in the quill 76. It is to be understood that the dial indicator gaging device 311 as shown in FIG. 53 is only one type of gaging device which may be used.

THE ANGLING ATTACHMENT

Figure 54:
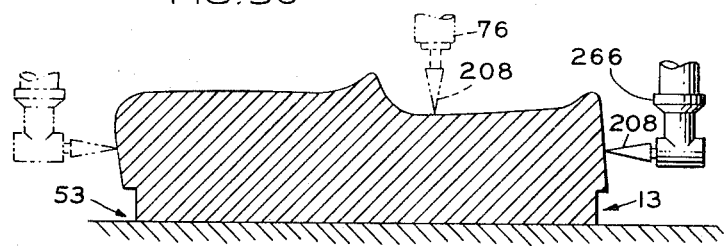
FIG. 54 is a diagrammatic view showing a pointed cutter in various positions in relation to a cross section of the front fender model of the automobile model illustrated in FIG. 1.

The front fender master die model 13 illustrated in FIGS. 1 and 7 is a particularly complex shape to be machined by the method of this invention, due to the fact that the transverse cross section lines must be produced on the top and bottom surfaces of the panel as well as on the side surface. In FIG. 54 the fender master die model 13 is illustrated in cross section as lying on a precision surface table, such as the table 53 of FIG. 11, and the cutting of the surfaces is depicted as being carried out with the right angle drive attachment 266 and the pointed or conical cutter 208 which are shown near the starting position at the bottom of the panel. The same attachment and cutter are shown in phantom lines near the finishing position at the top surface of the panel. The same conical cutter 208 is shown in phantom lines in a midway position on the side surface of the master model 13, and it is mounted directly in the quill 76. The view of FIG. 54 is intended to show the arrangement necessary to complete a transverse cross section line cut with the use of the right angle drive attachment 266.

Figure 55:
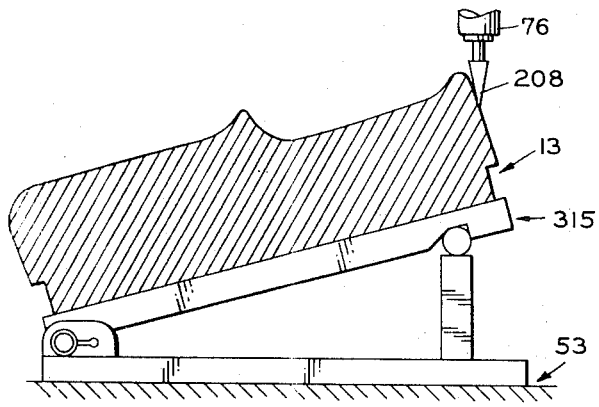
FIG. 55 is a diagrammatic view showing a pointed cutter in position relative to the cross section of the front fender model of FIG. 54 shown on a sine plate; and, FIG. 56 is a diagrammatic view showing the structure of a tool head attachment in relation to the cross section of the front fender model of FIG. 54.

An alternate method of cutting the top and bottom surfaces without the use of the right angle drive attachment 266 is shown in FIG. 55. The cross section of the front fender master model 13 is shown tilted on the sine plate 315, which is mounted on the surface of the table 53 for the purpose of preventing the cutter from removing valid surface. The same conical cutter 208 is used, and is mounted directly in the quill 76 of the tool head 72. It is understood that the controlling template must be mounted at a corresponding angle.

Figure 56:
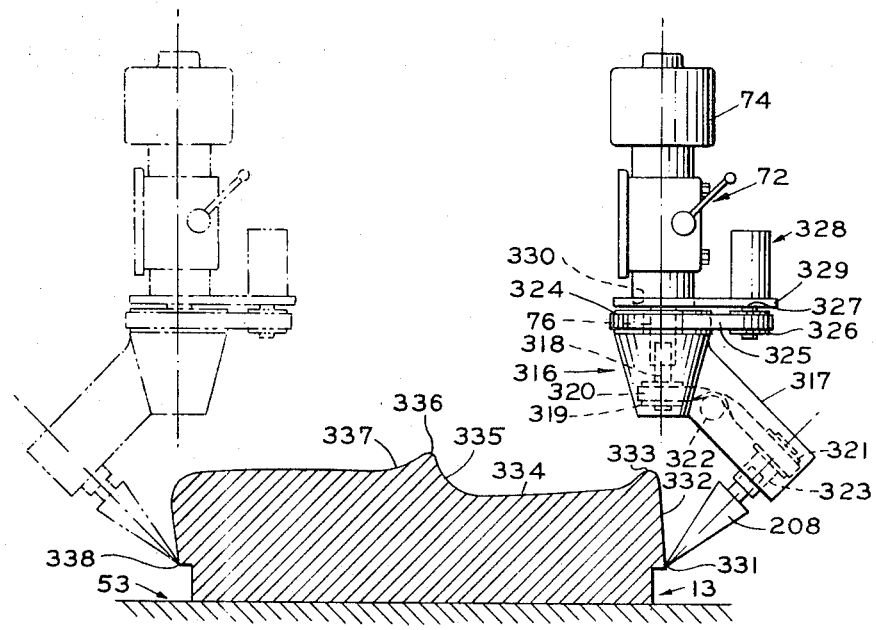

As can be seen in FIGS. 54 and 55, the method of this invention may be carried out by conventional machines and certain attachments to the machines. However, it was found that greater facility could be obtained by the use of a special angling attachment to the tool head 72, which would enable the axis of the pointed cutter 208 to be always tilted at a particular angle, and to be rotated about the axis of the tool head 72 for the cutting of opposite surfaces. Such an angling attachment is shown in detail in FIG. 56. In FIG. 56 an angling attachment 316 is shown on the tool head 72 whereby the body 317 is rotatably mounted on the quill 76, and the drive shaft 318 is operatively mounted in the quill 76 by the upper end of the shaft. The timing belt gear 319 is operatively mounted on the opposite end of the shaft 318. The timing belt 320 is similar to conventional V-belts, except that the inner surface of the belt is formed with gear teeth, which mesh with the gear teeth on the timing belt gears 319 and 321. The timing belt 320 is meshably engaged with the timing gear 319, and is passed over the idlers 322, whereby it is redirected to the timing gear 321 on the upper end of the drive quill 323. The conical cutter 208 is mounted in the lower end of the quill 323. The cutter 208 is powered by the motor 74 of the tool head 72, through the aforedescribed driving mechanism contained in the head 72. Fixedly connected to the upper portion of the body 317 is a larger timing belt gear 324, which is meshably engaged with the timing belt 325, which is also engaged with the timing belt gear 326. The timing belt gear 326 is operatively connected to the lower end of the drive shaft 327 of the positioning motor 328, which may be any suitable type of electric or fluid motor. The positioning motor 328 is fixedly attached to the mounting ring 329, which is provided on the opposite end with the mounting hole 330, and is fixedly mounted to a mating surface on the tool head 72 in such a manner that it cannot rotate. The positioning motor 328 is controlled by the operator from a remote position, and as can be seen in FIG. 56, rotation of the motor 328 will rotate the body 317 of the angling attachment, thereby repositioning the cutter 208 as desired. The operator's controls for the positioning motor comprise a conventional jogging control, which will permit a very slight angular rotation of the body 317 by a momentary pressure on the control button. By maintaining pressure on the control button the body 317 may be rotated 360° repeatedly. The angling attachment 316 is held in position on the tool head 72 by the fixed engagement of the drive shaft 318 in the quill 76. The quill 76 rotates freely inside the body 317 on a bearing, and a resultant rotation of the angling attachment 316 is prevented by the timing belt 325 and the non-energized positioning motor 328.

As can be seen in FIG. 56, the angling attachment 316 has been repositioned 180° as shown in phantom lines at the opposite side of the model 13. It is possible with this mechanism to begin a template cut across the model 13 at the point 331, under tracer control from the respective template, and proceed up the vertical surface 332 to the point 333. At the point 333 the positioning motor 328 would be activated by the machine operator, and the body 317 with the cutter 208 would be rotated 180° about the point 333. The cout would be continued to the point further along the surface to the left, approximately to the point 334, where again the body 317 with the cutter 208 would be repositioned 180° back to the position shown at the beginning of the cut, thereby being in a position to continue up the sloped surface 335 to the point 336. At the point 336 the body 317 with the cutter 208 would again be rotated 180°, to permit the cutter to ride down the slope 337. The cut would be continued with the body 317 and the cutter 208 in this position, finishing the cut at the point 338 with the tool head 72 and angling attachment 316 in the position as shown in FIG. 56. IT is to be noted from this operation that the cut has begun at the point 331 and has smoothly progressed to the point 338 with only brief pauses at the re-directing points 333, 334 and 336. By the arrangement shown in FIGS. 54 and 55, it is necessary to stop at certain similar points, and to change the tool and attachment as shown in FIG. 54, or to tilt the model as shown in FIG. 55 in order to be able to continue the cut on a semi-vertical surface. A unique feature of the angling attachment 316 which makes this operation possible is the fact that the point of the conical cutter 208 is exactly on the centerline of the tool head 72, and as the body 317 with the cutter 208 is rotated, the point of the conical cutter 208 remains precisely on this centerline.

In the use of the angling attachment 316, the point of the cutter 208 must always be on the desired surface, whereas the cutting edges of the cutter 208 must never remove any of the desired surface. Therefore, the angling attachment 316 is used in accordance with the following rules. The general direction of movement of the cutter 208 is defined as always being a relative horizontal movement from a starting point to a finishing point on the model. Accordingly, when the course of the cut is upward in relation to the general direction of movement of the cutter 208, the cutting edges must trail the point of the cutter 208 in relation to the general direction of movement. Conversely, when the course of the cut is downward in relation to the general direction of movement of the cutter 208, the cutting edges must lead the point of the cutter 208 in relation to the general direction of movement. If the cutting edges of the cutter 208 are leading the point, the cutting edges of the cutter 208 may be caused to trail the point by rotating the body of the angling attachment 316 through 180°, and vice-versa. Experience has shown that various bodies 317 may be constructed to position the axis of the tool 208 at various angles in relation to the centerline of the tool head 72, but a body 317 which positions a tool 208 at 45° to the centerline of the tool head has proven to have the greatest utility.

THE MACHINING OF DIES

Although the method of this invention is intended primarily to be used for producing master models, it is to be understood that certain of the features of this method can be applied with advantage to the producing of articles other than said models. In particular, the feature of multiple surface cutting can be most successfully applied to the producing of the final dies. These dies are produced in conformity with a die model by a machining operation known as "Kellering," which defines the desired surface by producing a plurality of closely spaced grooves on the model and these grooves are concave, due to the use of a spherical nosed cutter in this operation. The bottoms of the concave grooves serve to establish the desired surface of the die, and the ridges between these groove bottoms are removed to produce a smooth desired surface. Such surfaces as previously described in the method of this invention which can be cut on a model with a form cutter can also be cut on a steel die by the use of a similar form cutter. For example, a form cutter which will cut a shape the same as the cutter 225 in FIG. 30, would be constructed to withstand the strains encountered in cutting steel but would have a similar generated form.

The method of the present invention has been illustrated in relation to the producing of master die models which duplicate the form of the outer panels of an automobile body. The outer form of a new automobile body is generally developed on a clay model by the automotive company concerned with the producing of such an automobile, and the engineering information for the outer body panels is developed from the clay model. The outer body panels are, however, only a portion of the total automobile, and only constitute approximately thirty per cent of the total number of panels required to be produced for the formation of an automobile body. The remaining seventy per cent of the total number of panels comprises the inner panels for the automobile body.

It is to be understood that the method of this invention is particularly valuable in relation to producing the inner panel die models from the engineering data. The inner panel structure of an automobile is not simulated by a clay model or the like, but exists in concept only as dimensioned line drawings.

The general art of making models may be described as an effort to produce on a three-dimensional form the two-dimensionally variant lines originated by the highly skilled engineering profession. The result of the engineering effort is a series of precise lines which define a desired form, and the model maker attempts to reproduce the engineering lines as faithfully as possible on a three-dimensional form. The engineering profession must define a surface by a system of lines, and the model maker must produce a surface precisely in accordance with those lines, but in the prior art of model making the precise lines of the engineer were dependent for their accuracy on the skill of the template maker and the model maker. Obviously it is most desirable to be able to produce the precise engineering lines as directly as possible on the body of a model. From the foregoing description of the present invention, it will be understood that the method of the invention is well calculated to achieve the most direct transference of the precise engineering liness to the body of a model, independent of the model maker's skill and the aforedescribed inherent inaccuracies of the templates. The present invention also may, as previously described, utilize photo-scanners as signaling devices, and control machine movements directly from the engineering lines, thereby eliminating the template. It will be further understood that the method of the present invention is also adapted to make direct use of the precise engineering lines through the photo-etching process, whereby the lines are directly transferred to a metal and plastic photographic plate, and the plastic is etched away exactly conforming to the contour of the line. A sufficient shoulder is formed on the line to serve as a contacting surface, for the purpose of deflecting a sensing element and actuating a signaling device. Thus it will be understood that the method of the present invention succeeds in improving the art of model making, by more directly utilizing the skill of the engineer in the producing of master models.

While it will be apparent that the preferred embodiment of the invention herein disclosed is well calculated to fulfill the objects above stated, it will be appreciated that the invention is susceptible to modification, variation and change.

What I claim is:

1. In a machine tool for automatically machining a master model, comprising signalling means being responsive to control data for controlling said automatic machining, a sensing element carried by said signalling means and engageable with said control data, said sensing element including:
    a. a blade-type stylus having a mounting shank formed on one end thereof for operatively mounting the stylus in said signalling means, and a tip on the other end thereof; and,
    b. said blade-type stylus having a longitudinally tapered sensing edge which tapers outwardly from the longitudinal axis of the stylus, with the taper increasing toward the tip of the stylus, whereby said stylus may be moved axially while in a deflected operating position and with said tapered sensing edge in contact with the controlling data without activating the signalling means.

2. In a machine tool as defined in claim 1, wherein:
    a. said tapered edge is provided with an axially bisected conical contacting surface.

* * * * *